(12) United States Patent
Nomura et al.

(10) Patent No.: US 9,335,560 B2
(45) Date of Patent: May 10, 2016

(54) IMAGING APPARATUS

(71) Applicant: HOYA CORPORATION, Tokyo (JP)

(72) Inventors: Hiroshi Nomura, Saitama (JP); Shinya Suzuka, Saitama (JP); Takahiro Morinaga, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/607,689

(22) Filed: Jan. 28, 2015

(65) Prior Publication Data

US 2015/0212337 A1    Jul. 30, 2015

(30) Foreign Application Priority Data

Jan. 30, 2014  (JP) ................................. 2014-015885
Mar. 20, 2014  (JP) ................................. 2014-057449

(51) Int. Cl.
| | |
|---|---|
| *H04N 5/225* | (2006.01) |
| *H04N 5/232* | (2006.01) |
| *G02B 27/64* | (2006.01) |
| *G02B 13/00* | (2006.01) |

(52) U.S. Cl.
CPC ............ *G02B 27/646* (2013.01); *G02B 13/009* (2013.01); *G02B 13/0045* (2013.01); *G02B 13/0065* (2013.01); *H04N 5/2254* (2013.01); *H04N 5/23248* (2013.01); *H04N 5/23287* (2013.01)

(58) Field of Classification Search
CPC . H04N 5/225; H04N 5/2254; H04N 5/23248; H04N 5/23287; G02B 27/646
See application file for complete search history.

(56) References Cited

U.S. PATENT DOCUMENTS

| | | |
|---|---|---|
| 7,411,731 B2 | 8/2008 | Ohtake et al. |
| 8,238,736 B2 | 8/2012 | Tsuruta et al. |
| 8,837,929 B2 | 9/2014 | Nomura et al. |
| (Continued) | | |

FOREIGN PATENT DOCUMENTS

| | | |
|---|---|---|
| JP | 9-251127 | 9/1997 |
| JP | 2006-166202 | 6/2006 |

(Continued)

OTHER PUBLICATIONS

U.S. Appl. No. 14/607,558 to Hiroshi Nomura et al., filed Jan. 28, 2015.

(Continued)

*Primary Examiner* — Roberto Velez
*Assistant Examiner* — Abdelaaziz Tissire
(74) *Attorney, Agent, or Firm* — Greenblum & Bernstein, P.L.C.

(57) ABSTRACT

An imaging apparatus includes a front lens group having a front lens element and a reflector; a support member supporting the reflector; a support mechanism supporting the movable frame, supporting the front lens element, to spherically swing about a center positioned on an extension of the front lens element optical axis behind a reflection surface of the reflector; and a permanent magnet and a coil as an actuator which performs image stabilization by driving the movable frame in response to vibrations to spherically swing the movable frame. The permanent magnet and the coil planarly extend parallel to tangent planes, tangent to imaginary spheres centered about the center, respectively. Any normal to the tangent plane of the permanent magnet is inclined to the optical axis of the front lens element such that a distance between the normal and the optical axis increases in a direction toward the object side.

11 Claims, 27 Drawing Sheets

(56) References Cited

U.S. PATENT DOCUMENTS

| | | | |
|---|---|---|---|
| 9,020,334 B1 * | 4/2015 | Suzuka | G02B 27/646 396/55 |
| 9,063,346 B2 * | 6/2015 | Suzuka | G02B 13/0015 |
| 9,063,347 B2 * | 6/2015 | Suzuka | G02B 13/0015 |
| 2006/0127073 A1 | 6/2006 | Yasuda | |
| 2006/0268431 A1 | 11/2006 | Jin | |
| 2008/0266404 A1 | 10/2008 | Sato | |
| 2010/0033820 A1 * | 2/2010 | Omi | G02B 27/646 359/554 |
| 2010/0202766 A1 | 8/2010 | Takizawa et al. | |
| 2011/0052164 A1 * | 3/2011 | Huang | G02B 27/646 396/55 |
| 2011/0181740 A1 | 7/2011 | Watanabe et al. | |
| 2013/0278785 A1 * | 10/2013 | Nomura | H04N 5/23287 348/208.11 |
| 2014/0009631 A1 * | 1/2014 | Topliss | G02B 27/464 348/208.11 |
| 2014/0086568 A1 * | 3/2014 | Nomura | G02B 27/646 396/55 |
| 2014/0086569 A1 * | 3/2014 | Nomura | G02B 27/646 396/55 |
| 2014/0119717 A1 * | 5/2014 | Yasuda | G02B 27/646 396/55 |
| 2014/0212119 A1 * | 7/2014 | Nomura | G03B 3/10 396/133 |
| 2014/0218798 A1 * | 8/2014 | Suzuka | G02B 27/646 359/557 |
| 2014/0218799 A1 * | 8/2014 | Suzuka | G02B 13/0065 359/557 |
| 2015/0103417 A1 * | 4/2015 | Nomura | G02B 13/005 359/733 |
| 2015/0110481 A1 * | 4/2015 | Suzuka | G02B 13/0015 396/55 |
| 2015/0215541 A1 * | 7/2015 | Nomura | H04N 5/2254 348/208.11 |

FOREIGN PATENT DOCUMENTS

| | | |
|---|---|---|
| JP | 2006-259247 | 9/2006 |
| JP | 2006-330439 | 12/2006 |
| JP | 2007-228005 | 9/2007 |
| JP | 2008-268700 | 11/2008 |
| JP | 2009-86319 | 4/2009 |
| JP | 2010-128384 | 6/2010 |
| JP | 2010-204341 | 9/2010 |
| JP | 4717529 | 7/2011 |
| JP | 4789655 | 11/2011 |
| JP | 2013-238848 | 11/2013 |

OTHER PUBLICATIONS

U.S. Appl. No. 13/859,916 to Hiroshi Nomura et al., filed Apr. 10, 2013.

U.S. Appl. No. 14/607,628 to Hiroshi Nomura et al., filed Jan. 28, 2015.

English translation of Japanese Patent No. 4717529 B2, published Jul. 6, 2011.

* cited by examiner

EXAMPLE 3

IMAGING APPARATUS

BACKGROUND OF THE INVENTION

1. Field of the Invention

The present invention relates to an imaging apparatus equipped with an image-stabilizing (image shake correction/shake reduction) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and smart devices (smart phones or tablet computers, etc.) equipped with a camera, have become widespread, and there has been a demand to miniaturize the imaging units incorporated in these types of mobile electronic devices. In order to miniaturize an imaging unit, it is known in the art to construct an optical system of an imaging unit as a bending optical system which reflects (bends) light rays using a reflection surface of a reflector element such as a prism or a mirror. Using a bending optical system in an imaging unit makes it possible to achieve a reduction in thickness of the imaging unit, especially in the direction of travel of the incident light emanating from an object to be photographed.

In addition, there also has been a tendency for demand to equip imaging units with a so-called image-stabilizing (image shake correction/shake reduction) system that is designed to reduce image shake on the image plane that is caused by vibrations such as hand shake. The following four different types of imaging units are known in the art as imaging units using a bending optical system which are equipped with an image-stabilizing system: a first type (disclosed in Japanese Unexamined Patent Publication Nos. 2009-86319 and 2008-268700) in which an image sensor is moved in directions orthogonal to an optical axis to reduce image shake, a second type (disclosed in Japanese Unexamined Patent Publication No. 2010-128384 and Japanese Patent No. 4,789,655) in which a lens (image-stabilizing lens/image-stabilizing optical element) disposed behind a reflector element (on the image plane side) that has a reflection surface is moved in directions orthogonal to an optical axis to reduce image shake, a third type (disclosed in Japanese Unexamined Patent Publication Nos. 2007-228005, 2010-204341, 2006-330439, and Japanese Patent No. 4,717,529) in which the angle of a reflector element (a reflection surface thereof) and the angle of a lens adjacent to the reflector element are changed to reduce image shake, and a fourth type (disclosed in Japanese Unexamined Patent Publication Nos. 2006-166202 and 2006-259247) in which the entire imaging unit is obliquely moved to reduce image shake.

The applicant of the present invention has proposed an image-stabilizing system which only moves a front lens element(s) of a front lens group along a plane orthogonal to the optical axis of the front lens element(s) to reduce image shake in an imaging apparatus which contains a bending optical system, wherein the front lens group includes a reflector element and the aforementioned front lens element(s) that is positioned on the object side of the reflector element, and the front lens group is disposed on the object side in the entire optical system of the imaging apparatus (disclosed in Japanese Unexamined Patent Publication No. 2013-238848).

In Japanese Unexamined Patent Publication No. H09-251127, in a lens system having a straight optical axis, not a bending optical system, it is disclosed that the first lens element, which is positioned closest to the object side, or the second lens element, which is subsequently positioned behind the first lens element, is rotated (swung) about a rotational center on an optical axis to perform an image-stabilizing operation Bearing in mind that, in addition to still image photography, moving image photography is now commonly used in imaging apparatuses, there has been a need for further improvement in the image-stabilizing capability in imaging apparatuses. However, movements of an optical element to reduce image shake (image-stabilizing optical element) exert an adverse influence on the optical performance such as aberrations, and a space corresponding to the moving amount of the optical element is required. Accordingly, when attempts are made to improve the image-stabilizing capability, consideration is required to prevent, as much as possible, these conditions (namely, further miniaturization of the image-stabilizing system and minimalization of any reduction in the optical performance due to the image-stabilizing operation) from being impaired.

In the first type of image-stabilizing system, a substrate which is connected to the image sensor moves while following the image sensor; accordingly, the peripheral electrical components, in addition to the image sensor, need to be designed so as to be compatible with such movements, so that the image-stabilizing system tends to be complicated in structure and high in production cost. In addition, although the periphery of the imaging surface of the image sensor needs to have a dust-resistant structure, it is difficult to secure a sufficient space which allows the image sensor to perform an image-stabilizing operation while maintaining a dust-resistant structure within a small imaging unit intended to be incorporated in a cellular phone or a smart device.

In the second type of image-stabilizing system, the moving direction of the image-stabilizing lens during an image-stabilizing operation corresponds to the thickness direction of the imaging unit (the forward/rearward direction with the direction toward an object to be photographed set to correspond to the forward direction), so that a problem occurs with it being difficult to incorporate the image-stabilizing system into the thin imaging unit because the internal space thereof is limited. Conversely, if this type of image-stabilizing system is used, reduction in thickness of the imaging unit becomes limited. A similar problem exists in the type of image-stabilizing system which moves an image sensor, not a lens element, in the thickness direction of the imaging unit.

In the third type of image-stabilizing system, a large space is required to obliquely move the reflector element and the lens adjacent to the reflector element relative to each other, which easily increases the size of the imaging unit. In the fourth type of image-stabilizing system, in which the entire imaging unit is obliquely moved, the increase in size of the image-stabilizing system unavoidable.

In the image-stabilizing system disclosed in Japanese Unexamined Patent Publication No. 2013-238848, the effect of miniaturizing (slimming) the imaging apparatus in a direction along the optical axis of the front lens element is obtained by making the front lens element of the front lens group, which is positioned in front of the reflector element, move in a plane orthogonal to the optical axis of the front lens element. However, in recent years, it has been desired to achieve, up to a high level, both miniaturization and improvement in image-stabilizing performance of the imaging apparatus equipped with an image-stabilizing system.

In the image-stabilizing system disclosed in Japanese Unexamined Patent Publication No. H09-251127, the conceptual rotational centers of the first lens element and the second lens element are set on an optical axis (optical path); however, to achieve this optical configuration, it is required to arrange the rotational supporters for the first lens element and the second lens element at positions deviating from the optical path so as not to cut off light rays traveling in the optical path, which makes it difficult to achieve a small and compact design of the image-stabilizing system.

SUMMARY OF THE INVENTION

Accordingly, the present invention provides an imaging apparatus equipped with an image-stabilizing system which is small in size and superior in anti-shake capability.

According to an aspect of the present invention, an imaging apparatus is provided, including a front lens group which constitutes part of an imaging optical system of the imaging apparatus and includes at least one front lens element and a reflector, in that order from an object side, wherein the reflector includes a reflection surface which reflects light rays, exiting from the front lens element, toward a different direction, and wherein the imaging apparatus performs an image-stabilizing operation by driving the front lens element in response to vibrations applied to the imaging optical system in order to reduce image shake on the image plane; at least one rear lens group which constitutes another part of the imaging optical system and is positioned closer to an image plane than the front lens group; a movable frame which holds the front lens element; a support member which supports at least the reflector and is immovable relative to an optical axis of the front lens element in a reference state in which the imaging apparatus does not drive the front lens element when the image-stabilizing operation is not performed; a support mechanism which supports the movable frame in a manner to allow the movable frame to spherically swing along an imaginary spherical surface about a spherical-swinging center which is positioned on an extension of the optical axis, of the front lens element, extending behind an underside of the reflection surface of the reflector; and an actuator which applies a driving force to the movable frame in response to the vibrations applied to the imaging optical system to make the movable frame spherically swing about the spherical-swinging center. The actuator includes a voice coil motor including a permanent magnet and a coil, one of the permanent magnet and the coil being fixedly held by the movable frame and the other of the permanent magnet and the coil being fixedly held by the support member. The permanent magnet planarly extends in a direction parallel to a first tangent plane that is tangent to a first imaginary sphere, centered about the spherical-swinging center. The coil is formed by winding wire to lie in a second tangent plane that is tangent to a second imaginary sphere about the spherical-swinging center, the coil extending planarly in a direction parallel to the second tangent plane. Any normal to the first tangent plane is nonparallel to the optical axis of the front lens element and intersects the optical axis of the front lens element or an extension line thereof. Any half line, which extends toward the first tangent plane in a direction parallel to the normal from an intersecting point between the normal and the optical axis or the extension line thereof, has an inclination with respect to the optical axis of the front lens element such that a distance between the half line and the optical axis of the front lens element increases in a direction toward the object side.

Specifically, an angle of inclination of the half line relative to a half line that extends toward the object side in a direction parallel to the optical axis of the front lens element from the intersecting point can be set within a range from 40 degrees to 80 degrees.

It is desirable for the first tangent plane and the second tangent plane to be substantially parallel to each other.

Under the premise that two intersecting points at which an imaginary spherical surface of the first imaginary sphere intersects with the optical axis of the front lens element and the extension line thereof are defined as poles of the first imaginary sphere, any circular arc on the imaginary spherical surface of the first imaginary sphere which connects the poles of the first imaginary sphere is defined as a meridian line, any circular arc on the imaginary spherical surface of the first imaginary sphere which is orthogonal to the meridian line is defined as a latitude line, α1 designates an intersecting point between the first tangent plane and a straight line which passes through a center of an outer profile of the permanent magnet and is parallel to the any normal to the first tangent plane, and β1 designates a contacting point between the first imaginary sphere and the first tangent plane in a plane which passes through the intersecting point α1 and extends through the meridian line, the imaging apparatus satisfies the following condition:

$$0 \leq \gamma 1 < \delta 1 \times 0.2$$

wherein γ1 designates a distance between the intersecting point α1 and the contacting point β1 along the first tangent plane and on a plane extending through the meridian line, and δ1 designates a size of the permanent magnet along the first tangent plane and on a plane extending through the meridian line.

Under the premise that two intersecting points at which an imaginary spherical surface of the first imaginary sphere intersects with the optical axis of the front lens element and the extension line thereof are defined as poles of the first imaginary sphere, any circular arc on the imaginary spherical surface of the first imaginary sphere which connects the poles of the first imaginary sphere is defined as a meridian line, any circular arc on the imaginary spherical surface of the first imaginary sphere which is orthogonal to the meridian line is defined as a latitude line, α2 designates an intersecting point between the first tangent plane and a straight line which passes through a center of an outer profile of the permanent magnet and is parallel to the any normal to the first tangent plane, and β2 designates a contacting point between the first imaginary sphere and the first tangent plane in a plane which passes through the intersecting point α2 and extends through the latitude line, the imaging apparatus satisfies the following condition:

$$0 \leq \gamma 2 < \delta 2 \times 0.2$$

wherein γ2 designates a distance between the intersecting point α2 and the contacting point β2 along the first tangent plane and on a plane extending through the latitude line, and δ2 designates a size of the permanent magnet along the first tangent plane and on a plane extending through the latitude line.

If the arrangement of the permanent magnet satisfies the above specified conditions, the stability and accuracy of the spherically swinging operation can be improved, while variations in the distance (gap) between the permanent magnet and the coil can be suppressed. If the distance γ1 is equal to zero and/or the distance γ2 is equal to zero, the center of the outer profile of the permanent magnet is arranged on a tangent point of the imaginary sphere, further increasing the effects of stability and accuracy of the spherically swinging operation and the suppression of variations in the distance (gap) between the permanent magnet and the coil.

The permanent magnet can be fixedly held by the movable frame, and the coil can be fixedly held by the support member, and the permanent magnet can be positioned closer to the spherical-swinging center than the coil in a radial direction of the first imaginary sphere and the second imaginary sphere. The sensor, the permanent magnet and the coil are aligned in the radial direction in that order from the spherical-swinging center side. Conversely, the coil can be fixedly held by the movable frame, and the permanent magnet can be fixedly held by the support member.

It is desirable for the permanent magnet to include two permanent magnets which are arranged at different positions in a direction along an imaginary circle about the optical axis of the front lens element.

It is desirable for a magnetic-pole boundary line of the permanent magnet to be in contact with an imaginary circle about the optical axis of the front lens element as viewed in a direction parallel to the optical axis of the front lens element.

According to the present invention, an imaging apparatus equipped with an image-stabilizing system which is slim in the forward/rearward direction (with the direction toward an object to be photographed set to correspond to the forward direction) and superior in image-stabilizing capability is obtained due to the structure in which the front lens element, which is an element of the front lens group that constitutes a bending optical system and positioned in front of the reflector element, is made to spherically swing about the spherical-swinging center to perform an image-stabilizing operation. Since the center of the spherical motion is set at a position on an extension of the optical axis, of the front lens element, which extends away from the back side of a reflection surface of the reflector element, the support mechanism for the movable frame that holds the front lens element can be constructed in a space-efficient manner. Additionally, as for the actuator, which makes the movable frame that holds the front lens element spherically swing about the spherical-swinging center, the actuator can be structured to be superior in accuracy and stability of image-stabilizing driving of the movable frame and also in space-utilization. Hence, an imaging apparatus equipped with an image-stabilizing system which is small in size and superior in image-stabilizing capability is obtained.

The present disclosure relates to subject matter contained in Japanese Patent Application Nos. 2014-15885 (filed on Jan. 30, 2014) and 2014-57449 (filed on Mar. 20, 2014) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
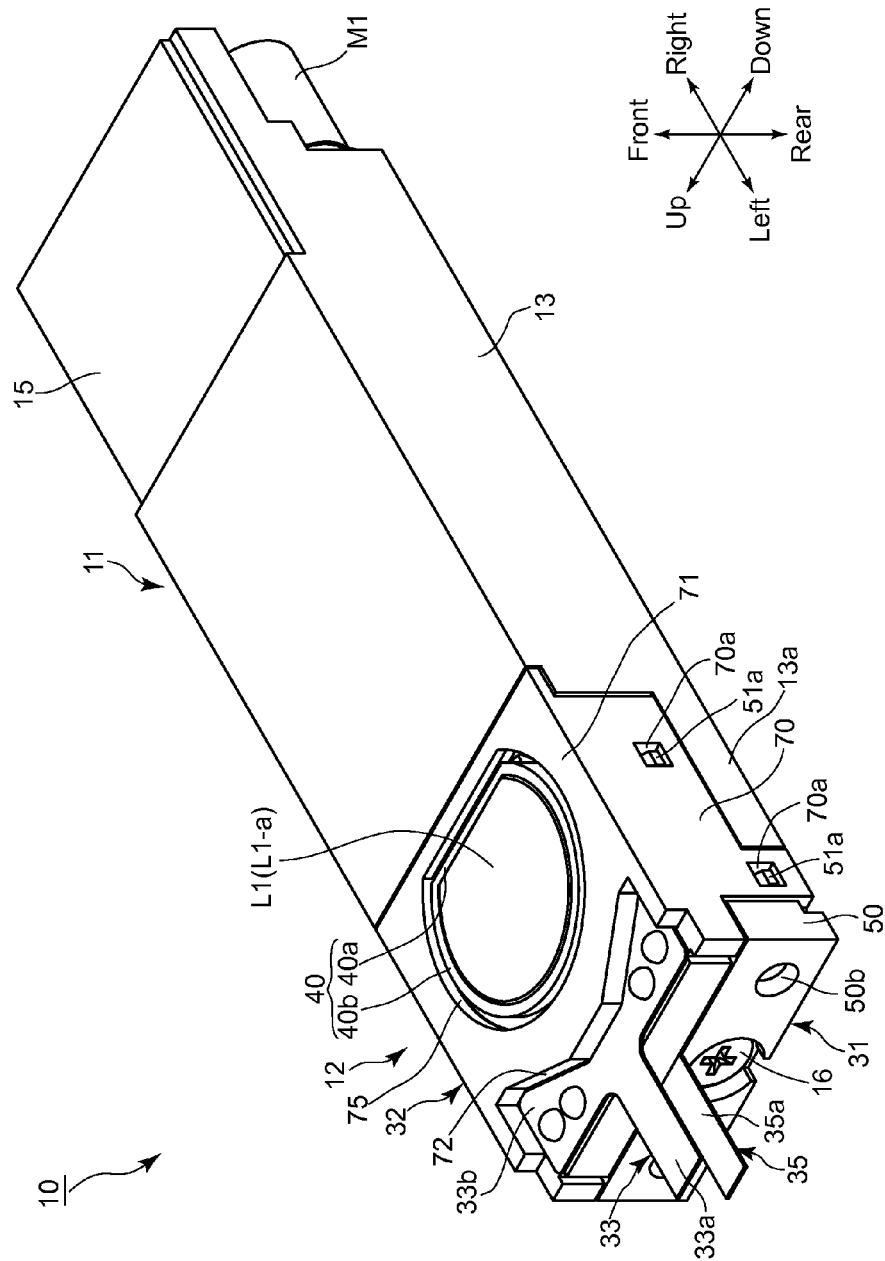
FIG. 1 is a perspective view of a first embodiment of an imaging unit (imaging apparatus) according to the present invention.
Figure 2:
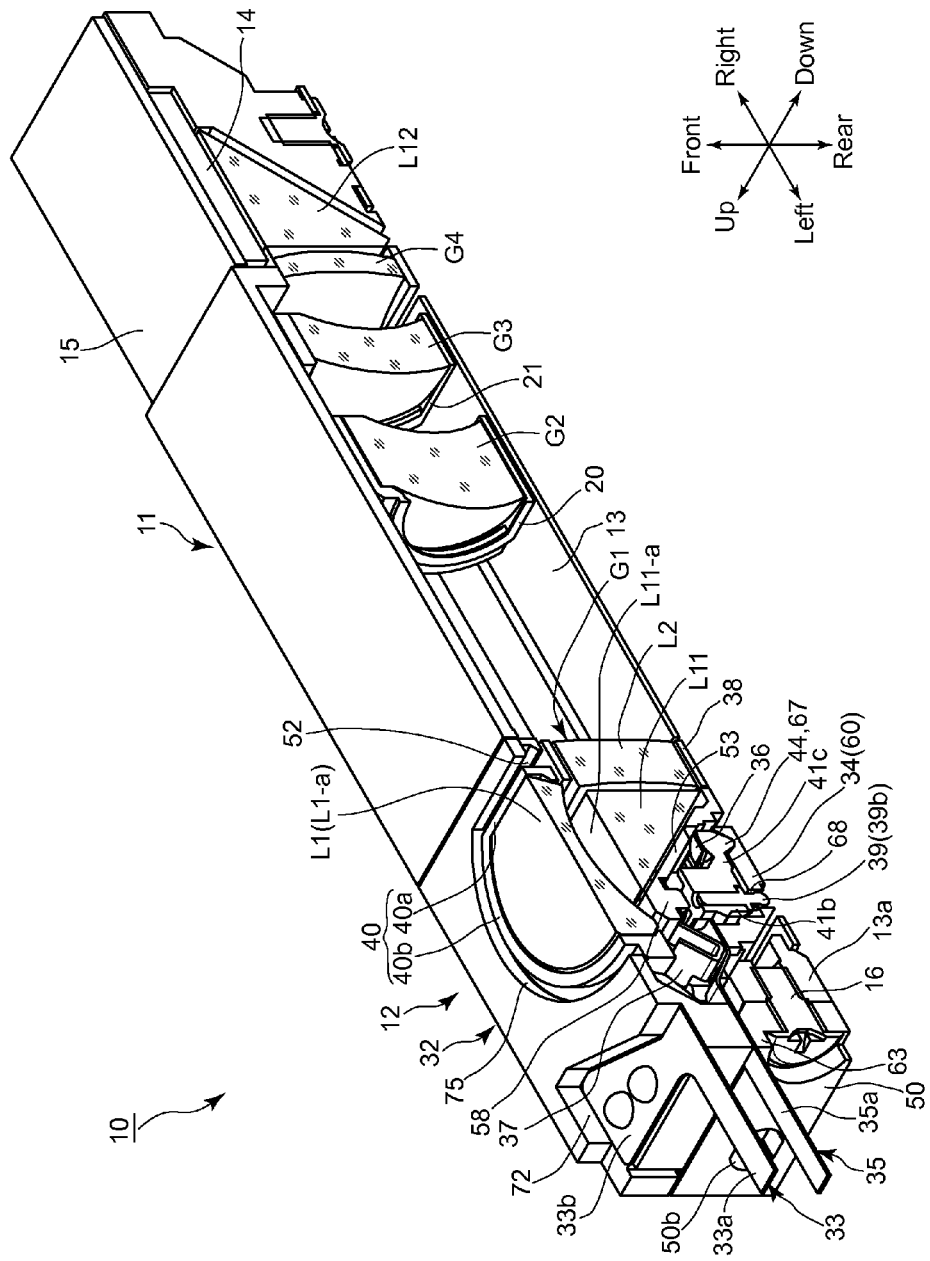
FIG. 2 is a perspective cut view of the imaging unit shown in FIG. 1, cut along a plane including the first optical axis, the second optical axis and the third optical axis of the imaging optical system provided in the imaging unit.

An embodiment (first embodiment) of an imaging unit (imaging apparatus) 10 according to the present invention will be discussed below with reference to FIGS. 1 through 21. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIG. 1, the imaging unit 10 has a laterally elongated shape which is slim in the forward/rearward direction and elongated in the leftward/rightward direction.

As shown in FIGS. 2, 4, 6 and 7, an imaging optical system of the imaging unit 10 is provided with a first lens group (front lens group) G1, a second lens group (rear lens group) G2, a third lens group (rear lens group) G3 and a fourth lens group (rear lens group) G4. The first lens group G1 is provided with a first prism (reflector element) L11, and the imaging unit 10 is provided, on the right-hand side (image plane side) of the fourth lens group G4, with a second prism L12. The imaging optical system of the imaging unit 10 is configured as a bending optical system which reflects (bends) light rays at substantially right angles at each of the first prism L11 and the second prism L12. As shown in FIGS. 2, 4, 6 through 8, 13 and 16 through 18, the first lens group G1 is configured of a first lens element (at least one front lens element of the front lens group) L1, the first prism L11 and a second lens element L2. The first lens element L1 is positioned in front of (on the object side of) an incident surface L11-a of the first prism L11, while the second lens element L2 is positioned on the right-hand side (image plane side) of an exit surface L11-b of the first prism L11. In the illustrated embodiments, the first lens element L1 is a single lens element which is disposed so that an incident surface L1-a thereof faces toward the object side and so that an exit surface L1-b thereof faces toward the incident surface L11-a of the first prism L11. Each of the second lens group G2, the third lens group G3 and the fourth lens group G4 is a lens group including no reflector element such as a prism.

Figure 7:
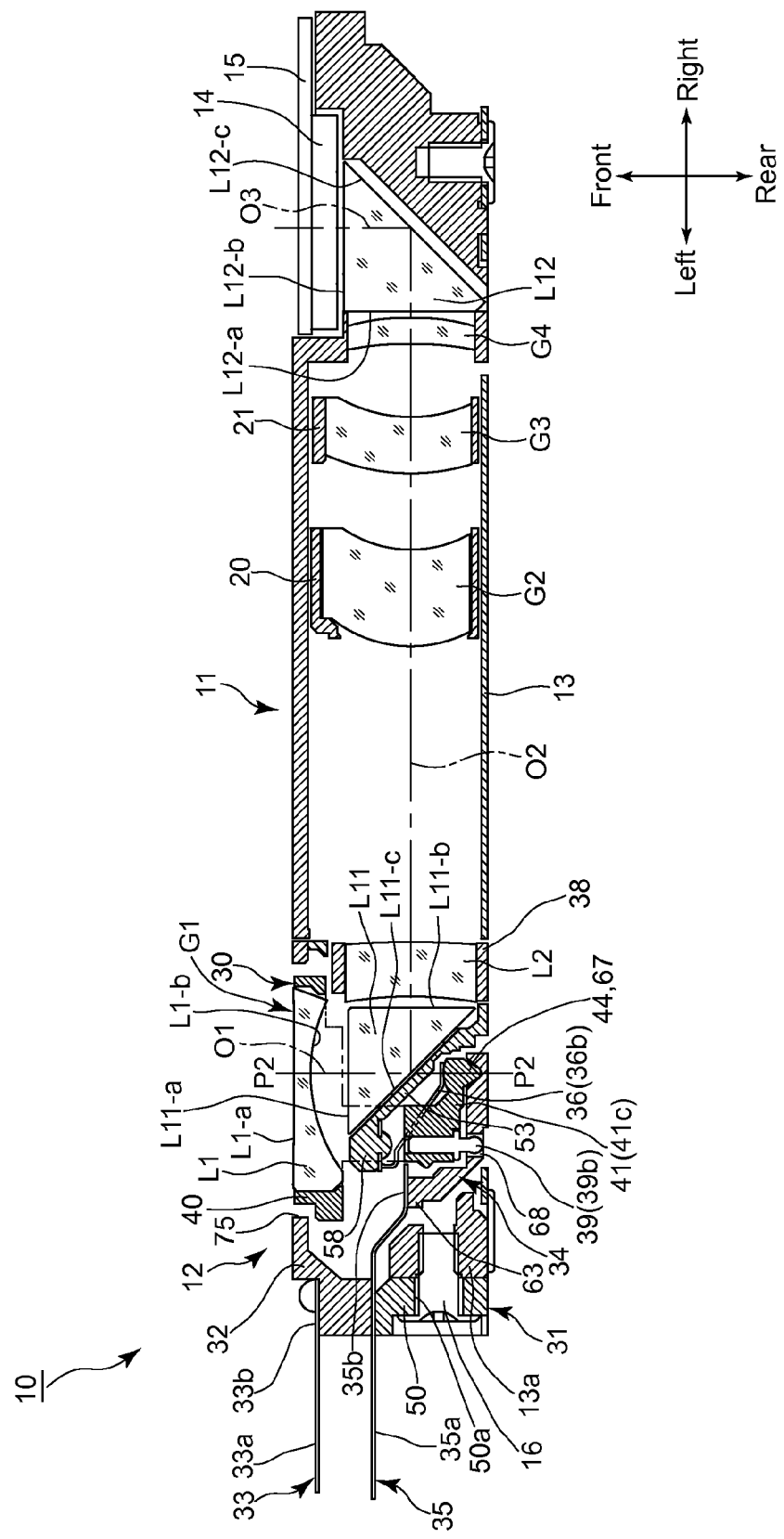
FIG. 7 is a transverse sectional view of the imaging unit, taken along a plane including the first optical axis, the second optical axis and the third optical axis.

As shown in FIG. 7, light rays emanated from the photographic object and incident on the first lens element L1 along a first optical axis O1 extending in the rearward direction from the front of the imaging unit 10 enter the first prism L11 through the incident surface L11-a and are reflected by a reflection surface L11-c of the first prism L11 in a direction along a second optical axis O2 (extending from left to right) to exit from the exit surface L11-b of the first prism L11. Subsequently, the light rays exiting from the exit surface L11-b pass through the second lens element L2 of the first lens group G1 and the second through fourth lens groups G2, G3 and G4, which lie on the second optical axis O2, and are incident on the second prism L12 through an incident surface L12-a thereof. Subsequently, the light rays which are passed through the incident surface L12-a are reflected by a reflection surface L12-c of the second prism L12 in a direction along a third optical axis O3 (extending forwardly) and are incident on the imaging surface of an image sensor (image pickup device) 14 to form an object image thereon. The first optical axis O1 and the third optical axis O3 are substantially parallel to each other and lie, together with the second optical axis O2, on a common plane. The imaging unit 10 has a shape elongated in a direction along the second optical axis O2, and the first lens group G1 is positioned in the vicinity of an end (the left end) of the imaging unit 10 in the lengthwise direction thereof.

Figure 12:
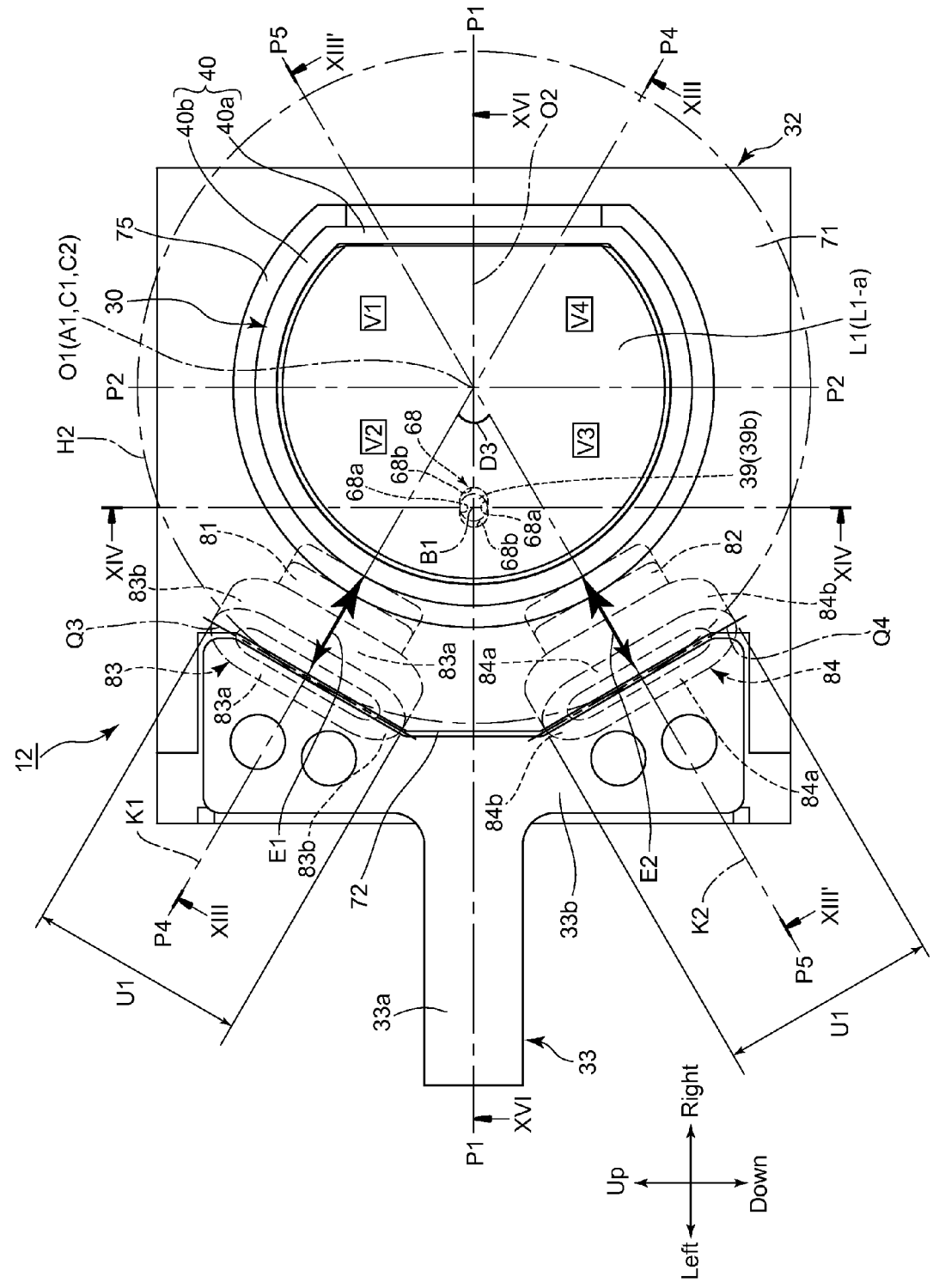
FIG. 12 is a front elevational view of the first lens-group unit, viewed from the object side.

An imaginary plane on which the first optical axis O1, the second optical axis O2 and the third optical axis O3 lie is represented by a reference plane (first reference plane) P1 (see FIGS. 10, 12, 14 and 15). An imaginary plane which is orthogonal to the first reference plane P1 and on which the first optical axis O1 lies is represented by a reference plane (second reference plane) P2 (see FIGS. 7, 10, 12 and 16 through 18). In addition, when four quadrants V1, V2, V3 and V4, divided from each other by the first reference plane P1 and the second reference plane P2, are determined with respect to a front view as shown in FIG. 12, the first quadrant V1 and the fourth quadrant V4 are positioned on the side of the second reference plane P2 (the right side of the second reference plane P2) toward the light-ray traveling direction along the second optical axis O2 upon the light rays being reflected by the first prism L11, while the second quadrant V2 and the third quadrant V3 are positioned on the opposite side (the left side of the second reference plane P2) of the second reference plane P2 from the first quadrant V1 and the fourth quadrant V4.

Figure 5:
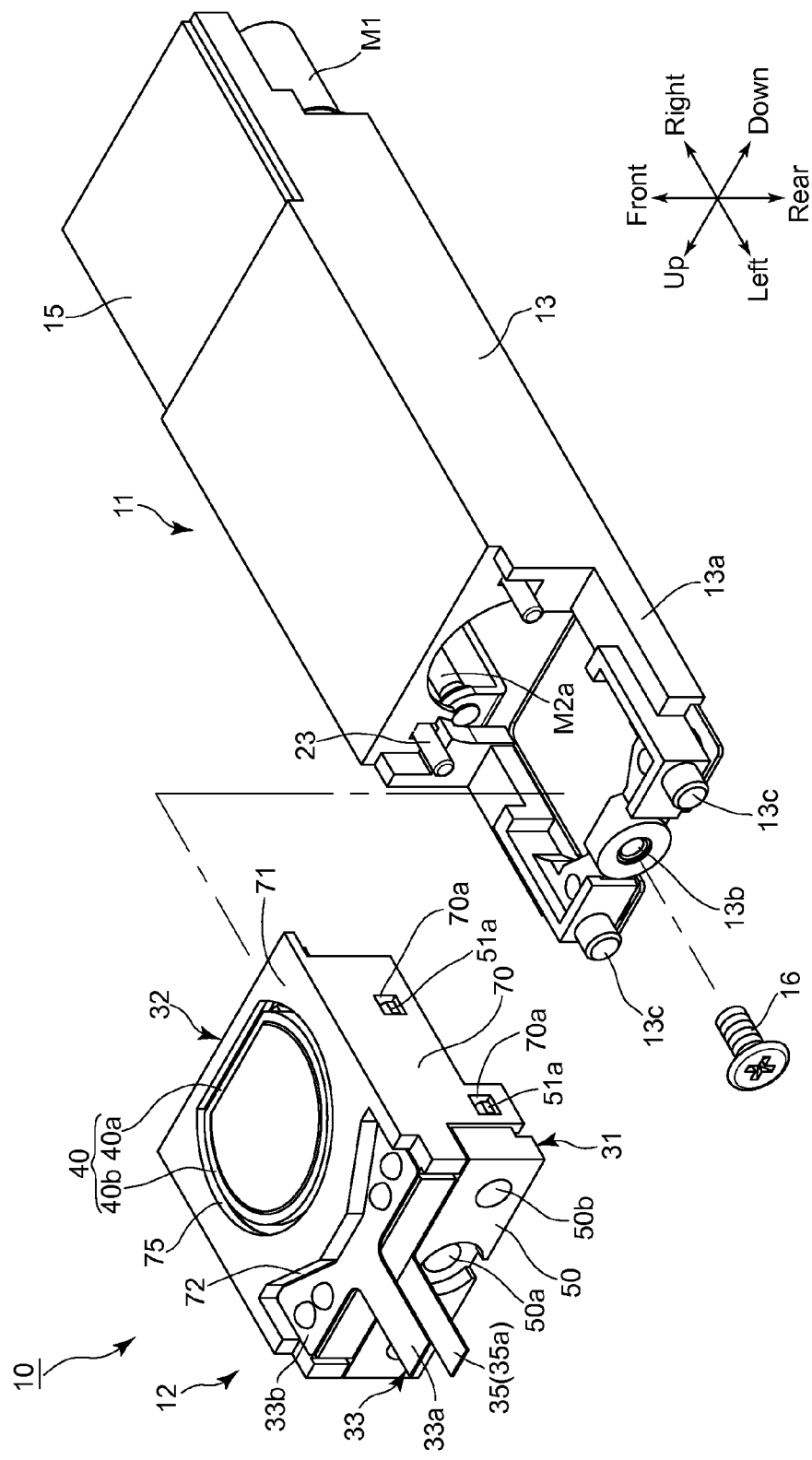
FIG. 5 is an exploded perspective view of the imaging unit, illustrating a state where a body module and a first lens-group unit, which are components of the imaging unit, are separated from each other.
Figure 6:
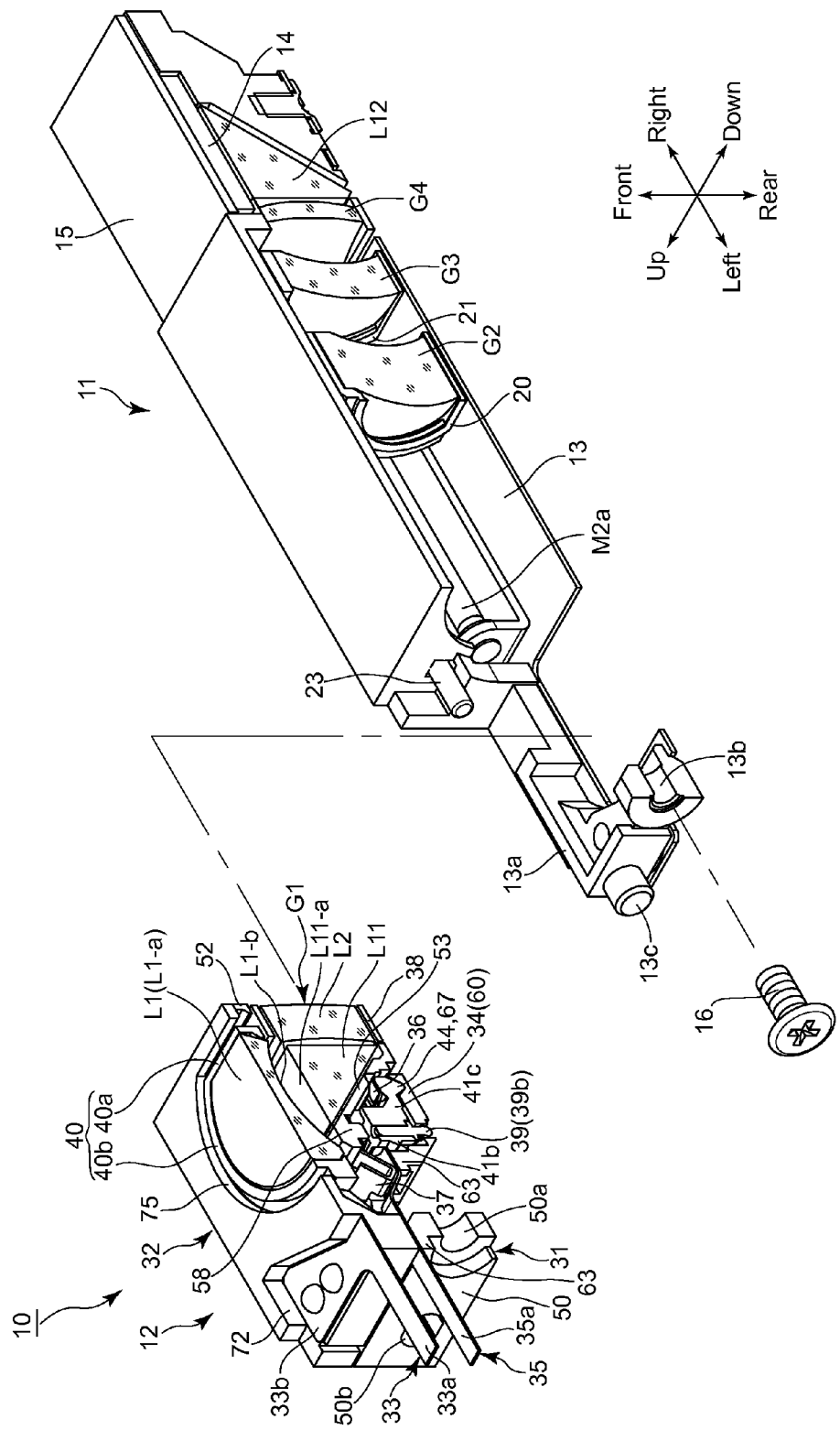
FIG. 6 is an exploded perspective cut view of the imaging unit shown in FIG. 5, illustrating a state where the body module and the first lens-group unit are separated from each other and cut along a plane including the first optical axis, the second optical axis and the third optical axis.

As shown in FIGS. 5 and 6, the imaging unit 10 is provided with a body module 11 which holds the second lens group G2, the third lens group G3, the fourth lens group G4, the second prism L12 and the image sensor (image pickup device) 14, and a first lens-group unit 12 which holds the first lens group G1. The body module 11 is provided with a box-shaped housing 13 which is elongated in the leftward/rightward direction and has a small thickness (slim) in the forward/rearward direction. The first lens-group unit 12 is fixed to one end (the left end), with respect to the lengthwise direction, of the housing 13, and the fourth lens group G4 and the second prism L12 are fixedly held at the other end (the right end), with respect to the lengthwise direction, of the housing 13. The image sensor 14, which is positioned immediately in front of the second prism L12, is fixedly mounted to an image sensor substrate 15 which is fixed to the housing 13.

Figure 3:
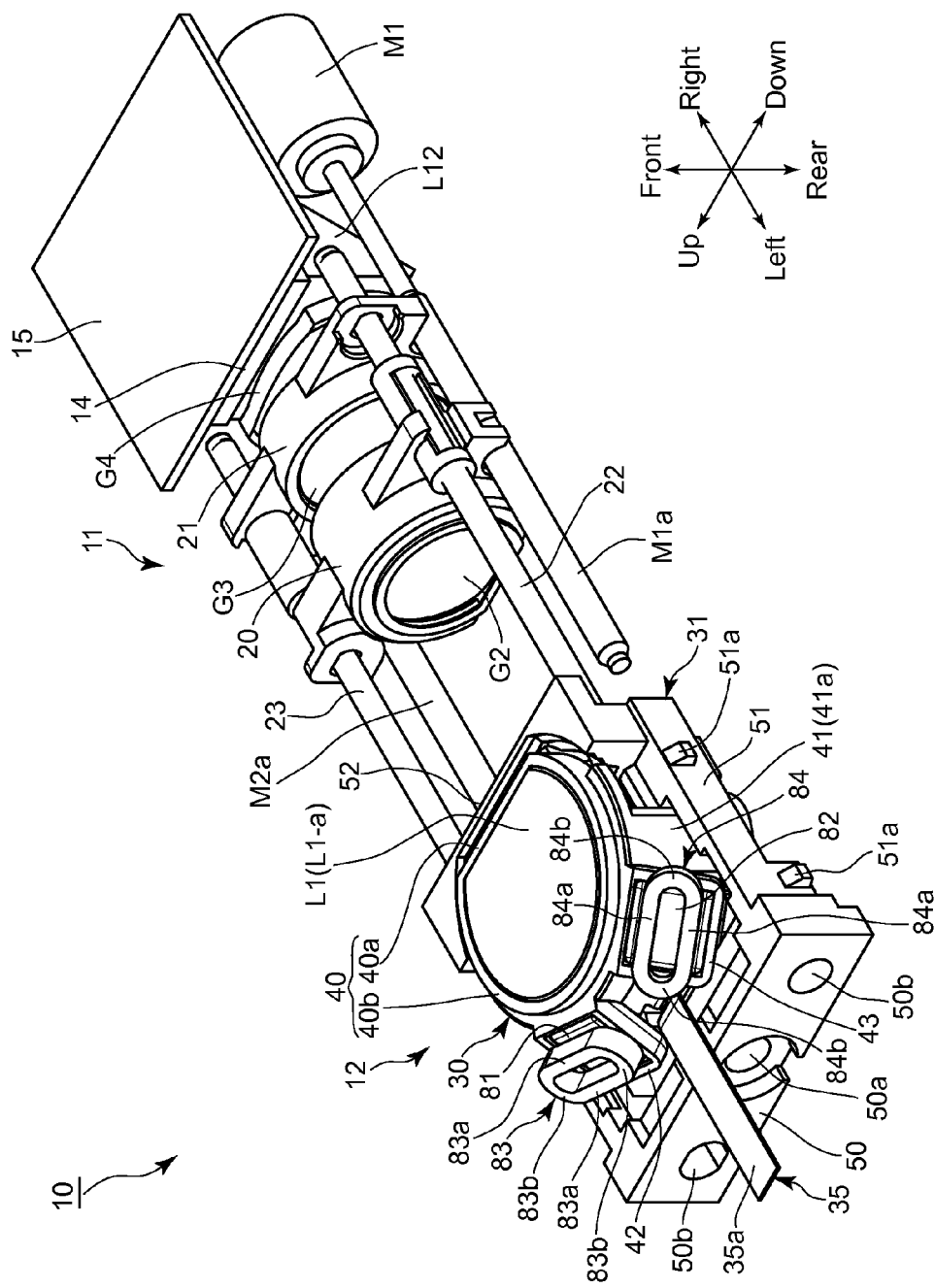
FIG. 3 is a perspective view of the imaging unit with the housing removed, illustrating the internal structure thereof.
Figure 4:
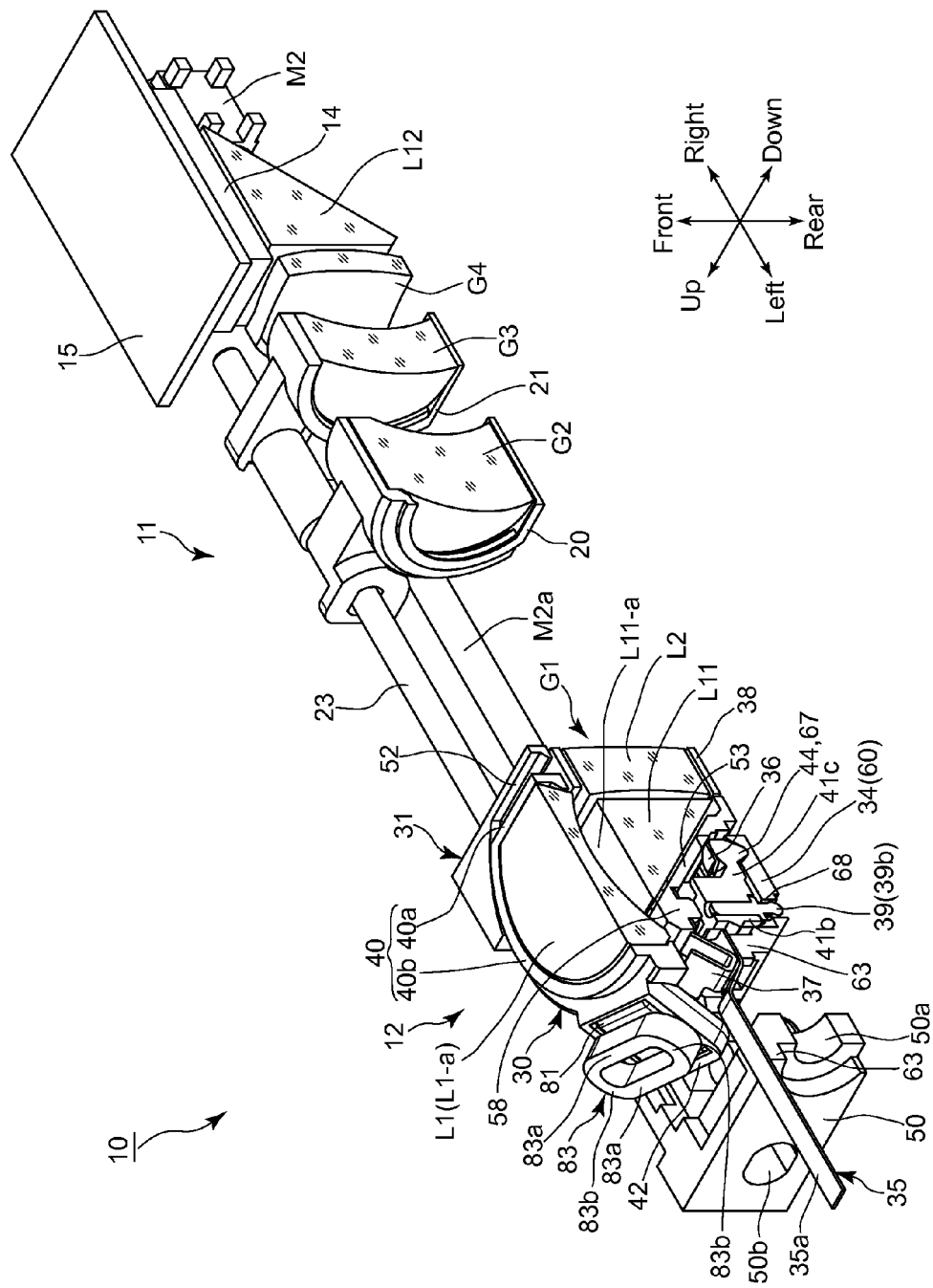
FIG. 4 is a perspective cut view of the internal structure of the imaging unit shown in FIG. 3, cut along a plane including the first optical axis, the second optical axis and the third optical axis.

As shown in FIGS. 3 and 4, the second lens group G2 and the third lens group G3 are held by a second lens group frame 20 and a third lens group frame 21, respectively, which are supported to be movable along the second optical axis O2 by a pair of rods 22 and 23 provided in the housing 13. The imaging unit 10 is provided with a first motor M1 (see FIGS. 1, 3 and 5) and a second motor M2 (see FIG. 4) that are supported by the housing 13. When the first motor M1 is driven to rotate a screw shaft M1a thereof which projects from the body of the first motor M1, this rotation is transmitted to the second lens group frame 20 to move the second lens group frame 20 along the pair of rods 22 and 23. When the second motor M2 is driven to rotate a screw shaft M2a thereof which projects from the body of the second motor M2, this rotation is transmitted to the third lens group frame 21 to move the third lens group frame 21 along the pair of rods 22 and 23. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an image-stabilizing (image shake correction/shake reduction) system that reduces image shake on an image plane which is caused by vibrations such as hand shake. This image-stabilizing system causes the first lens element L1 of the first lens group G1 to spherically swing along an imaginary spherical surface about a spherical-swinging center A1 (see FIGS. 13 and 16 through 18) which is positioned on a straight line extended from the first optical axis O1. This swinging operation of the first lens element L1 along the imaginary spherical surface about the spherical-swinging center A1 will be hereinafter referred to as the spherical swinging operation. The first optical axis O1 in the drawings of the present embodiment denotes the position of the first optical axis O1 in a state where the first lens element L1 is positioned at an initial optical-design position of the first lens element L1 when no image shake correction operation is performed (i.e., at the center of the driving range thereof in the spherical swinging operation by the image-stabilizing system). This state will be hereinafter referred to as the image-stabilizing initial state. The optical axis of the first lens element L1 in a state where the spherical swinging operation has been performed from the image-stabilizing initial state is designated by O1' in FIGS. 15, 17 and 18. Additionally, a third reference plane P3 which passes through the spherical-swinging center A1 and is orthogonal to the first optical axis O1 is shown in FIGS. 13 through 18 and 23.

The incident surface L1-a and the exit surface L1-b of the first lens element L1 face toward the object side and the first prism L11, respectively, and the first lens element L1 has a D-cut shape that is formed (defined) with a portion of the outer edge (circular edge with its center on the first optical axis O1) of the first lens element L1 which is positioned in the first quadrant V1 and the fourth quadrant V4 cut out along a plane extending in the upward/downward direction (i.e., the edge of the cut-out portion appears as a straight line that is substantially orthogonal the second optical axis O2 when viewed from the front side (from the object side)) as shown in FIG. 12. Specific conditions for the shape of the first lens element L1 will be discussed in detail later.

Figure 8:
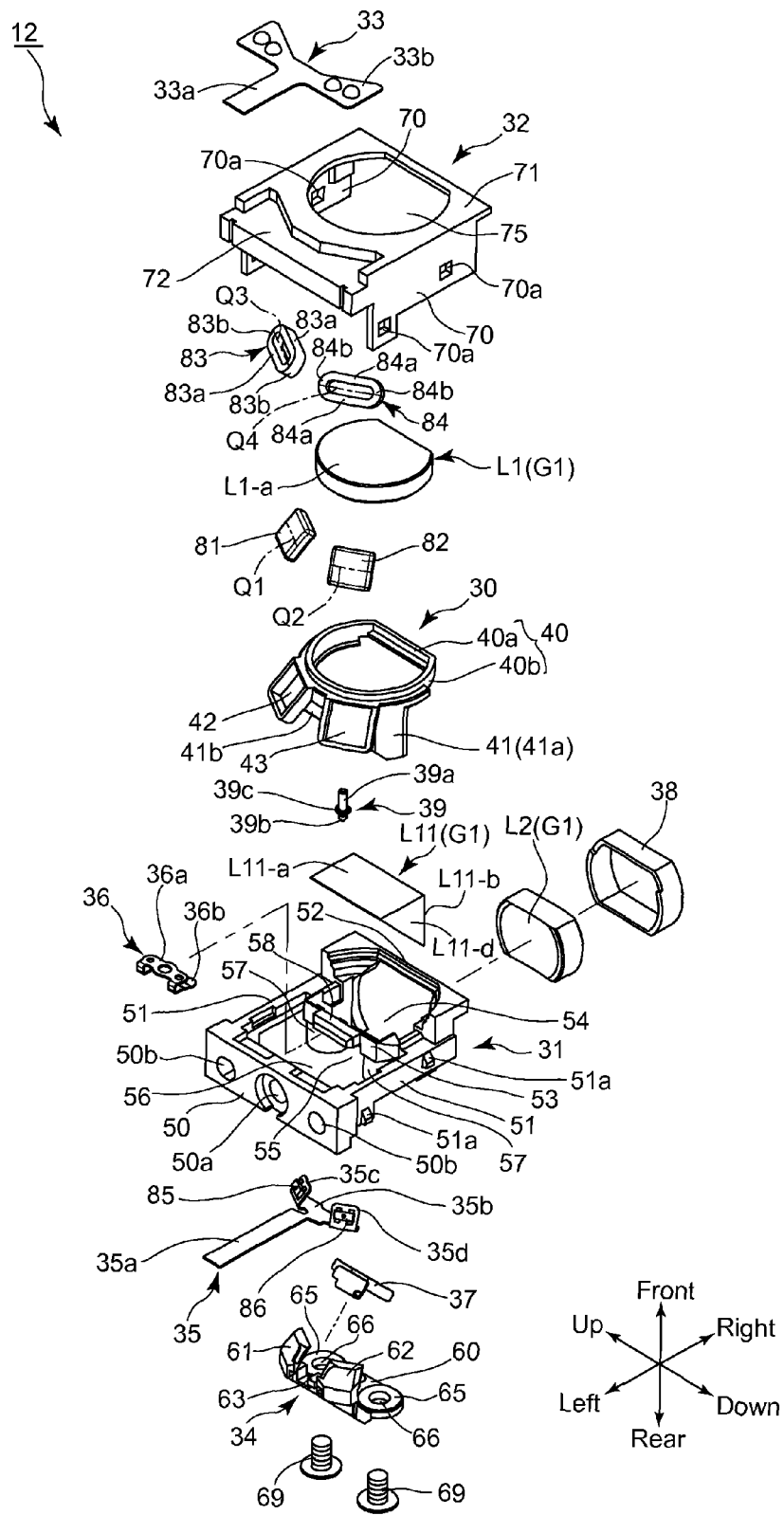
FIG. 8 is an exploded perspective view of the first lens-group unit of the imaging unit.

As shown in FIG. 8, the first lens-group unit 12 is provided with a first lens frame (movable frame) 30 which holds the first lens element L1, a base member (support member) 31 which holds the first prism L11, and a cover member (support member) 32 which covers the first lens frame 30 and the base member 31 from the front. The first lens-group unit 12 is further provided with a coil connecting board 33, a sensor holder (support member) 34, a sensor support board 35, a leaf spring 36, a sensor fixing plate 37, a second lens frame 38 which holds the second lens element L2, and a pivot guide 39. In addition, the first lens-group unit 12 is provided with a pair of permanent magnets 81 and 82 and a pair of coils 83 and 84 which constitute an electromagnetic actuator for driving the first lens frame 30 (the first lens element L1), and is further provided with a pair of Hall sensors 85 and 86 for detecting the position of the first lens frame 30 (the first lens element L1) that is controlled by the electromagnetic actuator. In each of FIGS. 13 and 23, the position of a cross section taken along the line XIII-XIII shown in FIG. 12 that passes through the permanent magnet 81 and the coil 83, and the position of a cross section taken along the line XIII'-XIII' shown in FIG. 12 that passes through the permanent magnet 82 and the coil 84 are shown altogether; furthermore, the elements included in the cross section along the line XIII'-XIII' are designated by parenthesized reference characters to be distinguished from those included in the cross section along the line XIII-XIII. As can be perceived from FIGS. 13 and 23 (and upon referring to FIG. 12), these two cross sectional positions are substantially symmetrical to the first reference plane P1.

As shown in FIGS. 8, 12, 13, 22 and 23, each of the permanent magnets 81 and 82 is in the shape of a flat rectangular cuboid, and the permanent magnets 81 and 82 are substantially identical in shape and size to each other. As shown in FIGS. 8, 12, 13, 22 and 23, the coil 83 is an air-core coil which includes a pair of linear portions 83a that are substantially parallel to each other and a pair of curved (U-shaped) portions 83b which connect the pair of linear portions 83a at the respective ends thereof. In addition, the coil 83 is a flat coil which is small in thickness in the direction through the air-core of the coil 83 compared with the size of the coil 83 in the lengthwise direction thereof, in which the pair of linear portions 83a extend, and the size of the coil 83 in the widthwise direction thereof, in which the pair of linear portions 83a traverse. Likewise, the coil 84 is an air-core coil which includes a pair of linear portions 84a that are substantially parallel to each other and a pair of curved (U-shaped) portions 84b which connect the pair of linear portions 84a at the respective ends thereof. In addition, the coil 84 is a flat coil which is small in thickness in the direction through the air-core of the coil 84 compared with the size of the coil 84 in the lengthwise direction thereof, in which the pair of linear portions 84a extend, and the size of the coil 84 in the widthwise direction thereof, in which the pair of linear portions 84a traverse. The coils 83 and 84 are substantially identical in shape and size to each other.

The first lens frame 30 is provided with a lens holding portion 40, a support portion 41 and a pair of magnet holding portions 42 and 43. The lens holding portion 40 is in the shape of a lens frame, and the first lens element L1 is fixedly fitted into the lens holding portion 40. The support portion 41 extends rearward from the lens holding portion 40, and the pair of magnet holding portions 42 and 43 are connected to the outer periphery of the lens holding portion 40. A portion of the outer edge of the lens holding portion 40 which is positioned in the first quadrant V1 and the fourth quadrant V4 is cut out along a plane parallel to the second reference plane P2 to be formed into a linear-cut portion 40a to correspond in outer profile of the first lens element L1. The other portion of the outer edge of the lens holding portion 40 is formed into a circular frame portion 40b, so that the lens holding portion 40 is in the shape of an imperfect circular frame.

Figure 13:
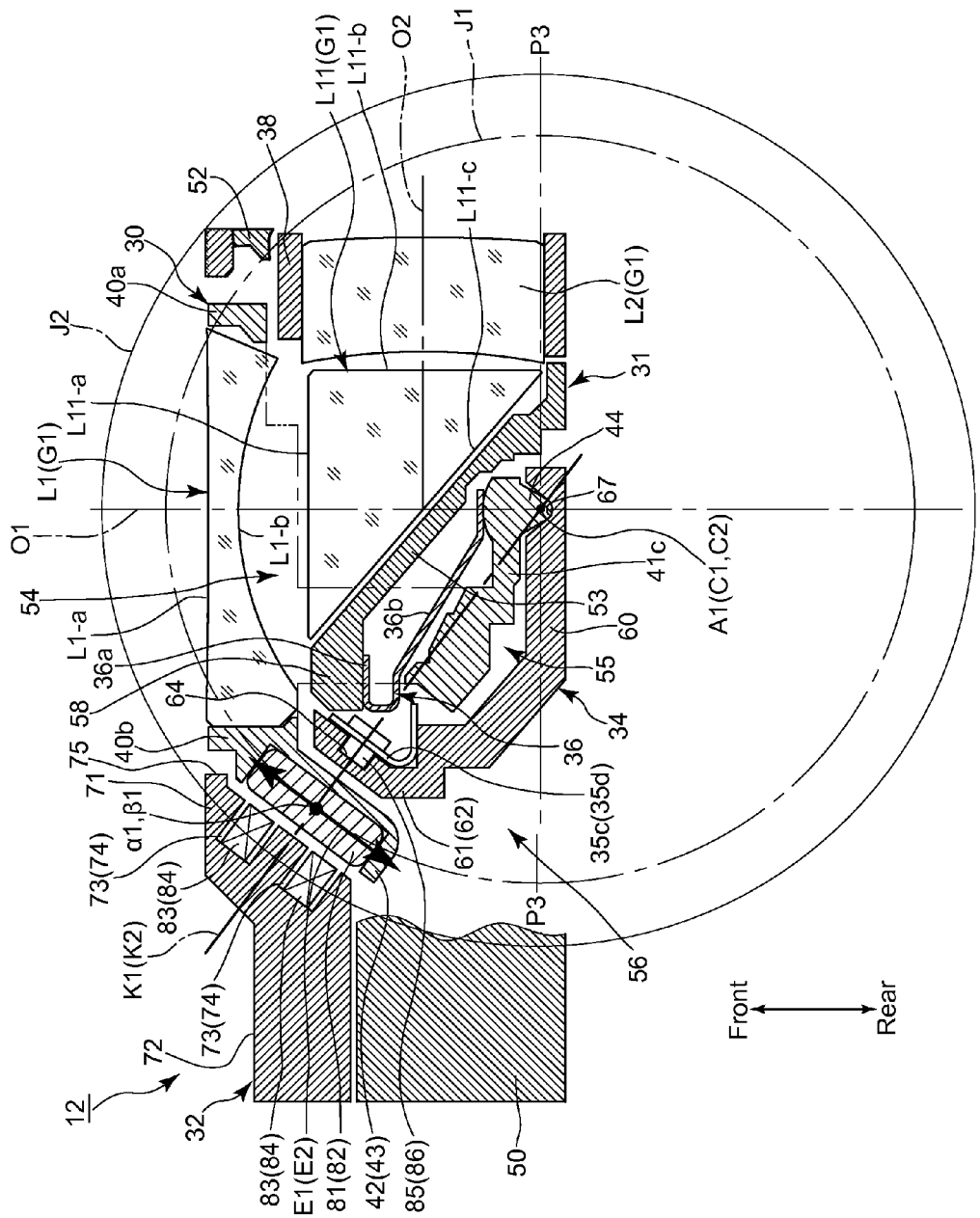
FIG. 13 is a sectional view of the first lens-group unit, taken along the line XIII-XIII or XIII'-XIII' shown in FIG. 12.
Figure 14:
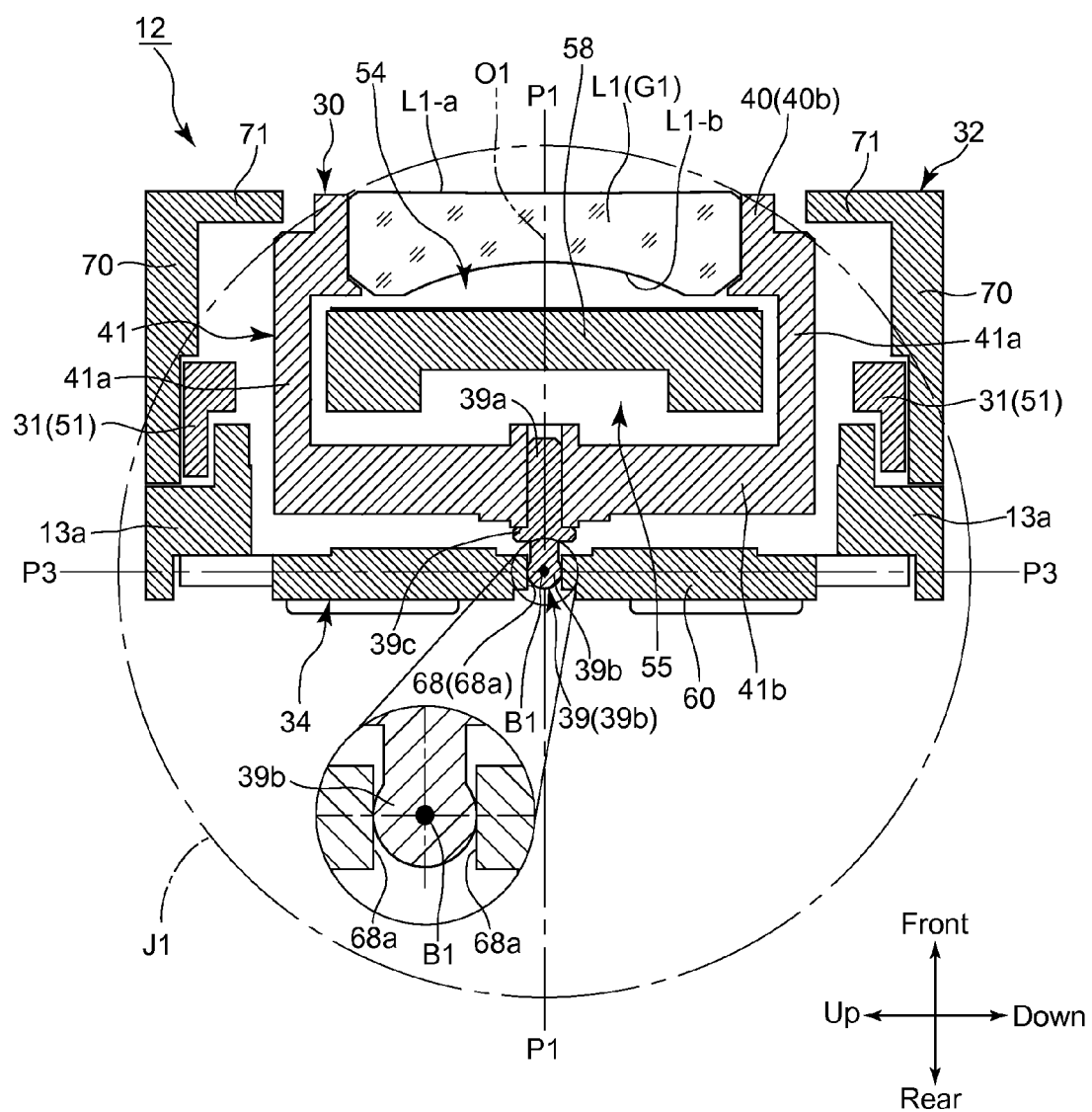
FIG. 14 is a sectional view of the first lens-group unit, taken along the line XIV-XIV shown in FIG. 12.
Figure 15:
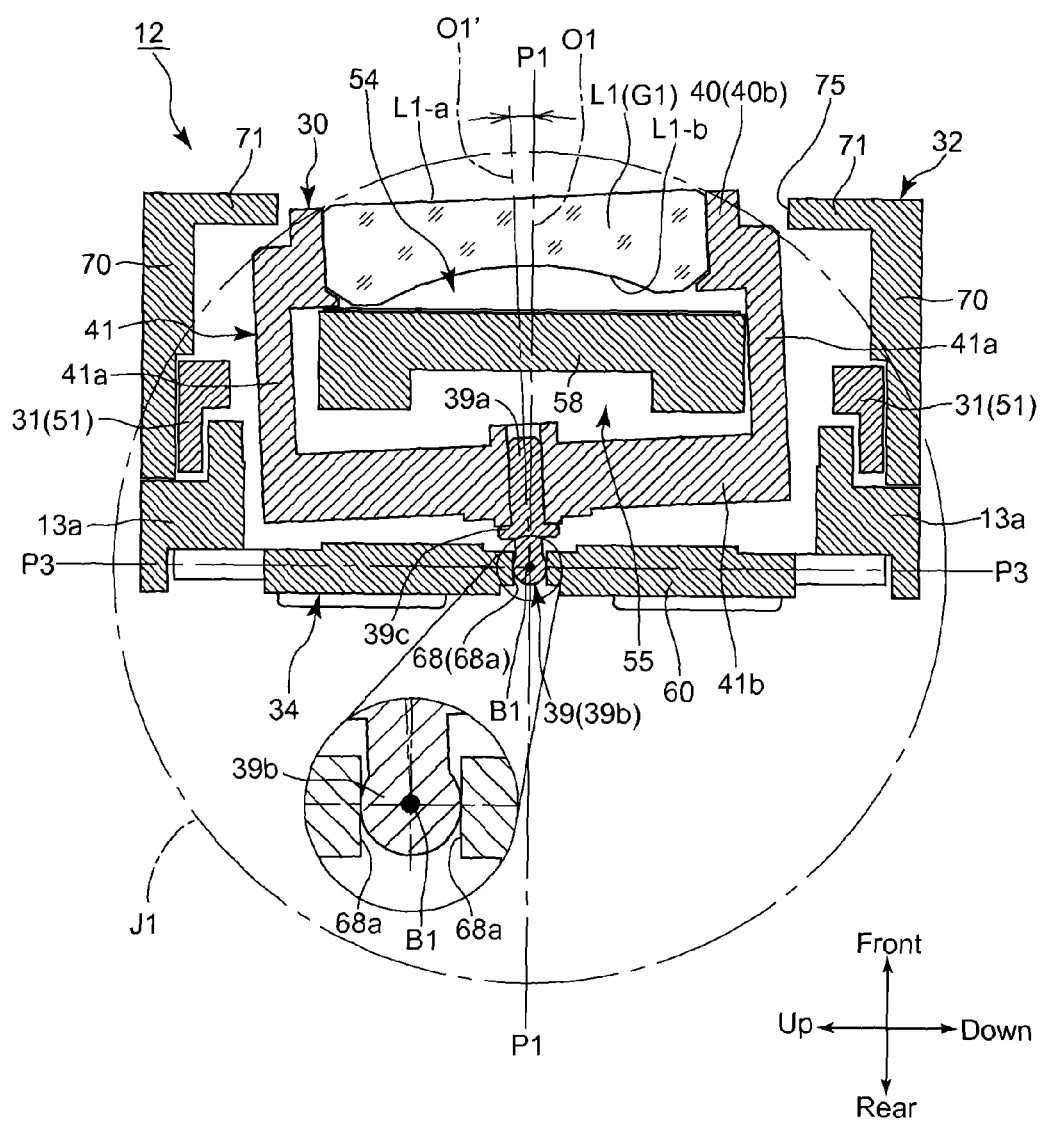
FIG. 15 is a sectional view of the first lens-group unit, taken along the line XIV-XIV shown in FIG. 12 in a state where the first lens frame has been made to swing about the spherical-swinging center of the first lens frame.
Figure 16:
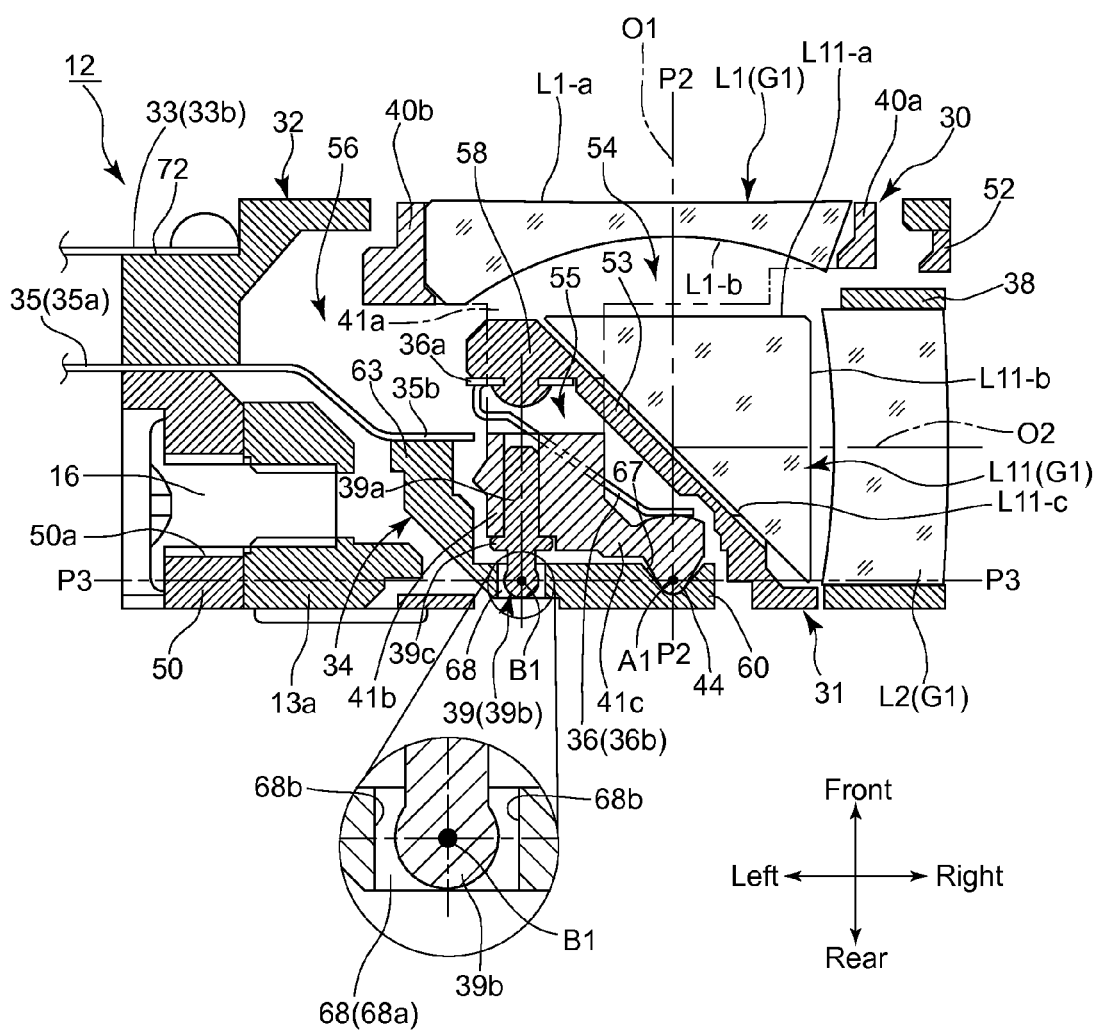
FIG. 16 is a sectional view of the first lens-group unit, taken along the line XVI-XVI shown in FIG. 12.
Figure 17:
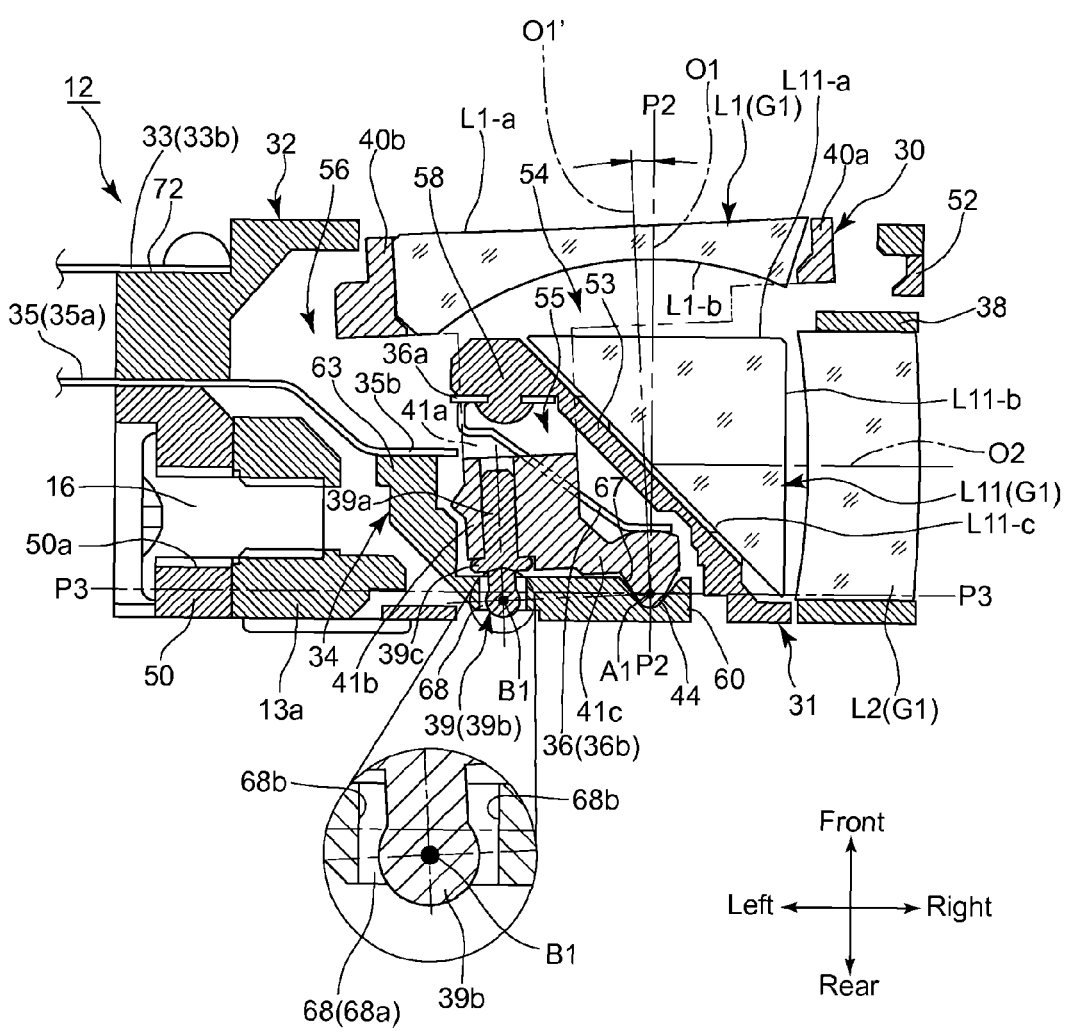
FIG. 17 is a sectional view of the first lens-group unit, taken along the line XVI-XVI shown in FIG. 12 in a state where the first lens frame has been made to swing about the spherical swinging center.
Figure 18:
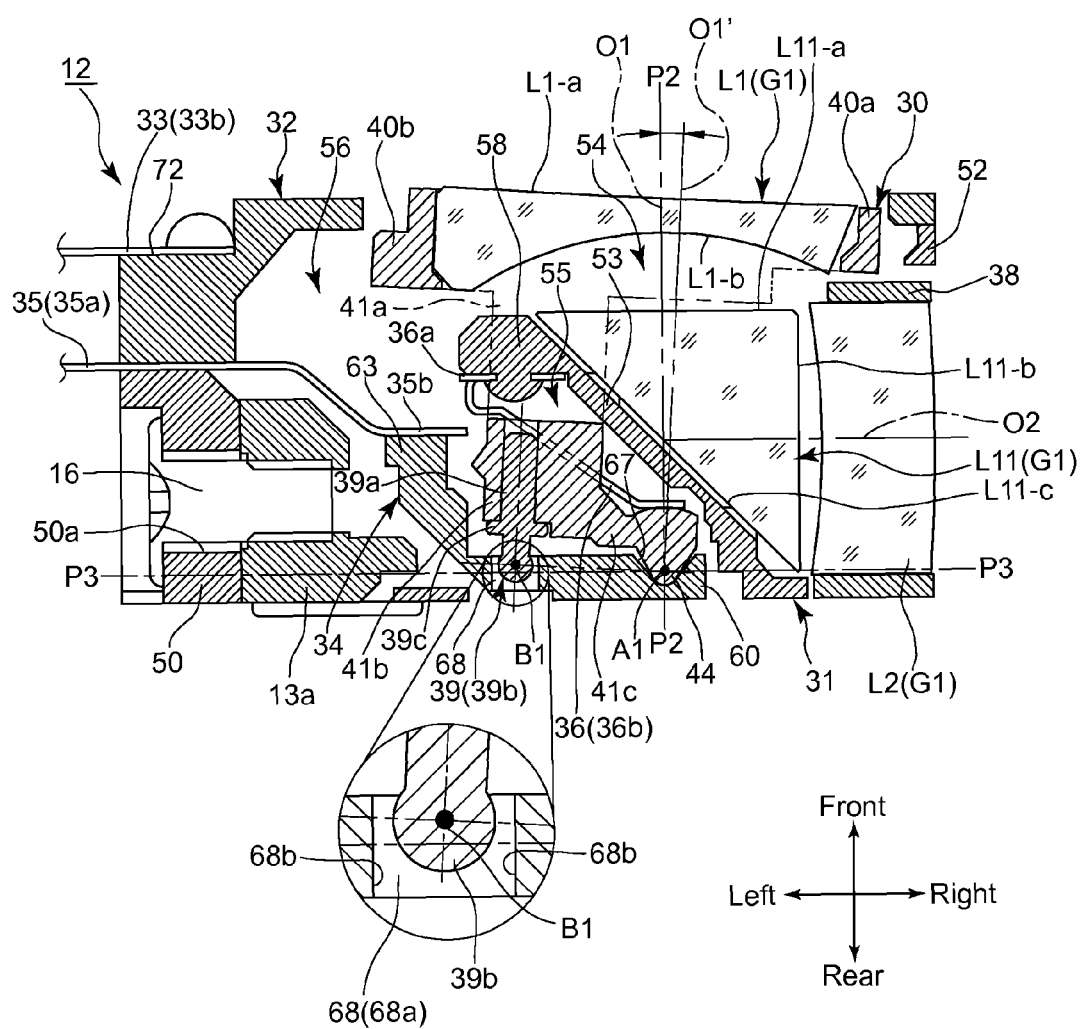
FIG. 18 is a sectional view of the first lens-group unit, taken along the line XVI-XVI shown in FIG. 12 in a state where the first lens frame has been made to swing about the spherical swinging center in the opposite direction from the direction in the case of FIG. 17.

As shown in FIGS. 14 and 15, the support portion 41 of the first lens frame 30 is provided with a pair of leg portions 41a which are spaced from each other in the upward/downward direction (in a circumferential direction about the first optical axis O1) and a connecting portion 41b which extends in the upward/downward direction. The pair of leg portions 41a project rearward from the circular frame portion 40b of the lens holding portion 40, and the rear ends of the pair of leg portions 41a are connected via the connecting portion 41b (see FIG. 14). As shown in FIGS. 16 through 18, the pair of leg portions 41a and the connecting portion 41b are positioned on the opposite side of the second reference plane P2 (the left side of the second reference plane P2) from the side on which the second optical axis O2 extends, and a cantilever pivot arm 41c projects from the connecting portion 41b in a direction to approach the second reference plane P2 (the first optical axis O1). A pivot projection (an element of a support mechanism for the movable frame) 44 is formed at the free end of the pivot arm 41c. As shown in FIGS. 11, 13 and 16 through 18, the pivot projection 44 is conical in shape which tapers in the rearward direction, i.e., reducing in diameter in the rearward direction, and the end of the pivot projection 44 is shaped into a smooth spherical ball (spherical tip).

The pivot guide 39 is provided at the end (rear end) of a columnar base 39a thereof with a spherical guide projection 39b and is provided with a flange 39c, which is greater in diameter than the guide projection 39b, between the base 39a and the guide projection 39b. As shown in FIGS. 11 and 14 through 18, the base 39a of the pivot guide 39 is inserted into a hole from behind, which is formed in the connecting portion 41b of the support portion 41 of the first lens frame 30, and the flange 39c is made to contact the connecting portion 41b to thereby define the inserted position of the base 39a relative to the connecting portion 41b (the support portion 41). In this state, the guide projection 39b projects rearward from the support portion 41.

Figure 22:
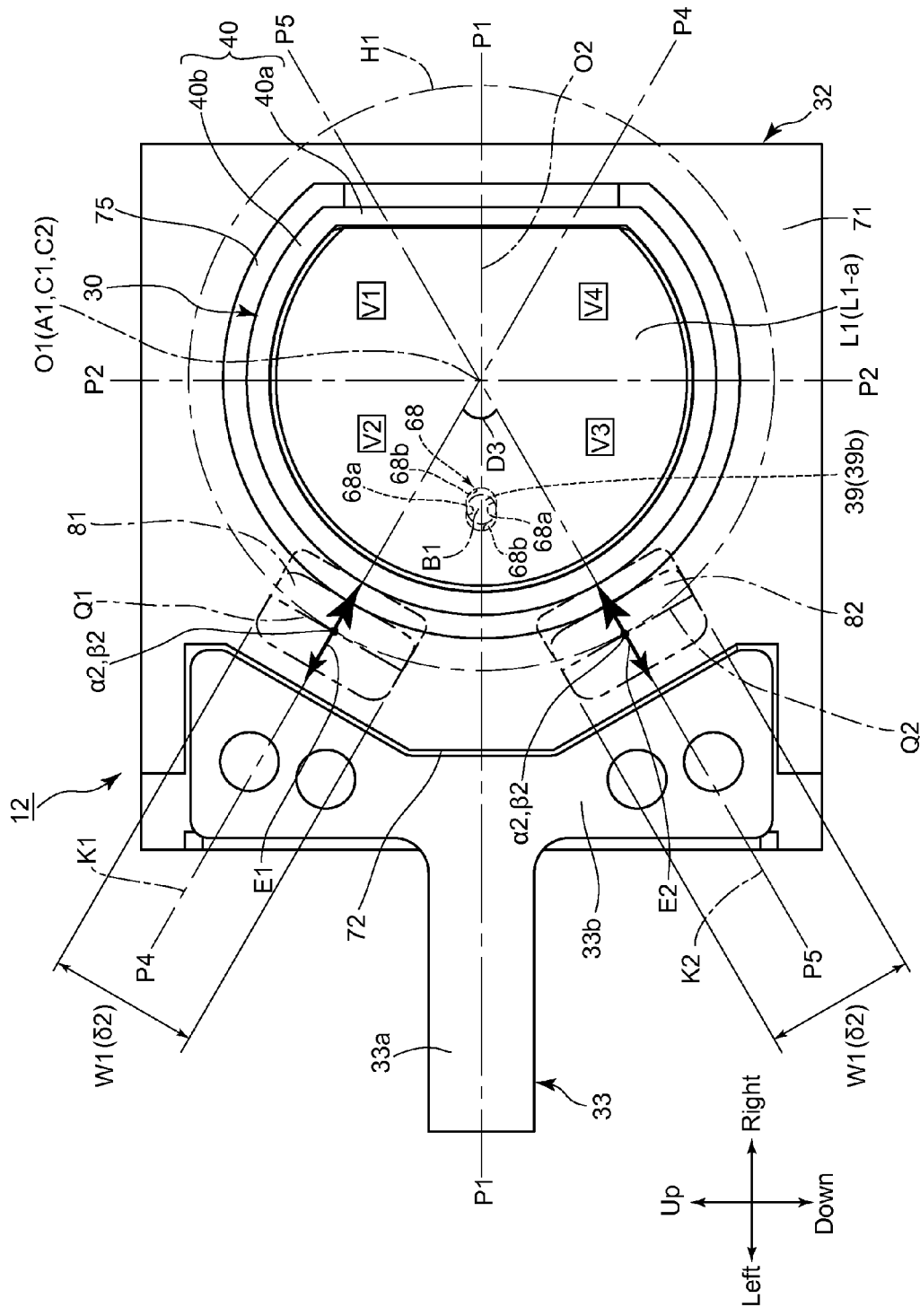
FIG. 22 is a view similar to that of FIG. 12, showing the first lens-group unit with the coils removed.

As shown in FIG. 13, the pair of magnet holding portions 42 and 43 of the first lens frame 30 are formed to project obliquely rearward from the circular frame portion 40b to be inclined so that the distance from the first optical axis O1 to each of the magnet holding portions 42 and 43 increases with respect to a the direction toward the outer ends of the magnet holding portions 42 and 43 (i.e., in a direction away from the circular frame portion 40b). In a state where the first lens frame 30 is in the image-stabilizing initial state, in which the first lens element L1 is positioned at the center of the driving range thereof by the image-stabilizing system (i.e., at an initial optical-design position of the first lens element L1 when no image shake correction operation is performed), the magnet holding portions 42 and 43 are positioned in the second quadrant V2 and the third quadrant V3 to be substantially symmetrical with respect to the first reference plane P1. The permanent magnet 81 is fitted into and held by a recess formed in the magnet holding portion 42, and the permanent magnet 82 is fitted into and held by a recess formed in the magnet holding portion 43. Accordingly, as shown in FIGS. 12 and 22, the permanent magnet 81 is positioned in the second quadrant V2 and the permanent magnet 82 is positioned in the third quadrant V3.

The base member 31 is a frame-like member which is substantially rectangular in outer shape as viewed from front. The base member 31 is provided with a pair of side walls 51 which are spaced from each other in the upward/downward direction and project rightward from a mounting portion 50, which constitutes the left end portion of the base member 31. The base member 31 is further provided with a front bridging portion 52, which connects the front sides of the right ends of the pair of side walls 51, and a prism holding wall 53 which connects middle portions of the pair of side walls 51. As shown in FIGS. 11, 13 and 16 through 18, the prism holding wall 53 has a shape extending along the reflection surface L11-c of the first prism L11 and constitutes an inclined wall which projects progressively forward in the direction from the right end side of the first lens-group unit 12, on which the second lens element L2 is positioned, to the left end side of the first lens-group unit 12, on which the mounting portion 50 is provided. As shown in FIGS. 13 through 18, in the base member 31, an optical path space 54 is formed in front of the prism holding wall 53, and a rear space 55 is formed behind the prism holding wall 53. In addition, a side space 56 which is communicatively connected with the rear space 55 is formed between the mounting portion 50 and the prism holding wall 53. The optical path space 54 is open at the front side and the right end side of the base member 31 with the front bridging portion 52 as a border.

The first prism L11 is fixedly fitted into the optical path space 54 of the base member 31. The first prism L11 is provided with the reflection surface L11-c which is positioned at an angle of substantially 45 degrees with respect to the incident surface L11-a and the exit surface L11-b, and a pair of side surfaces L11-d (only one of which is shown in FIG. 8) which are substantially orthogonal to both the incident surface L11-a and the exit surface L11-b. The position of the first prism L11 in the optical path space 54 is defined by the back side (underside) of the reflection surface L11-c being held by the prism holding wall 53 and by the pair of side surfaces L11-d being sandwiched between the pair of side walls 51. In this supported state of the first prism L11, the incident surface L11-a is positioned on the first optical axis O1 and faces forward, and the exit surface L11-b is positioned on the second optical axis O2 and faces rightward. Additionally, the second lens frame 38 that holds the second lens element L2 is fixedly installed in the optical path space 54 of the base member 31 to be positioned on the right-hand side of the first prism L11 (behind the front bridging portion 52).

The base member 31 is provided, in the rear of the prism holding wall 53, with a pair of cylindrical support seats 57 (see FIG. 8) which are formed as mounts for the sensor holder 34 at different positions in the upward/downward directions. A screw hole (not shown) which opens at the rear is formed in each support seat 57. The base member 31 is further provided at the left end of the prism holding wall 53 with a spring support 58 which serves as a mount to which the leaf spring 36 is mounted.

As shown in FIGS. 13 and 16 through 18, the leaf spring 36 is arranged behind and along the prism holding wall 53 of the base member 31. The leaf spring 36 is provided with a mounting plate 36a in which a through-hole is formed and a resilient arm 36b which is formed into a cantilever extending from the mounting plate 36a. The leaf spring 36 is supported by the base member 31 by fitting the through-hole of the mounting plate 36a onto a projection formed on the spring support 58. In this supported state of the leaf spring 36, the resilient arm 36b can be resiliently deformed in the rear space 55 that is formed behind the prism holding wall 53.

Figure 9:
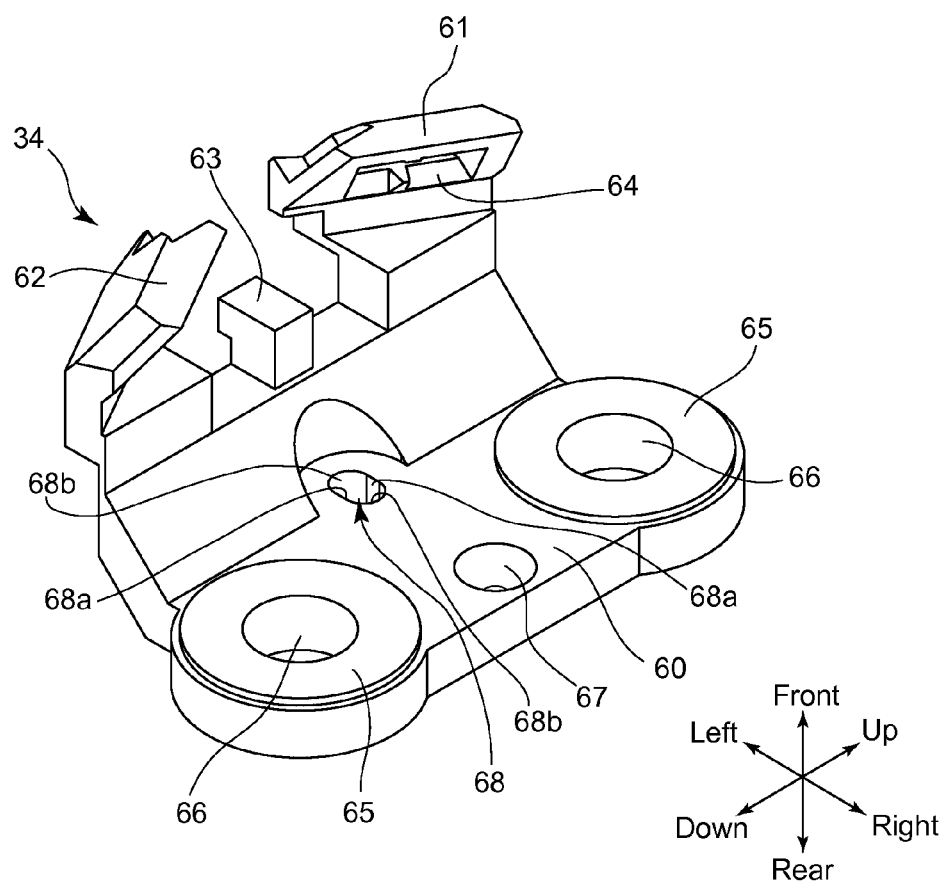
FIG. 9 is a perspective view of a sensor holder shown in FIG. 8 that constitutes an element of the first lens-group unit.
Figure 10:
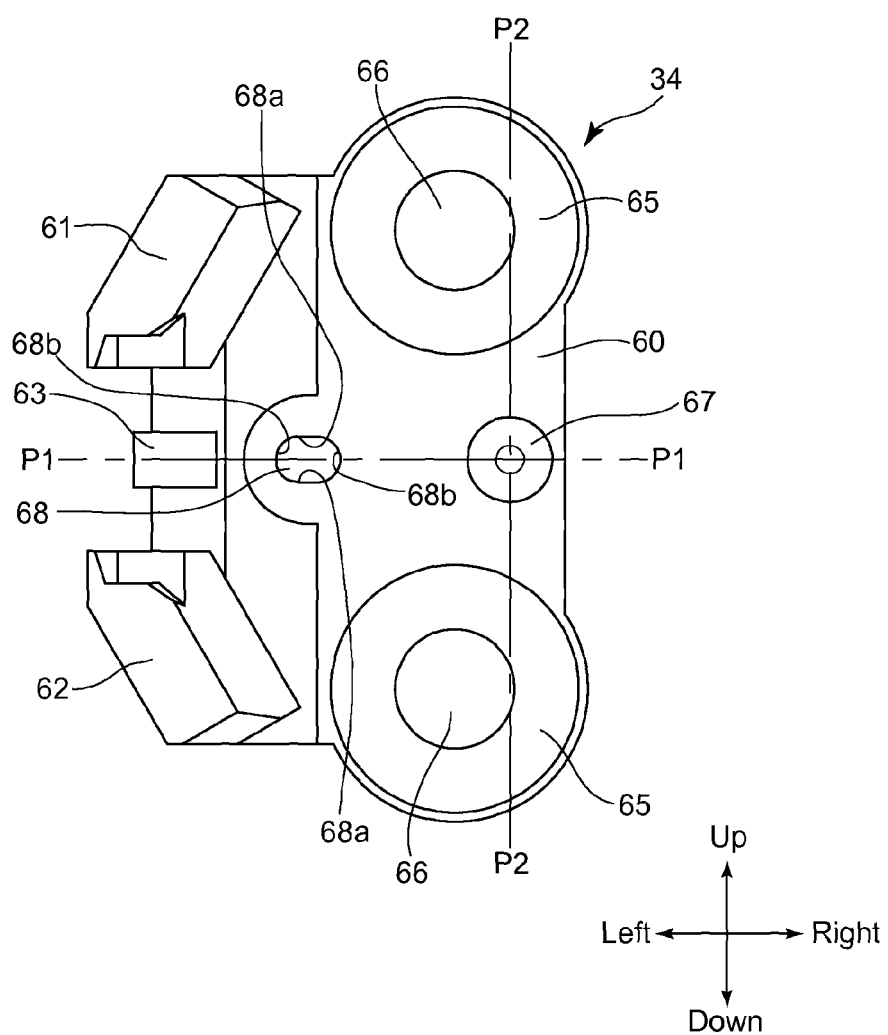
FIG. 10 is a front elevational view of the sensor holder, viewed from the object side.
Figure 11:
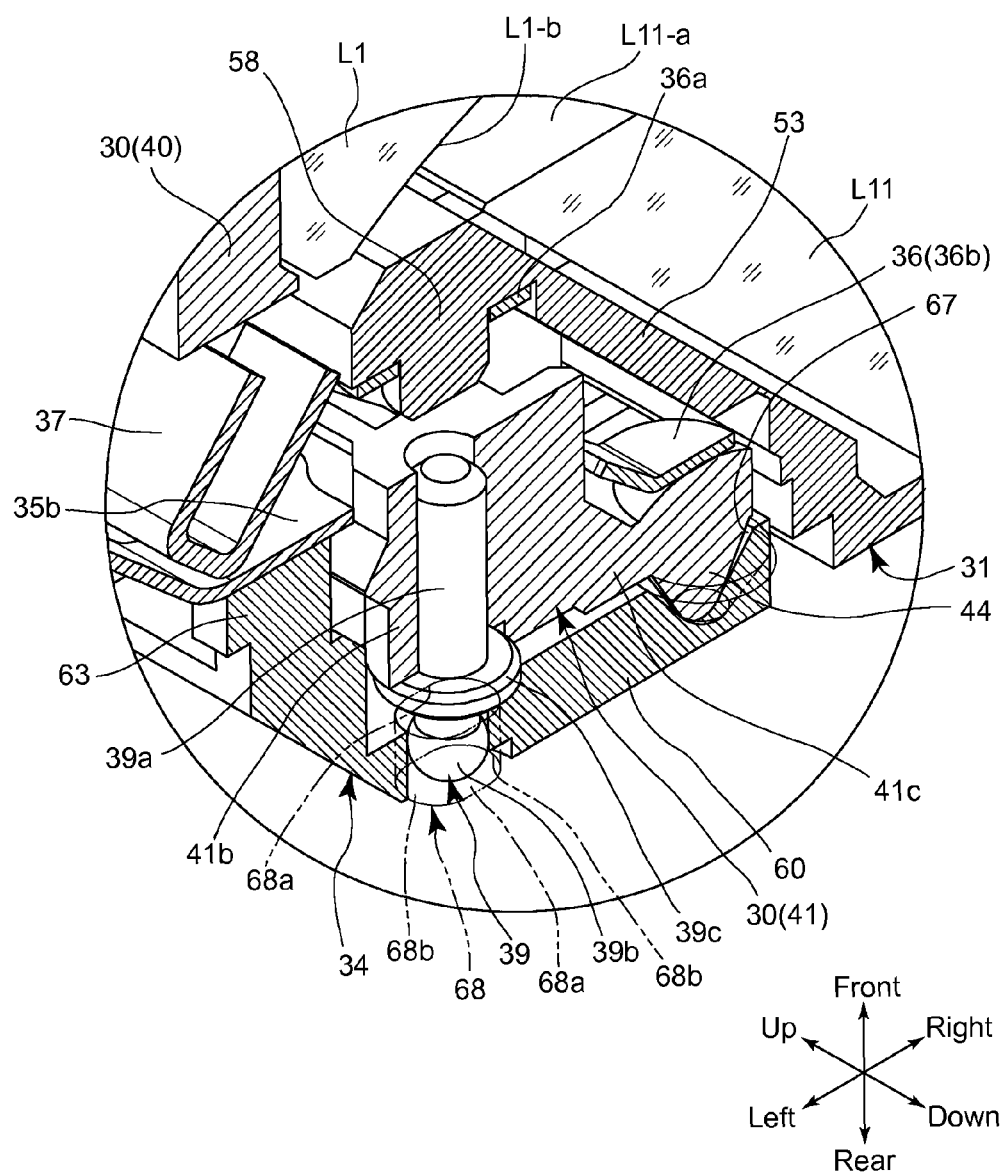
FIG. 11 is a perspective sectional view of part of a support mechanism for the first lens element of the first lens-group unit, taken along a plane including the first optical axis and the second optical axis.

As shown in FIGS. 9 and 10, the sensor holder 34 is provided with a base plate portion 60, a pair of sensor support projections 61 and 62 and a base plate support projection 63. Each of the pair of sensor support projections 61 and 62 is formed on the base plate portion 60 to project like an upright wall, and the base plate support projection 63 projects forward from the base plate portion 60 to be positioned between the pair of sensor support projections 61 and 62. As shown in FIG. 13 that shows the assembled state of the first lens-group unit 12, the pair of sensor support projections 61 and 62 project obliquely forward from the base plate portion 60 so as to face the magnet holding portions 42 and 43 of the first lens frame 30, respectively. A sensor insertion recess 64 is formed in each of the sensor supporting projections 61 and 62. The base plate support projection 63 is formed as a small (low) projection which projects from the base plate portion 60 by a smaller amount of projection than the sensor support projections 61 and 62.

The sensor support board 35 is a flexible board and provided with, at an end of a narrow strip portion 35a thereof, a support sheet portion 35b having the shape of a thin flat plate as shown in FIG. 8. The sensor support board 35 is further provided on both sides of the strip portion 35a with a pair of sensor support lugs 35c and 35d which are formed so that the support sheet portion 35b are partly bent and raised. The Hall sensor 85 and the Hall sensor 86 are mounted to and supported by the sensor support lug 35c and the sensor support lug 35d, respectively. The sensor support board 35 is fixed to the sensor holder 34 using the sensor fixing plate 37 by making the support sheet portion 35b supported by the base plate support projection 63 (see FIGS. 7, 11 and 16 through 18) and by inserting the Hall sensors 85 and 86, which are respectively mounted on the sensor support lugs 35c and 35d, into the sensor insertion recesses 64, which are formed in the pair of sensor support projections 61 and 62 (see FIG. 13). The strip portion 35a of the sensor support board 35 is electrically connected to a control circuit (not shown) which controls the operation of the imaging unit 10 so that information on the outputs of the Hall sensors 85 and 86 is transmitted to the control circuit via the sensor support board 35.

As shown in FIGS. 9 and 10, the sensor holder 34 is provided on the base plate portion 60 with a pair of ring-shaped abutting portions 65, a pair of screw insertion holes 66, a pivot recess (a member of the support structure for the movable frame) 67 and a rotation prevention hole 68. The pair of ring-shaped abutting portions 65 abut against the ends of the pair of support seats 57 of the base member 31. The pair of screw insertion holes 66 are formed at the centers of the pair of ring-shaped abutting portions 65, respectively. The pivot recess 67 and the rotation prevention hole 68 are formed between the pair of abutting portions 65. As shown in FIGS. 9 through 11, 13 and 16 through 18, the pivot recess 67 is a recess having a mortar-shaped (conical-shaped) inner surface which allows the pivot projection 44 to fit into, and the innermost base portion of the pivot recess 67 is formed into a spherical shape which corresponds to the end shape (spherical tip) of the pivot projection 44. The rotation prevention hole 68 is an elongated hole which is elongated in a radial direction of the pivot recess 67 at a position spaced away from the axis of the pivot recess 67, and the rotation prevention hole 68 allows the guide projection 39b of the pivot guide 39 to enter therein, as will be discussed later. The width of the rotation prevention hole 68 corresponds to the diameter of the guide projection 39b, so that the rotation prevention hole 68 does not allow the guide projection 39b to move in the widthwise direction of the rotation prevention hole 68 when the guide projection 39b is in the rotation prevention hole 68. On the other hand, the length of the rotation prevention hole 68 is greater than the diameter of the guide projection 39b, so that the rotation prevention hole 68 allows the guide projection 39b to move in the lengthwise direction of the rotation prevention hole 68 when the guide projection 39b is in the rotation prevention hole 68.

With the sensor support board 35 mounted to the sensor holder 34, the sensor holder 34 is fixed to the base member 31 by inserting the pair of sensor support projections 61 and 62 into the side space 56 (see FIG. 13), making the pair of abutting portions 65 abut against the pair of support seats 57 and screwing two set screws 69 (see FIG. 8) into screw holes formed in the pair of support seats 57 through the screw insertion holes 66 of the pair of abutting portions 65. In this fixed state, the base plate portion 60 of the sensor holder 34 closes the back of the rear space 55 of the base member 31, and the center of the pivot recess 67, which is formed on the base plate portion 60, lies on an extension of the first optical axis O1 (see FIGS. 13 and 16 through 18). In addition, the rotation prevention hole 68 is positioned on the left-hand side of the pivot recess 67 and elongated along the first reference plane P1 (see FIGS. 10 and 12).

Upon assembling the first lens-group unit 12, the leaf spring 36 is made to be supported by the base member 31, subsequently the first lens frame 30 is disposed at a predetermined position with respect to the base member 31, and the sensor holder 34 is fixed to the base member 31. In this state, the first lens frame 30 is supported by the base member 31 with the pivot arm 41c inserted into the rear space 55 so that the pivot projection 44 fits into the pivot recess 67 and with the guide projection 39b of the pivot guide 39 inserted into the rotation prevention hole 68. As shown in FIGS. 7, 11, 13 and 16 through 18, the pivot arm 41c which is inserted into the rear space 55 abuts against a portion of the resilient arm 36b in the vicinity of the free end thereof to resiliently deform the resilient arm 36b forward; the end of the pivot projection 44 is pressed against the bottom of the pivot recess 67 by the resiliency of the resilient arm 36b of the leaf spring 36. In this supported state of the first lens frame 30, the lens holding portion 40 is positioned at the front opening of the optical path space 54, and the first lens element L1 is positioned in front of the incident surface L11-a of the first prism L11. As shown in FIG. 13, the pair of magnet holding portions 42 and 43 are inserted into the side space 56 of the base member 31 so that the magnet holding portion 42 is positioned adjacent to the sensor support projection 61 of the sensor holder 34 and so that the magnet holding portion 43 is positioned adjacent to the sensor support projection δ2 of the sensor holder 34.

The cover member 32 is provided with a pair of side walls 70, a front portion 71 and a stepped portion 72. The pair of side walls 70 are shaped to be fitted onto the outer sides of the pair of side walls 51 of the base member 31, respectively, the front portion 71 covers the front of the pair of side walls 70, and the stepped portion 72 is formed at the left end of the front portion 71. The cover member 32 is mounted to the base member 31 by abutting the front portion 71 against the front of the base member 31 and by engaging projections 51a which are formed on a side of each side wall 51 of the base member 31 engaging into engaging holes 70a which are formed in the associated side wall 70. A photographing aperture 75 through which the first lens element L1 is exposed is formed in the front portion 71.

As shown in FIG. 13, two coil holding portions 73 and 74 which are each shaped into a recess are formed in an inner side of the cover member 32 in the vicinity of the boundary between the front portion 71 and the stepped portion 72 of the cover member 32, and the coils 83 and 84 are fitted into and held by the coil holding portions 73 and 74, respectively. Mounting the cover member 32 to the base member 31 causes the coils 83 and 84 to be positioned to face the permanent magnets 81 and 82, respectively. A driving current is passed through the coils 83 and 84 via the coil connecting board 33. The coil connecting board 33 is a flexible board, provided with a narrow strip portion 33a and a coil connecting portion 33b. The coil connecting portion 33b is supported by the stepped portion 72 and is electrically connected to the coils 83 and 84, which are fitted into the coil holding portions 73 and 74.

The first lens-group unit 12 is constructed as described above, and is combined with the body module 11 as shown in FIGS. 5 and 6. The housing 13, which constitutes part of the body module 11, is provided with a unit support portion 13a, into which the rear of the base member 31 of the first lens-group unit 12 is fitted and supported thereby. The housing 13 is provided at the left end of the unit support portion 13a with a screw hole 13b and a pair of positioning pins 13c. The mounting portion 50 of the base member 31 is provided with a screw insertion hole 50a which is aligned with the screw hole 13b, and is further provided with a pair of positioning holes 50b into which the pair of positioning pins 13c are fitted. By supporting the first lens-group unit 12 by the unit support portion 13a thereon while fitting the pair of positioning pins 13c into the pair of positioning holes 50b and by screwing a set screw 16 into the screw hole 13b through the screw insertion hole 50a, the body module 11 and the first lens-group unit 12 are connected to complete the assembly of the imaging unit 10.

As described above, in the first lens-group unit 12, the first lens frame 30 is supported by a combination of the base member 31 and the sensor holder 34 (which is fixed with respect to the housing 13) via the engagement between the pivot projection 44 and the pivot recess 67. The pivot recess 67 is a recess which is open at the front of the base plate portion 60 of the sensor holder 34 and has a mortar-shaped (conical-shaped) inner surface which progressively reduces the diameter thereof in the direction toward the bottom of the recess, and the innermost base portion of the pivot recess 67 is formed into a concave spherical shape. This concave spherical surface is a part of a spherical surface about the spherical-swinging center A1. The pivot projection 44 is a projection having a conical outer surface which progressively reduces the diameter thereof in the direction toward the end of the pivot projection 44, and the end of the pivot projection 44 is shaped as a convex spherical tip. This convex spherical tip is a part of a spherical surface that is centered about the spherical-swinging center A1. The leaf spring 36 provides a force that presses the end of the pivot projection 44 against the bottom of the pivot recess 67, and the first lens frame 30 is supported to be capable of spherically swinging about the spherical-swinging center A1 (inclining the pivot projection 44 relative to the pivot recess 67) by being guided by the contacting portion between the pivot projection 44 and the pivot recess 67. Since the end of the pivot projection 44 is formed as a part of a spherical surface about the spherical-swinging center A1, this spherical swinging operation is performed while changing the point of contact between the pivot projection 44 and the pivot recess 67 without changing the position of the spherical-swinging center A1. As can be seen from FIGS. 11 and 13, the conical inner surface of the pivot recess 67 is formed into the shape of a circular cone having a greater central angle than that of the conical outer surface of the pivot projection 44, thereby allowing the first lens frame 30 to perform the spherical swinging operation without interference. In addition, since the contacting portion between the pivot projection 44 and the pivot recess 67 forms part of a spherical surface about the spherical-swinging center A1 (the aforementioned convex spherical tip and the aforementioned concave spherical surface), when the first lens frame 30 performs the spherical swinging operation, the resilient arm 36b of the leaf spring 36 does not move in the forward/rearward direction, so that the spring load of the leaf spring 36 does not vary (the resilient arm 36b gives a fixed degree of load onto the end of the pivot projection 44 in the forward/rearward direction and prevents no superfluous load from occurring in directions other than the forward/rearward direction). This makes it possible to achieve a stable image-stabilizing control with high precision without the electromagnetic actuator (the permanent magnets 81 and 82 and the coils 83 and 84) exerting an adverse influence on the drive control of the first lens frame 30.

As shown in FIGS. 7, 13 and 16 through 18, the spherical-swinging center A1 lies on an extension of the first optical axis O1 which extends to the rear of the reflection surface L11-c of the first prism L11, and the exit surface L1-b of the first lens element L1 is a concave surface which faces the spherical-swinging center A1. FIGS. 7, 12, 13 and 14 through 16 show the aforementioned image-stabilizing initial state, in which the first lens frame 30 (the first lens element L1) is positioned at the center of the driving range thereof in the spherical swinging operation by the image-stabilizing system, and FIGS. 15, 17 and 18 each show a state where the first lens frame 30 (the first lens element L1) has been swung in the spherical swinging operation from the image-stabilizing initial state. More specifically, FIG. 15 shows a state where the first lens frame 30 has been tilted toward the upper side of the imaging unit 10, FIG. 17 shows a state where the first lens frame 30 has been tilted toward the left side of the imaging unit 10 and FIG. 18 shows a state where the first lens frame 30 has been tilted toward the right side of the imaging unit 10.

The pivot guide 39 and the rotation prevention hole 68 serve as a rotation preventer which prevents rotation of the first lens frame 30 about the optical axis of the first lens element L1 (which includes both the first optical axis O1 (non-inclined optical axis) of the first lens element L1 in the image-stabilizing initial state and a first optical axis O1' (inclined optical axis) of the first lens element L1 in a state where the spherical swinging operation has been performed from the image-stabilizing initial state) while allowing the first lens frame 30 to perform the spherical swinging operation. In the completed assembled state of the imaging unit 10, the rotation prevention hole 68 is formed as an elongated hole, which is elongated in a radial direction of an imaginary line extended rearward from the first optical axis O1. More specifically, as shown in FIGS. 9 through 12 and 14 through 18, the rotation prevention hole 68 is provided with a pair of facing surfaces 68a, which are formed as a pair of parallel surfaces, and a pair of end portions 68b which connect the pair of facing surfaces 68a; and the length of the rotation prevention hole 68, which corresponds to the distance along a central line connecting the pair of end portions 68b, is greater than the width of the rotation prevention hole 68, which is defined by the distance between the pair of facing surfaces 68a. The rotation prevention hole 68 is positioned along the boundary between the second quadrant V2 and the third quadrant V3, and the pair of facing surfaces 68a are substantially parallel to the first reference plane P1 and are positioned substantially symmetrical to the first reference plane P1. As shown in FIGS. 11 and 16 through 18, the rotation prevention hole 68 is formed at a position substantially identical to the position of the pivot recess 67 (i.e., at a position in the third reference plane P3), with respect to the forward/rearward direction of the imaging unit 10. The guide projection 39b of the pivot guide 39 which is inserted into the rotation prevention hole 68 (that is positioned in the aforementioned manner) is a spherical end, the diameter of which is substantially identical to the width of the rotation prevention hole 68 (i.e., the distance between the pair of facing surfaces 68a), and the surface of the spherical end is in contact (point contact) with the pair of facing surfaces 68a. When the first lens frame 30 is in the image-stabilizing initial state, the contact point between the guide projection 39b and each facing surface 68a lies in the third reference plane P3 (see FIGS. 14 and 16). In addition, the prevention of movement of the guide projection 39b in the widthwise direction of the rotation prevention hole 68 with the guide projection 39b held between the pair of facing surfaces 68a prevents rotation of the first lens frame 30 about the optical axis of the first lens element L1. When the first lens frame 30 is in the image-stabilizing initial state, the optical axis of the first lens element L1 is coincident with the first optical axis O1 shown in the drawings, and accordingly, the guide projection 39b and the rotation prevention hole 68 prevent rotation of the first lens frame 30 about the first optical axis O1. On the other hand, in a state where the first lens frame 30 tilts from the position thereof in the image-stabilizing initial state by the spherical swinging operation, rotation of the first lens frame 30 about the inclined first optical axis O1' (see FIGS. 15, 17 and 18) is prevented by the guide projection 39b and the rotation prevention hole 68.

As can be understood from FIG. 12, the rotation prevention hole 68 is greater in size than the diameter of the guide projection 39b in the lengthwise direction of the rotation prevention hole 68 (the leftward/rightward direction of the imaging unit 10), in which the pair of end portions 68b face each other, so that the guide projection 39b is slidable in the lengthwise direction of the rotation prevention hole 68 along the pair of facing surfaces 68a. In addition, as can be understood from FIGS. 11 and 14 through 18, the rotation prevention hole 68 has a size allowing the guide projection 39b to slide also in the depthwise direction of the rotation prevention hole 68 (the forward/rearward direction of the imaging unit 10). Additionally, the guide projection 39b, the spherical surface of which is in point contact with the pair of facing surfaces 68a, can swing (tilt) with a center B1 (see FIGS. 12 and 14 through 18) of the spherical end (hereinafter referred to as the spherical center) of the guide projection 39b serving as a swinging center (fulcrum). Accordingly, with respect to a first plane defined as a plane parallel to each facing surface 68a and parallel to the first reference plane P1, the guide projection 39b can slide relative to the rotation prevention hole 68 along this first plane in the forward/rearward direction and the leftward/rightward direction of the imaging unit 10 within the range of the area of the pair of facing surfaces 68a. Additionally, with respect to a second plane defined as a plane which is orthogonal to both each facing surface 68a and the first reference plane P1 and parallel to the first optical axis O1 (i.e., a plane parallel to the second reference plane P2), the guide projection 39b can slide, within this second plane, in the forward/rearward direction along the first optical axis O1 and swing about the spherical center B1 (see FIG. 15) relative to the rotation prevention hole 68. Due to these movements, the pivot guide 39 and the rotation prevention hole 68 can prevent rotation of the first lens frame 30 about the optical axis of the first lens element L1 without interfering with the spherical swinging operation of the first lens frame 30 about the spherical-swinging center A1, like the spherical swinging operation shown in FIGS. 15, 17 and 18.

Both the spherical-swinging center A1 of the first lens frame 30 and the spherical center B1 of the guide projection 39b lie in the first reference plane P1 (see FIG. 12). Therefore, when the first lens frame 30 is made to swing along the aforementioned second plane (a plane parallel to the second reference plane P2) from the position in the image-stabilizing initial state shown in FIG. 14, the pivot guide 39 swings about the spherical center B1 of the guide projection 39b without changing the position of the spherical center B1 of the guide projection 39b as shown in FIG. 15. Therefore, in the state shown in FIG. 15, the point of contact of the guide projection 39b with the pair of facing surfaces 68a of the rotation prevention hole 68 lies in the third reference plane P3. FIG. 15 shows a state where the first lens frame 30 is tilted toward the upper side of the imaging unit 10; the state in which the first lens frame 30 is tilted toward the lower side of the imaging unit 10 corresponds to the mirror image of the first lens frame 30 shown in FIG. 15. Whereas, as shown in FIGS. 16 through 18, when the first lens frame 30 is swung along the aforementioned first plane (a plane parallel to the first reference plane P1), the pivot guide 39 moves in the swinging direction about the spherical-swinging center A1 while being guided by the pair of facing surfaces 68a of the rotation prevention hole 68 to thereby change the position of the spherical center B1 of the guide projection 39b. Namely, the point of contact of the guide projection 39b with the pair of facing surfaces 68a varies in the forward/rearward direction with respect to the third reference plane P3 and also in the leftward/rightward direction along the pair of facing surfaces 68a. The depth of the rotation prevention hole 68 in the forward/rearward direction is determined so that the guide projection 39b is prevented from coming off during the movement of the pivot guide 39 in the forward/rearward direction when the first lens frame 30 is swung along the first reference plane P1. Although FIGS. 14 through 18 each show a swing movement of the first lens frame 30 in a direction along the first plane or the second plane that is parallel to the first reference plane P1 or the second reference plane P2, the first lens frame 30 can swing in directions along an infinite number of planes, including the first optical axis O1, in addition to these planes.

Figure 23:
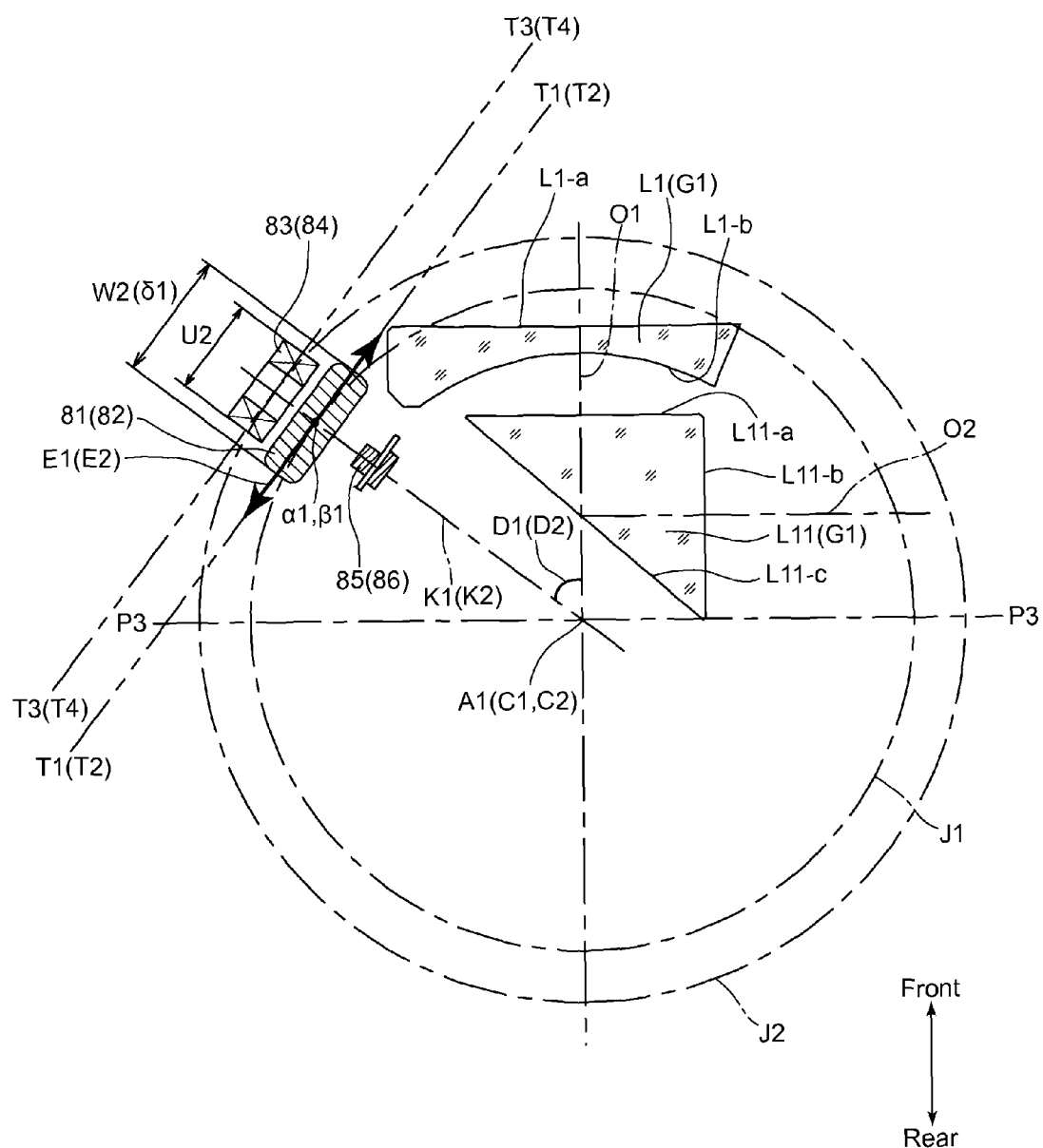
FIG. 23 is a sectional view taken along the line XIII-XIII or XIII'-XIII' shown in FIG. 12, showing the relationship between the first lens element, the first prism and an electromagnetic actuator.

The driver which drives the first lens frame 30 so that the first lens frame 30 performs the spherical swinging operation is an electromagnetic actuator which includes two voice coil motors (VCMs). One of the two voice coil motors is configured of a permanent magnet 81 and a coil 83 which are arranged in the second quadrant V2, and the other voice coil motor is configured of a permanent magnet 82 and a coil 84 which are arranged in the third quadrant V3. As shown in FIGS. 13 and 23, the permanent magnets 81 and 82 planarly extend in directions on tangent planes (first tangent planes) T1 and T2 (see FIG. 23) that are tangent to a common imaginary spherical surface J1 about the spherical-swinging center A1. Furthermore, each magnet 81 and 82 has a flat shape, the thickness of which in a direction orthogonal to the associated tangent plane T1 or T2 (i.e., in the direction of a normal to the associated tangent plane T1 or T2) is small compared to the length and the width thereof. The permanent magnet 81 is arranged along the tangent plane T1 and the permanent magnet 82 is arranged along the tangent plane T2. The center of the outer profile of the permanent magnet 81 corresponds to the center thereof in planar directions along the tangent plane T1 and also to the center of the permanent magnet 81 in the thickness direction thereof, which is orthogonal to the tangent plane T1. Likewise, the center of the outer profile of the permanent magnet 82 corresponds to the center thereof in planar directions along the tangent plane T2 and also to the center of the permanent magnet 82 in the thickness direction thereof, which is orthogonal to the tangent plane T2. The centers of the outer profiles of the permanent magnets 81 and 82 lie in the imaginary spherical surface J1.

As shown in FIGS. 12, 13, 22 and 23, if a straight line K1 is defined as a straight line which passes through the center of the outer profile of the flat permanent magnet 81 and is parallel to (an infinite number of) normals to the tangent plane T1 (i.e., the straight line K1 is the normal to the tangent plane T1 at the point of tangency that passes through the center of the outer profile of the flat permanent magnet 81), the straight line K1 is nonparallel to the first optical axis O1 (or the first optical axis O1' of the first lens element L1 when the spherical swinging operation has been performed; shown simply by the parenthesized reference characters O1' in the following descriptions); in addition, the point of intersection between the permanent magnet 81 and the straight line K1 is positioned closer to the front (the object side) than the third reference plane P3. Accordingly, the first optical axis O1 (O1') or a line extended from the first optical axis O1 (O1'), and normals to the tangent plane T1 intersect each other non-orthogonally (i.e., at angles other than right angles). Using the straight line K1 as an example, a point of intersection C1 (see FIGS. 12, 13, 22 and 23) of the straight line K1 and a line extended from the first optical axis O1 (O1') is coincident with the spherical-swinging center A1, and a half line which extends from the point of intersection C1, as a point of origin, along the straight line K1 (i.e., extends in a direction parallel to the normals to the tangent plane T1) and toward the tangent plane T1 has an inclination with respect to the first optical axis O1 (O1') such that the distance between the half line and the first optical axis O1 (O1') increases in a direction approaching the object side. In other words, if the inclination angle of the aforementioned half line, which extends from the point of intersection C1, as a point of origin, along the straight line K1 (i.e., extends in a direction parallel to the normals to the tangent plane T1) and toward the tangent plane T1, with respect to a half line which extends toward the object side from the point of intersection C1, as a point of origin, in a direction parallel to the first optical axis O1 (O1') is designated as D1 (see FIG. 23), the following condition is satisfied: $0°<D1<90°$. Although the straight line K1 has been herein illustrated by an example of a normal to the tangent plane T1, this normal is not limited solely to the straight line K1; any normal to the tangent plane T1 would also satisfy the above-described condition for the inclination angle D1. In the case of any normal to the tangent plane T1 other than the straight line K1, the point of intersection C1 would not be coincident with the spherical-swinging center A1.

Likewise, if a straight line K2 is defined as a straight line which passes through the center of the outer profile of the flat permanent magnet 82 and is parallel to (an infinite number of) normals to the tangent plane T2 (i.e., the straight line K2 is the normal to the tangent plane T2 at the point of tangency that passes through the center of the outer profile of the flat permanent magnet 82), the straight line K2 is nonparallel to the first optical axis O1 (O1'); in addition, the point of intersection between the permanent magnet 82 and the straight line K2 is positioned closer to the front (the object side) than the third reference plane P3. Accordingly, the first optical axis O1 (O1') or a line extended from the first optical axis O1 (O1'), and normals to the tangent plane T2 intersect each other non-orthogonally (i.e., at angles other than right angles). Using the straight line K2 as an example, a point of intersection C2 (see FIGS. 12, 13, 22 and 23) of the straight line K2 and a line extended from the first optical axis O1 (O1') is coincident with the spherical-swinging center A1, and a half line which extends from the point of intersection C2, as a point of origin, along the straight line K2 (i.e., extends in a direction parallel to the normals to the tangent plane T2) toward the tangent plane T2 has an inclination with respect to the first optical axis O1 (O1') such that the distance between the half line and the first optical axis O1 (O1') increases in a direction approaching the object side. In other words, if the inclination angle of the aforementioned half line, which extends from the point of intersection C2, as a point of origin, along the straight line K2 (i.e., extends in a direction parallel to the normals to the tangent plane T2) and toward the tangent plane T2, with respect to a half line which extends toward the object side from the point of intersection C2, as a point of origin, in a direction parallel to the first optical axis O1 (O1') is designated by D2 (see FIG. 23), the following condition is satisfied: $0°<D2<90°$. Although the straight line K2 has been herein illustrated by an example of a normal to the tangent plane T2, this normal is not limited solely to the straight line K2; any normal to the tangent plane T2 would also satisfy the above-described condition for the inclination angle D2. In the case of any normal to the tangent plane T2 other than the straight line K2, the point of intersection C2 would not be coincident with the spherical-swinging center A1.

By satisfying the above described conditions (the arrangement of the tangent planes T1 and T2, which are defined by the normal inclination angles D1 and D2), for the arrangement of the permanent magnets 81 and 82, the distance between the permanent magnet 81 and the coil 83 and the distance between the permanent magnet 82 and the coil 84 are each prevented from substantially varying, which enables a stable control of the electromagnetic actuator when the first lens frame 30 performs the spherical swinging operation. Considering the prevention of interference of the electromagnetic actuator with the first lens element L1, miniaturization of the imaging unit 10, the accuracy of image-stabilizing driving of the first lens frame 30 by the electromagnetic actuator and the position sensitivity of the first lens frame 30, it is preferable for the following conditions to be satisfied: $40°<=D1<=80°$ and $40°<=D2<=80°$.

In the present embodiment of the imaging unit 10, the following equations are satisfied: $D1=55°$ and $D2=55°$. Additionally, when it is assumed that the imaginary spherical surface J1 is a sphere with the points of intersection of the imaginary spherical surface J1 with the first optical axis O1 and an extension line thereof as the poles of the sphere, that circular arcs on the spherical surface which connect the poles of the sphere are meridian lines and that circular arcs on the spherical surface which are orthogonal to the meridian lines are latitude lines (parallels), the center of the outer profile of the permanent magnet 81 and the center of the outer profile of the permanent magnet 82 lie on a common latitude line (parallel) of the imaginary spherical surface J1 (lie on a common circle about the first optical axis O1) (see FIGS. 22 and 23). The permanent magnet 81 has a north pole and a south pole on the opposite sides of a magnetic-pole boundary line Q1 (see FIGS. 8 and 22) thereof, and the permanent magnet 82 has a north pole and a south pole on the opposite sides of a magnetic-pole boundary line Q2 (see FIGS. 8 and 22) thereof. As viewed in a direction parallel to the first optical axis O1 as shown in FIG. 22, each of the magnetic-pole boundary lines Q1 and Q2 is in contact with a common imaginary circle H1 (a latitude line on the imaginary spherical surface J1) about the first optical axis O1. This arrangement of the two permanent magnets 81 and 82 achieves a good weight balance.

Additionally, as shown in FIGS. 12 and 22, a thrust acting plane P4 which lies on the straight line K1 and lies on, or is parallel to, the first optical axis O1 and a thrust acting plane P5 which lies on the straight line K2 and lies on, or is parallel to, the first optical axis O1 are plane-symmetrical with respect to the first reference plane P1 (with the first reference plane P1 as a plane of symmetry) and intersect each other at angles of approximately ±30 degrees with respect to the first reference plane P1. Namely, intersecting angle D3 between the thrust acting planes P4 and P5 is approximately 60 degrees.

The coil 83 and the Hall sensor 85, together with the permanent magnet 81, are positioned in the second quadrant V2, while the coil 84 and the Hall sensor 86, together with the permanent magnet 82, are positioned in the third quadrant V3. As shown in FIGS. 12, 13 and 23, the center of the outer profile of the coil 83 and the Hall sensor 85 lie on the straight line K1; additionally, the Hall sensor 85, the permanent magnet 81 and the coil 83 are aligned on the straight line K1, in that order from the inner diameter side that is closer to the spherical-swinging center A1, and the coil 83 and the Hall sensor 85 are positioned in the magnetic field of the permanent magnet 81. The center of the outer profile of the coil 84 and the Hall sensor 86 lie on the straight line K2; additionally, the Hall sensor 86, the permanent magnet 82 and the coil 84 are aligned on the straight line K2, in that order from the inner diameter side that is closer to the spherical-swinging center A1, and the coil 84 and the Hall sensor 86 are positioned in the magnetic field of the permanent magnet 82.

As shown in FIGS. 13 and 23, the coils 83 and 84 lie in the imaginary spherical surface J2, which is greater in diameter than the imaginary spherical surface J1 and centered on the spherical-swinging center A1. The coil 83 is formed by winding wire to lie in a tangent plane (second tangent plane) T3 (see FIG. 23) that is tangent to the imaginary spherical surface J2 and that is orthogonal to the straight line K1. The coil 83 planarly extends along the tangent plane T3 and has a flat shape, the thickness of which in the direction of the straight line K1 (a direction of a normal to the tangent plane T1) is small compared to the length and width thereof along the tangent plane T3. Likewise, the coil 84 is formed by winding wire to lie in a tangent plane (second tangent plane) T4 (see FIG. 23) that is tangent to the imaginary spherical surface J2 and that is orthogonal to the straight line K2. The coil 84 planarly extends along the tangent plane T4 and has a flat shape, the thickness of which in the direction of the straight line K2 (a direction of a normal to the tangent plane T2) is small compared to the length and width thereof along the tangent plane T4. The tangent plane T3 is parallel to the tangent plane T1 and the tangent plane T4 is parallel to the tangent plane T2. Accordingly, mutually parallel flat portions of the permanent magnet 81 and the coil 83, each of which has a flat shape, face each other in the direction of the straight line K1 with the planarly extending directions (the tangent planes T1 and T3) of the permanent magnet 81 and the coil 83 being substantially parallel to each other. Likewise, mutually parallel flat portions of the permanent magnet 82 and the coil 84, each of which has a flat shape, face each other in the direction of the straight line K2 with the planarly extending directions (the tangent planes T2 and T4) of the permanent magnet 82 and the coil 84 being substantially parallel to each other. In the present embodiment, the center of the outer profile of the coil 83 and the center of the outer profile of the coil 84 lie in the common imaginary spherical surface J2.

When it is assumed that the imaginary spherical surface J2 is a sphere with the points of intersection of the imaginary spherical surface J2 with the first optical axis O1 and an extension line thereof as the poles of the sphere, that circular arcs on the spherical surface which connect the poles of the sphere are meridian lines and that circular arcs on the spherical surface which are orthogonal to the meridian lines are latitude lines (parallels), the center of the outer profile of the coil 83 and the center of the outer profile of the coil 84 lie on a common latitude line (parallel) of the imaginary spherical surface J2 (lie on a common circle about the first optical axis O1). As viewed in a direction parallel to the first optical axis O1 as shown in FIG. 12, a long axis Q3 (see FIGS. 8 and 12) of the coil 83, which is parallel to the lengthwise (elongated) direction thereof and passes through the center of the pair of linear portions 83a, and a long axis Q4 (see FIGS. 8 and 12) of the coil 84, which is parallel to the lengthwise (elongated) direction thereof and passes through the center of the pair of linear portions 84a, are tangent to a common imaginary circle H2 (a latitude line on the imaginary spherical surface J2) about the first optical axis O1.

As shown in FIGS. 12 and 22, the length W1 of the permanent magnet 81 along the magnetic-pole boundary line Q1 and the length W1 of the permanent magnet 82 along the magnetic-pole boundary line Q2 are smaller than the length U1 of the coil 83 along the long axis Q3 thereof and the length U1 of the coil 84 along the long axis Q4 thereof. In other words, the size of the permanent magnets 81 and 82 along the respective tangent planes T1 and T2 on a plane extending through a latitude line of the imaginary spherical surface J1 are smaller than the size of the coils 83 and 84 along the respective tangent planes T3 and T4 on a plane extending through a latitude line of the imaginary spherical surface J2. On the other hand, as shown in FIG. 23, the width W2 of the permanent magnet 81 in a direction across the north and south poles on the opposite sides of the magnetic-pole boundary line Q1 and the width W2 of the permanent magnet 82 in a direction across the north and south poles on the opposite sides of the magnetic-pole boundary line Q2 are greater than the width U2 of the coil 83 in a direction across the pair of linear portions 83a and the width U2 of the coil 84 in a direction across the pair of linear portions 84a. In other words, the size of the permanent magnet 81 along the tangent plane T1 on a plane extending through a meridian line of the imaginary spherical surface J1 and the size of the permanent magnet 82 along the tangent plane T2 on a plane extending through another meridian line of the imaginary spherical surface J1 are greater than the size of the coil 83 along the tangent plane T3 on a plane extending through a meridian line of the imaginary spherical surface J2 and the size of the coil 84 along the tangent plane T4 on a plane extending through another meridian line of the imaginary spherical surface J2. This structure makes it possible to maintain a state where the pair of linear portions 83a of the coil 83 and the pair of linear portions 84a of the coil 84 face the permanent magnet 81 and the permanent magnet 82, respectively, within the predetermined range of the spherical swinging operation, the center thereof being defined by the center of the first lens frame 30 in the image-stabilizing initial state thereof.

As described above, the permanent magnet 81 and the permanent magnet 82 are respectively arranged in the second quadrant V2 and the third quadrant V3 on the imaginary spherical surface J1 (which is centered on the spherical-swinging center A1), at a position closer to the front than the third reference plane P3 that includes the spherical-swinging center A1, to be substantially symmetrical to the first reference plane P1. The coil 83 and the coil 84 are respectively arranged in the second quadrant V2 and the third quadrant V3 on the imaginary spherical surface J2 (which is centered on the spherical-swinging center A1), at a position closer to the front than the third reference plane P3, to be substantially symmetrical to the first reference plane P1. In addition, the Hall sensor 85 and the Hall sensor 86 are also respectively arranged in the second quadrant V2 and the third quadrant V3 on an imaginary spherical surface which is smaller in diameter than the imaginary spherical surface J1 and centered on the spherical-swinging center A1, at a position closer to the front than the third reference plane P3, to be substantially symmetrical to the first reference plane P1.

Upon the coil 83, which is positioned in the magnetic field of the permanent magnet 81, being energized, a driving force is generated in a direction orthogonal to the pair of linear portions 83a of the coil 83 and orthogonal to the magnetic-pole boundary line Q1 of the permanent magnet 81 according to Fleming's left-hand rule. Similarly, upon the coil 84, which is positioned in the magnetic field of the permanent magnet 82, being energized, a driving force is generated in a direction orthogonal to the pair of linear portions 84a of the coil 84 and orthogonal to the magnetic-pole boundary line Q2 of the permanent magnet 82 according to Fleming's left-hand rule. As shown in FIGS. 12, 13, 22 and 23, a thrust axis E1 shown by a double-headed arrow represents the direction of action of thrust (thrust force) generated by the actuator (voice coil motor), configured of the permanent magnet 81 and the coil 83, in the thrust acting plane P4 that passes through the center of the outer profile of the permanent magnet 81; and a thrust axis E2 shown by a double-headed arrow represents the direction of action of thrust generated by the actuator (voice coil motor), configured of the permanent magnet 82 and the coil 84, in the thrust acting plane P5 that passes through the center of the outer profile of the permanent magnet 82. In FIGS. 12 and 22, the arrows at both ends of each thrust axis E1 and E2 differ in size from each other to indicate the degree of inclination of each thrust axis E1 and E2 relative to the third reference plane P3, wherein the large arrow of each thrust axis E1 and E2 denotes a thrust in an obliquely forward direction, i.e., a direction toward the object side, and the small arrow of each thrust axis E1 and E2 denotes a thrust in an obliquely rearward direction, i.e., a direction away from the object side. The coils 83 and 84 are fixedly supported by a body part (i.e., the housing 13) of the imaging unit 10 via the cover member 32, and the permanent magnets 81 and 82 are supported by the first lens frame 30, which is a movable member, and accordingly, a driving force generated upon each coil 83 and 84 being energized acts as a force to move the first lens frame 30 in the meridian direction on the imaginary spherical surface J1. Since the two voice coil motors (a combination of the permanent magnet 81 and the coil 83 and a combination of the permanent magnet 82 and the coil 84) are arranged at different positions in the latitudinal direction on the imaginary spherical surfaces J1 and J2 (so that the intersecting angle D3 between the thrust acting planes P4 and P5 becomes approximately 60 degrees), the first lens frame 30 can be made to perform the spherical swinging operation in any arbitrary direction by a combination of controlling the passage of current through the two actuators (voice coil motors). Since the first lens frame 30 is prevented from rotating about the optical axis of the first lens element L1 when performing the spherical swinging operation due to the engagement of the pivot guide 39 with the rotation prevention hole 68, as described above, the first lens frame 30 is prevented from moving excessively to a point where each permanent magnet 81 and 82 and the associated coil 83 or 84 do not face each other, which makes it possible to control the position of the first lens frame 30 at all times by the two actuators (voice coil motors).

Variation in position of the permanent magnet 81 in accordance with the spherical swinging operation of the first lens frame 30 causes the output of the Hall sensor 85 that faces the permanent magnet 81 to vary, and variation in position of the permanent magnet 82 in accordance with the spherical swinging operation of the first lens frame 30 causes the output of the Hall sensor 86 that faces the permanent magnet 82 to vary. The position of the first lens frame 30 during the spherical swinging operation thereof can be detected from the output variations of the two Hall sensors 85 and 86.

If the imaging unit 10, which has the above described structure, is pointed at an object located in front of the imaging unit 10, light reflected by the object (light emanating from the photographic object) enters the first prism L11 through the incident surface L11-*a* after passing through the first lens element L1 and is reflected at a substantially right angle by the reflection surface L11-*c* of the first prism L11 and travels toward the exit surface L11-*b*. Subsequently, the reflected light that emerges from the exit surface L11-*b* of the first prism L11 enters the second prism L12 from the incident surface L12-*a* after passing through the second lens element L2, the second lens group G2, the third lens group G3 and the fourth lens group G4, and is reflected at a substantially right angle by the reflection surface L12-*c* of the second prism L12 and travels toward the exit surface L12-*b*. Subsequently, the reflected light emerges from the exit surface L12-*b* and is captured (received) by the imaging surface of the image sensor 14. A zooming operation (power-varying operation) and a focusing operation of the imaging optical system of the imaging unit 10 are performed by moving the second lens group G2 and/or the third lens group G3 along the pair of rods 22 and 23 using the first motor M1 and the second motor M2.

In the imaging unit 10, an image-stabilizing (image shake correction/shake reduction) operation is performed using the first lens element L1 of the first lens group G1, which is positioned in front of the first prism L11. As described above, the image-stabilizing system drives the first lens frame 30 relative to the support members (the base member 31, the cover member 32 and the sensor holder 34) that are fixed with respect to the housing 13. An advantage of selecting the first lens element L1 as an image-stabilizing optical element is that the imaging unit 10 can be constructed to be slim in the forward/rearward direction, even though the imaging unit 10 is equipped with an image-stabilizing system. For instance, unlike the present embodiment of the imaging unit 10, in the case of an image-stabilizing system which moves the second lens group G2 or the third lens group G3 in a direction orthogonal to the second optical axis O2, securement of the space for movement of the second lens group frame 20 or the third lens group frame 21 and the arrangement of the driver for the second lens group frame 20 or the third lens group frame 21 cause an increase in the space, in the forward/rearward direction, that is required in the housing 13, thus causing an increase of the thickness of the imaging unit 10. Additionally, according to the structure of the present embodiment of the imaging unit 10, only the first lens element L1 is driven when image-stabilizing control is performed rather than the entire first lens group G1, and accordingly, thus there being the advantage of the moving parts being compact, so that the driving load can accordingly be small. In typical image-stabilizing systems, an entire lens group usually driven to cancel out image shake. Whereas, in the first lens group G1 of the imaging unit 10, the distance between the first lens element L1 and the second lens element L2 is great because the first prism L11, which serves merely as a reflector which reflects the incident light rays, is disposed between the first lens element L1 and the second lens element L2, each of which has a refractive power; therefore, deterioration due to aberrations is small even though the first lens element L1 is solely driven to perform an image-stabilizing control. Accordingly, as an imaging optical system, aberrations are controlled by the entire first lens group G1, which ranges from the first lens element L1 to the second lens element L2; however, regarding the image-stabilizing system, only the first lens element L1 serves as an image-stabilizing optical element based on the findings that satisfactory optical performance can be achieved even if the first lens element L1 and the second lens element L2, which are widely spaced from each other in an optical axis direction with the first prism L11 positioned therebetween, are treated as substantially different lens groups.

The spherical swinging operation, which is performed when the first lens element L1 is driven to perform an image-stabilizing operation, allows the first lens element L1 to move widely within a small space (when the imaging unit 10 is viewed from the front along the first optical axis O1) compared with the case where the first lens element L1 moves linearly along a plane orthogonal to the first optical axis O1. Accordingly, the image-stabilizing performance can be improved by increasing the maximum vibration angle that an image-stabilizing operation can accommodate while making the imaging unit 10 compact not only with respect to the forward/rearward direction but also with respect to the upward/downward direction and the leftward/rightward direction (when the imaging unit 10 is viewed from the front).

Specifically, in the imaging unit 10, with attention focused on the fact that the imaging unit 10 is a bending optical system in which the first prism L11 is positioned behind the first lens element L1, the position of the spherical-swinging center A1 (which is positioned on a straight line extended from the first optical axis O1), about which the first lens frame 30 is made to swing when the spherical swinging operation is performed, is set in the rear space 55, which is positioned behind the reflection surface L11-c. With this structure, the space at the rear of the first prism L11 can be effectively utilized as the installation space for the support mechanism for the first lens frame 30, and the spherical swinging operation is achieved via a structure that is superior in space utilization. More specifically, portions such as the pivot projection 44 (the pivot arm 41c), the pivot recess 67 (the sensor holder 34), the leaf spring 36, the pivot guide 39 (the connecting portion 41b) and the rotation prevention hole 68 (the sensor holder 34), which are associated with supporting the first lens frame 30, are integrated and housed in the rear space 55 as shown in FIGS. 13 through 18.

As optical conditions for obtaining the effects of the spherical swinging operation by suppressing aberration fluctuations while achieving miniaturization of the imaging unit 10, it is desirable to satisfy the following conditions (1) and (2):

$$-0.6 < (SC-R2)/f1 < 0.4 \quad (1)$$

$$SF < -0.5, \quad (2)$$

wherein SF=(R2+R1)/(R2−R1);

R1 designates the radius of curvature of the surface (the incident surface L1-a) closest to the object side of the front lens element(s) (the first lens element L1/at least one front lens element);

R2 designates the radius of curvature of the surface (the exit surface L1-b) closest to the image side of the front lens element(s);

SC designates the distance on the optical axis from the surface (the exit surface L1-b) closest to the image side of the front lens element(s) to the spherical-swinging center (A1) of the spherical swinging operation; and f1 designates the focal length of the front lens element(s).

The sign (+/−) of each symbol in the aforementioned conditions is defined with respect to the direction toward the image side from the object side being determined as positive (+).

Condition (1) specifies the position of the spherical-swinging center A1 normalized to the focal length of the first lens element L1. If the lower limit of condition (1) is exceeded (less than or equal to −0.6), the distance of the spherical-swinging center A1 from the first lens element L1 becomes excessively great, which makes it difficult to miniaturize the imaging unit 10 in the forward/rearward direction and increases aberration fluctuations. Furthermore, if the upper limit of condition (1) is exceeded (equal to greater than 0.4), the spherical-swinging center A1 becomes too close to the first lens element L1, so that the angle of deviation of the optical axis of the first lens element L1 during driving thereof becomes small (the amount of image deviation becomes small), so that an effective image-stabilizing effect cannot be obtained.

Condition (2) specifies the shape of the first lens element L1. If SF is outside the specified range of condition (2), namely, if SF is greater than or equal to −0.5 (i.e., SF>=−0.5), the amount of aberration fluctuations that occur during a spherical swinging operation becomes great even if the position of the spherical-swinging center A1 satisfies condition (1).

Figure 19:
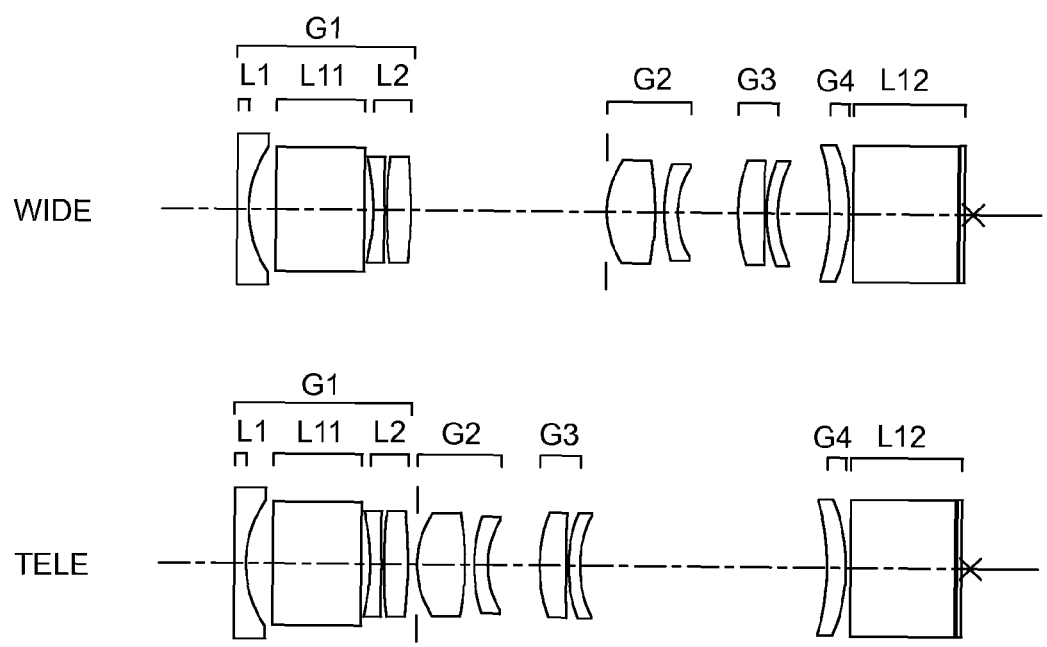
FIG. 19 is a schematic diagram illustrating a first example of the imaging optical system of the imaging unit, wherein an upper half of FIG. 19 shows the imaging optical system at the wide-angle extremity and a lower half of FIG. 19 shows the imaging optical system at the telephoto extremity.
Figure 20:
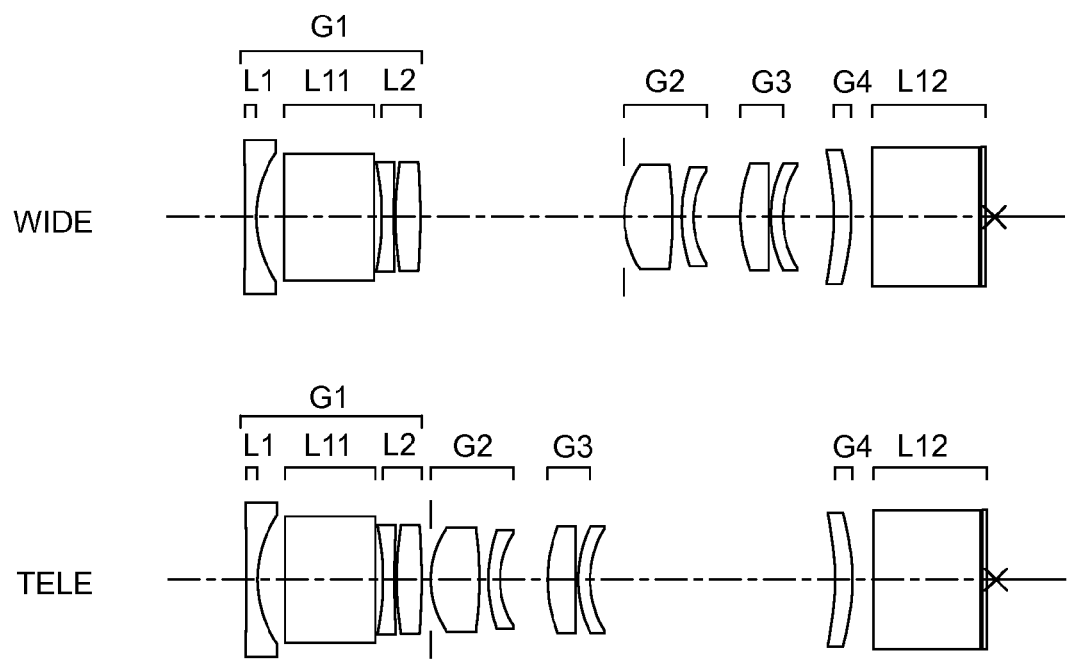
FIG. 20 is a schematic diagram illustrating a second example of the imaging optical system of the imaging unit, wherein an upper half of FIG. 20 shows the imaging optical system at the wide-angle extremity and a lower half of FIG. 20 shows the imaging optical system at the telephoto extremity.
Figure 21:
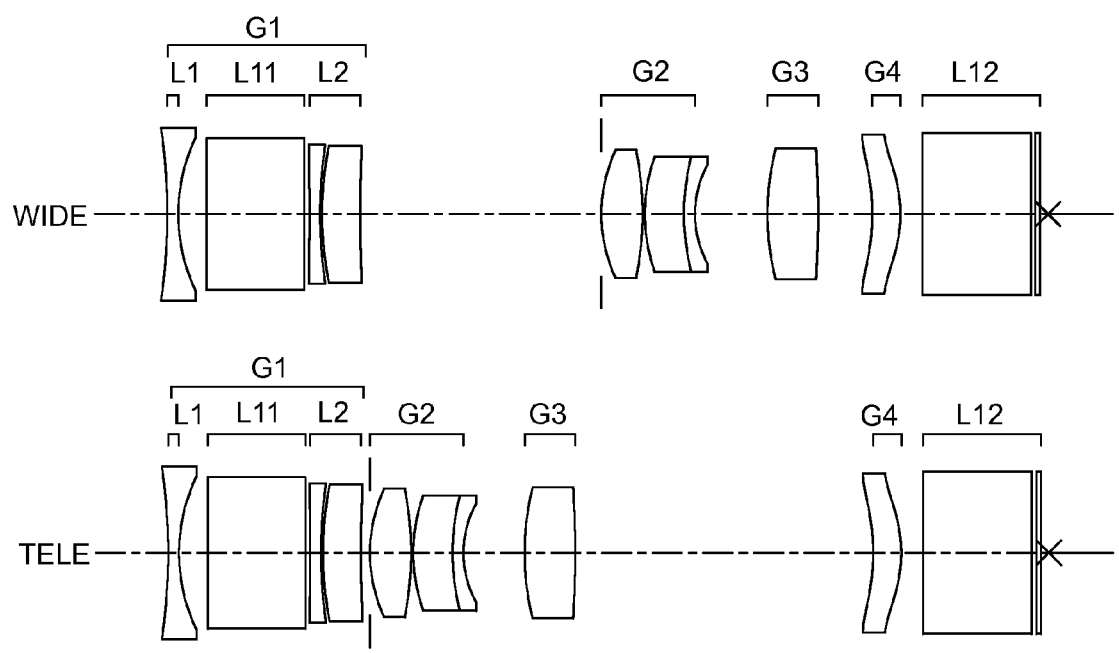
FIG. 21 is a schematic diagram illustrating a third example of the imaging optical system of the imaging unit, wherein an upper half of FIG. 21 shows the imaging optical system at the wide-angle extremity and a lower half of FIG. 21 shows the imaging optical system at the telephoto extremity.

FIGS. 19, 20 and 21 show first, second and third examples of the imaging optical system of the imaging unit 10 as actual examples which satisfy each of the aforementioned conditions (see TABLE 1). Upper and lower halves of FIG. 19 show the optical arrangement of the first example of the imaging optical system of the imaging unit 10 when the imaging optical system is at the wide-angle extremity and the telephoto extremity, respectively. Likewise, upper and lower halves of FIG. 20 show the optical arrangement of the second example of the imaging optical system of the imaging unit 10 when the imaging optical system is at the wide-angle extremity and the telephoto extremity, respectively, and upper and lower halves of FIG. 21 show the optical arrangement of the third example of the imaging optical system of the imaging unit 10 when the imaging optical system is at the wide-angle extremity and the telephoto extremity, respectively.

TABLE 1

| | | EX. 1 | EX. 2 | EX. 3 |
|---|---|---|---|---|
| | R1 | 148.000 | Infinity | −26.958 |
| | R2 | 4.756 | 4.900 | 8.204 |
| | D | 0.500 | 0.500 | 0.500 |
| | N1 | 1.00000 | 1.00000 | 1.00000 |
| | N2 | 1.77250 | 1.77250 | 1.77250 |
| | N3 | 1.00000 | 1.00000 | 1.00000 |
| | f1 | −6.371 | −6.343 | −8.092 |
| COND. 1 | SF[(R2 + R1)/(R2 − R1)]<−0.5 | −1.066 | −1.000 | −0.533 |
| | SC−R2 when aberration fluctuations are within an acceptable range | 1.0 | 1.5 | 0.3 |
| COND. 2 | −0.6 < (SC − R2)/f1 < 0.4 | −0.157 | −0.236 | −0.037 |

The first example of the imaging optical system is a type of optical system in which the first lens element L1 is formed as a concave meniscus lens wherein the incident surface L1-*a* is a convex surface and the exit surface L1-*b* is a concave surface (SF<−1). The second example of the imaging optical system is a type of optical system in which the first lens element L1 is formed as a plano-concave lens wherein the incident surface L1-*a* is a flat surface and the exit surface L1-*b* is a concave surface (SF<−1). The third example of the imaging optical system is a type of optical system in which the first lens element L1 is formed as a biconcave lens, wherein each of the incident surface L1-*a* and the exit surface L1-*b* is a concave surface (SF>−1).

Likewise with the examples shown in FIGS. 19, 20 and 21, it is desirable for the surface closest to the image plane (i.e., the exit surface L1-*b*) of the front lens element, which is driven to perform an image-stabilizing operation, to be a concave surface. Specifically, if the surface closest to the image plane of the front lens element is formed as a part of an imaginary spherical surface that is centered about the spherical-swinging center A1, the positional relationship between the surface closest to the image plane (the exit surface L1-*b*) of the front lens element and the focal point of the front lens element does not optically change even if a spherical swinging operation about the spherical-swinging center A1 is performed, which makes it possible to prevent coma which would otherwise be caused by this surface from occurring during the spherical swinging operation.

Additionally, including also the case of the incident surface L1-*a* being a flat surface like in the second example, it is desirable for the surface (the incident surface L1-*a*) closest to the object side of the front lens element (the first lens element L1), which performs the image-stabilizing operation, to be smaller in power (refractive power) than the surface (the exit surface L1-*b*) closest to the image side of the front lens element (the first lens element L1).

Instead of a single lens element such as the first lens element L1, a cemented lens or a plurality of lens elements can alternatively be used as the front lens element that is driven to perform an image-stabilizing operation. In the case where a plurality of front lens elements are used, it is desirable for the plurality of front lens elements to be integrally driven as a single sub-lens group when an image-stabilizing operation is performed to prevent optical performance from deteriorating. Additionally, in such a case, R1, R2, SC and f1 in the aforementioned conditions (1) and (2) would be replaced as follows: R1 designates the radius of curvature of the surface (incident surface) closest to the object side of the frontmost lens element that is closest to the object side of the plurality of front lens elements; R2 designates the radius of curvature of the surface (exit surface) closest to the image side of the rearmost lens element that is closest to the image side of the plurality of lens elements; SC designates the distance on the optical axis from the surface (exit surface) closest to the image side of the rearmost lens element that is closest to the image side of the plurality of lens elements to the spherical-swinging center (A1) of the spherical swinging operation; and f1 designates the combined focal length of the plurality of lens elements.

Regarding the arrangement of the image-stabilizing driver which drives the first lens frame 30 (the first lens element L1) to cancel out image shake, due to the arrangement of the permanent magnets 81 and 82 on the imaginary spherical surface J1 about the spherical-swinging center A1 and the arrangement of the coils 83 and 84 on the imaginary spherical surface J2 about the spherical-swinging center A1, the distance between the permanent magnet 81 and the coil 83 and the distance between the permanent magnet 82 and the coil 84 vary little, respectively, which makes it possible to achieve a stable image-stabilizing control with high precision when the first lens frame 30 is driven to perform the spherical swinging operation about the spherical-swinging center A1.

Additionally, in the case where a voice coil motor(s) is used as the image-stabilizing driver, one of a permanent magnet(s) and a coil(s) becomes a movable element which moves with the first lens frame 30 and the other a fixed element (stationary element). In the present embodiment of the imaging unit 10, moving-magnet type voice coil motors in which the permanent magnets 81 and 82 are held by the movable first lens frame 30 are used, and a space-efficient component arrangement which is suitable therefor has been achieved. First of all, the farther the installation positions of the permanent magnets 81 and 82, which are movable elements, from the spherical-swinging center A1, the greater the moving amount of each permanent magnet 81 and 82 when the first lens frame 30 performs the spherical swinging operation; additionally, as the moving amount of each permanent magnet 81 and 82 increases, the clearance between each permanent magnet and the fixed members (the base member 31, the cover member 32, the sensor holder 34, etc.) which surround the first lens frame 30 needs to be increased. Consequently, the permanent magnets 81 and 82, which are provided as movable elements, are arranged as close to the spherical-swinging center A1 as possible, as much as the size constraints thereof allow (the size constraints mainly being the size of the permanent magnet 81 in the surface direction defined by the length W1 of the permanent magnet 81 along the magnetic-pole boundary line Q1 and the width W2 of the permanent magnet 81 in a direction orthogonal to the magnetic-pole boundary line Q1, and the size of the permanent magnet 82 in the surface direction defined by the length W1 of the permanent magnet 82 along the magnetic-pole boundary line Q2 and the width W2 of the permanent magnet 82 in a direction orthogonal to the magnetic-pole boundary line Q2).

Due to dimensional conditions such as the length U1 of the coil 83 along the long axis Q3 and the length U1 of the coil 84 along the long axis Q4 being greater than the length W1 of the permanent magnet 81 along the magnetic-pole boundary line Q1 and the length W1 of the permanent magnet 82 along the magnetic-pole boundary line Q2, respectively, it is difficult to arrange the coils 83 and 84 at inner positions closer to the spherical-swinging center A1 than the permanent magnets 81 and 82. Hence, the coils 83 and 84 are arranged on the radially outer side that is farther from the spherical-swinging center A1 than the permanent magnets 81 and 82 in directions along the straight lines K1 and K2, respectively. Unlike the permanent magnets 81 and 82, the coils 83 and 84 are fixed elements that do not move during the spherical swinging operation, and accordingly, it is not required to respectively secure a clearance between the coils 83 and 84 and the peripheral members thereof which is determined in consideration of the operation of the coils 83 and 84, which does not easily increase the size of the imaging unit 10 even when the coils 83 and 84 are arranged on the radially outside of the permanent magnets 81 and 82.

In addition, considering the fact that the Hall sensors 85 and 86 are smaller in size than either of the permanent magnets 81 and 82 and the coils 83 and 84, the Hall sensors 85 and 86 are arranged at inner positions closer to the spherical-swinging center A1 than the permanent magnets 81 and 82 in the directions along the straight lines K1 and K2, respectively. As can be seen from FIG. 13, the pair of sensor support projections 61 and 62 that support the small Hall sensors 85 and 86 can be inserted into the narrow space surrounded by the lens holding portion 40 (the circular frame portion 40b) and the pair of magnet holding portions 42 and 43 of the first lens frame 30 and the spring support portion 58 of the base member 31, so that the small Hall sensors 85 and 86 are space-efficiently arranged. In addition, the Hall sensors 85 and 86 are fixed at positions adjacent to the inner sides of the permanent magnets 81 and 82, and this arrangement of the Hall sensors 85 and 86 is advantageous with regard to detection accuracy, in addition to space efficiency, compared with the case where the Hall sensors 85 and 86 are installed on the outer side of the coils 83 and 84.

As illustrated above, the above described structure in which the movable element and the fixed element of each voice coil motor are space-efficiently arranged in an advantageous order, in radial directions (directions along the straight lines K1 and K2) with respect to the spherical-swinging center A1, suitable for their respective conditions contributes to compactization (miniaturization) of the imaging unit 10.

In addition, the permanent magnets 81 and 82, the coils 83 and 84 and the Hall sensors 85 and 86 are installed in the side space 56 (the second quadrant V2 and the third quadrant V3) in the base member 31. The side space 56 is formed in a section (first section) on the opposite side of the second reference plane P2 from the side on which the traveling direction of the light rays deflected by the first prism L11 (the traveling direction of the second optical axis O2), and none of the optical elements of the imaging optical system which are positioned optically rearward from the first prism L11 (rightward with respect to FIG. 7) are arranged in the side space 56, and accordingly, the arrangement of the permanent magnets 81 and 82, the coils 83 and 84 and the Hall sensors 85 and 86 is not easily subjected to space restrictions. For instance, it is possible to drive the first lens element L1 even if the permanent magnets 81 and 82 and the coils 83 and 84 are arranged in a second section on the right side of the second reference plane P2 which includes the first quadrant V1 and the fourth quadrant V4; however, the second lens element L2 is positioned in the first quadrant V1 and the fourth quadrant V4 at a position adjacent to the exit surface L11-b of the first prism L11, so that in this case there is a problem of it being difficult to secure space for installing the entire electromagnetic actuator without interfering with the second lens element L2. Whereas, there is no such a restriction in the arrangement of the illustrated embodiment in which a combination of the permanent magnet 81 and the coil 83 provided in the second quadrant V2 and a combination of the permanent magnet 82 and the coil 84 provided in the third quadrant V3.

Additionally, the second lens group G2 and the third lens group G3 that are movable along the second optical axis O2 are provided on an optical path extending from the first prism L11, the first motor M1 and the second motor M2, which constitute members of the drive mechanism for moving the second lens group G2 and the third lens group G3 along the second optical axis O2, contain metal parts, and the pair of rods 22 and 23 are also metal parts. If these metal parts are made of a magnetic material and positioned near the electromagnetic actuator, there is a possibility of such metal parts exerting an adverse influence on the image-stabilizing driving operation of the electromagnetic actuator. Specifically, in the moving-magnet electromagnetic actuator in which the permanent magnets 81 and 82 are supported on the moveable first lens frame 30, in order to make the electromagnetic actuator perform drive control with high precision, it is required to remove the adverse influence caused by external magnetic materials on the magnetic fields of the permanent magnets 81 and 82. The permanent magnets 81 and 82 and the coils 83 and 84 that are arranged in the second quadrant V2 and the third quadrant V3 are farther in distance from each motor M1 and M2 and each rod 22 and 23 than in the case where the permanent magnets 81 and 82 and the coils 83 and 84 were to be arranged in the first quadrant V1 and the fourth quadrant V4; therefore, the parts of the motors M1 and M2 and the rods 22 and 23 do not easily adversely-influence the driving of the electromagnetic actuator even if these parts contain magnetic metals.

The permanent magnets 81 and 82 and the coils 83 and 84, which constitute actuators (voice coil motors), are shaped and arranged to extend in planar directions along the tangent planes T1 and T2 of the imaginary spherical surface J1 (centered about the spherical-swinging center A1) and the tangent planes T3 and T4 of the imaginary spherical surface J2 (centered about the spherical-swinging center A1), respectively. As can be seen from the thrust axes E1 and E2 shown in FIGS. 12, 13, 22 and 23, the thrust force generated by the actuator, configured of the permanent magnet 81 and the coil 83, acts on the first lens frame 30 as a force along the tangent plane T1 in which the permanent magnet 81 lies, and the thrust force generated by the actuator, configured of the permanent magnet 82 and the coil 84, acts on the first lens frame 30 as a force along the tangent plane T2 in which the permanent magnet 82 lies, so that the first lens frame 30, the spherical-swinging center A1 of which is positioned at the center of the imaginary spherical surface J1, can be made to perform the spherical swinging operation smoothly with high precision.

The tangent planes T1 and T2 of the imaginary spherical surface J1, in which the permanent magnets 81 and 82 are respectively arranged to extend planarly, and the tangent planes T3 and T4 of the imaginary spherical surface J2, in which the coils 83 and 84 are respectively arranged to extend planarly, are nonparallel to either a plane parallel to the first optical axis O1 or a plane (the third reference plane P3) orthogonal to the first optical axis O1. In addition, as described above, the inclination angle D1 of the straight line K1 (which extends in a direction normal to the tangent plane T1 and T3 (in a precise sense, a half line which extends along the straight line K1 from the point of intersection C1, as a point of origin, toward the tangent planes T1 and T3)) relative to the optical axis of the first lens element L1 (in a precise sense, a half line which extends parallel to the first optical axis O1 (O1') from the point of intersection C1, as a point of origin, toward the object side) is greater than 0 degrees and smaller than 90 degrees)(0°<D1<90° (see FIG. 23), and the inclination angle D2 of the straight line K2 (which extends in a direction normal to the tangent plane T2 and T4 (in a precise sense, a half line which extends along the straight line K2 from the point of intersection C2, as a point of origin, toward the tangent planes T2 and T4)) relative to the optical axis of the first lens element L1 (in a precise sense, a half line which extends parallel to the first optical axis O1 (O1') from the point of intersection C2, as a point of origin, toward the object side) is greater than 0 degree and smaller than 90 degrees) (0°<D2<90° (see FIG. 23).

If the inclination angle D1 of the straight line K1 and the inclination angle D2 of the straight line K2 are 0 degrees, the permanent magnets and coils, of the electromagnetic actuator, would planarly extend parallel to the third reference plane P3. In this configuration, the arrangement of the flat permanent magnets and coils would be such that the profiles of the front projections thereof are the greatest in size when viewed along the first optical axis O1, and accordingly, arranging such an electromagnetic actuator around the first lens element L1 would cause an increase in size of the imaging unit. If the inclination angle D1 of the straight line K1 and the inclination angle D2 of the straight line K2 are 90 degrees, the permanent magnets and coils, of the electromagnetic actuator, would planarly extend along a plane orthogonal to the third reference plane P3. In this configuration, when viewed along the first optical axis O1, the profiles of the thin sides (thickness portions) of the flat permanent magnets and coils would be viewed, so that the profile of the front projection of each actuator itself is small, however the distance of each actuator from the spherical-swinging center A1 along the third reference plane P3 becomes great. If the case where a configuration in which the inclination angle D1 of the straight line K1 and the inclination angle D2 of the straight line K2 are 90 degrees is applied to the above illustrated embodiment of the imaging unit 10, each permanent magnet 81 and 82 would be positioned at a point of intersection between the third reference plane P3 and the imaginary spherical surface J1 (or at a point in front of or behind this point of intersection) in FIGS. 13 and 23, so that the permanent magnet 81 and the coil 83 would further project obliquely leftward and upward from the positions thereof shown in FIG. 12 and the permanent magnet 82 and the coil 84 would further project obliquely leftward and downward from the positions thereof shown in FIG. 12. This would result in an increase in size of the imaging unit compared with the present embodiment of the imaging unit 10. Additionally, if each of the inclination angle D1 of the straight line K1 and the inclination angle D2 of the straight line K2 is greater than 90 degrees, the permanent magnets and the coils that constitute the electromagnetic actuator would be positioned behind the third reference plane P3 in the rearward direction along the first optical axis O1. If the electromagnetic actuator configured of the permanent magnets 81 and 82 and the coil 83 and 84 are positioned behind the third reference plane P3, the imaging unit 10 increases in size in the forward/rearward direction. Specifically, the distance between the first lens element L1 and the electromagnetic actuator in the forward/rearward direction increases, which causes a considerable increase in size of the first lens frame 30, thus being disadvantageous with regard to space utilization.

Unlike these comparative examples, in the preset embodiment of the imaging unit 10, by making each of the inclination angle D1 of the straight line K1 and the inclination angle D2 of the straight line K2 greater than 0 degrees and less than 90 degrees, the profile of the front projection of each of the two actuators is reduced in size and the amount of projection of each of the two actuators in the direction along the first optical axis O1 is also reduced, which makes it possible to achieve a compact image-stabilizing driver which is superior in space efficiency.

The conditions 40°<D1<80° and 40°<D2<80° have been described as a more desirable condition for the inclination angle D1 of the straight line K1 and the inclination angle D2 of the straight line K2. Although depending on the diameter of the first lens element L1 and the size of each permanent magnet 81 and 82, the permanent magnets 81 and 82 can be arranged at positions close to the first lens element L1 without interfering with the first lens element L1 by setting each of the inclination angle D1 and the inclination angle D2 at 40 degrees or more. For instance, in the present embodiment of the imaging unit 10, the edge of each permanent magnet 81 and 82 and the edge of the first lens element L1 are close to each other, as shown in FIGS. 13 and 23, so that it can be seen that the first lens element L1 and the permanent magnets 81 and 82 are arranged on the imaginary spherical surface J1 in a space efficient manner. If each of the inclination angle D1 and the inclination angle D2 is set to less than 40 degrees (for example 30 degrees), the permanent magnets 81 and 82 overlap the installation area of the first lens element L1, which makes it difficult to arrange the permanent magnets 81 and 82. Conversely, if each of the inclination angle D1 and the inclination angle D2 is set to greater than 80 degrees, the effect of miniaturization of the imaging unit in the direction along the third reference plane P3 is weakened.

Figure 24:
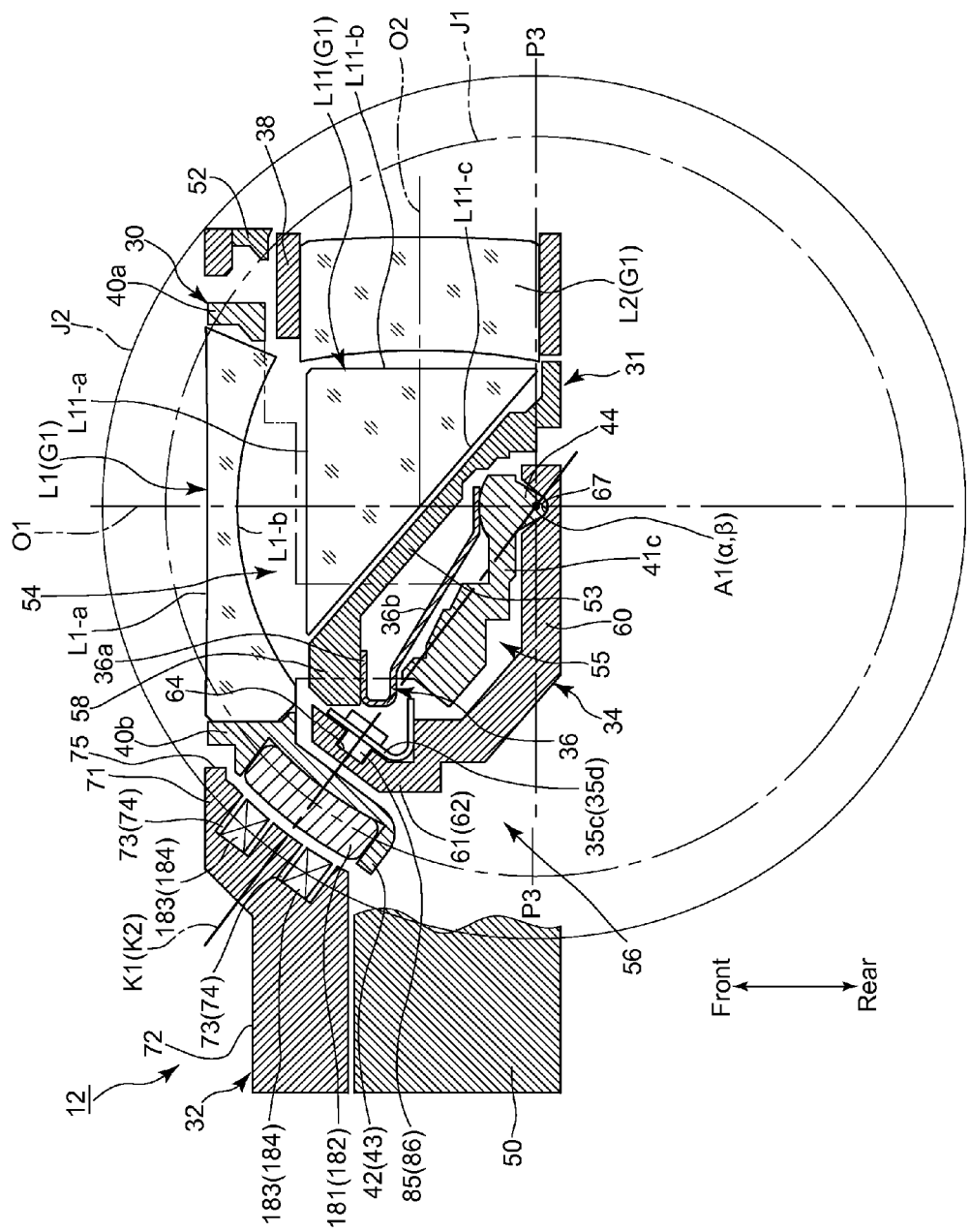
FIG. 24 is a sectional view of the first lens-group unit which is incorporated in a second embodiment of the imaging unit, in which two permanent magnets and two coils which are provided in the first lens-group unit are different in shape from those in the first embodiment of the imaging unit, taken along the line XIII-XIII line or the line XIII'-XIII' shown in FIG. 12.

The shapes of each permanent magnet and the associated coil that constitute an actuator (voice coil motor) are not limited to those in the above illustrated embodiment (the first embodiment) of the imaging unit (imaging apparatus). For instance, the permanent magnets 81 and 82 of the first embodiment of the imaging unit are each formed into a rectangular parallelepiped, wherein the opposite surfaces of the permanent magnet 81 which respectively face the coil 83 and the Hall sensor 85 are parallel to the tangent plane T1 while the opposite surfaces of the permanent magnet 82 which respectively face the coil 84 and the Hall sensor 86 are parallel to the tangent plane T2. Whereas, the permanent magnets 181 and 182 in the second embodiment of the imaging unit shown in FIG. 24 are not each formed into a rectangular parallelepiped; specifically, the surface of each permanent magnet 181 and 182 which faces the associated coil 183 or 184 is curved into a convex surface, and the surface of each permanent magnet 181 and 182 which faces the associated Hall sensor 85 or 86 is curved into a concave surface. Such curved surfaces of the permanent magnets 181 and 182 are substantially concentric with the imaginary spherical surfaces J1 and J2. The surface of each coil 183 and 184 which faces the associated permanent magnet 181 or 182 is formed into a concave curved surface (spherical surface substantially concentric with the imaginary spherical surfaces J1 and J2) to correspond to the convex curved surface of the associated permanent magnet 181 or 182. If an electromagnetic actuator (voice coil motor) provided with the permanent magnets 181 and 182 and the coils 183 and 184 that have such curved surfaces is used, the first lens frame 30 moves along the curved surfaces of the permanent magnets 181 and 182 and the coils 183 and 184 when the first lens frame 30 performs the spherical swinging operation, which makes it possible to minimize variations in the distance (gap) between the permanent magnet 181 and the coil 183 and the distance (gap) between the permanent magnet 182 and the coil 184.

In the case where the mutually facing surfaces of each permanent magnet and the associated coil and the surface of each permanent magnet which faces the associated Hall sensor are each formed as a nonplanar surface, this nonplanar surface can be formed into a curved surface having a cylindrical shape as shown in FIG. 24 in a cross section along a meridian line of the imaginary spherical surface J1 or J2 and a uniform cross sectional shape in a direction orthogonal to the aforementioned meridian line (in a direction along a latitude line of the imaginary spherical surface J1 or J2).

Figure 25:
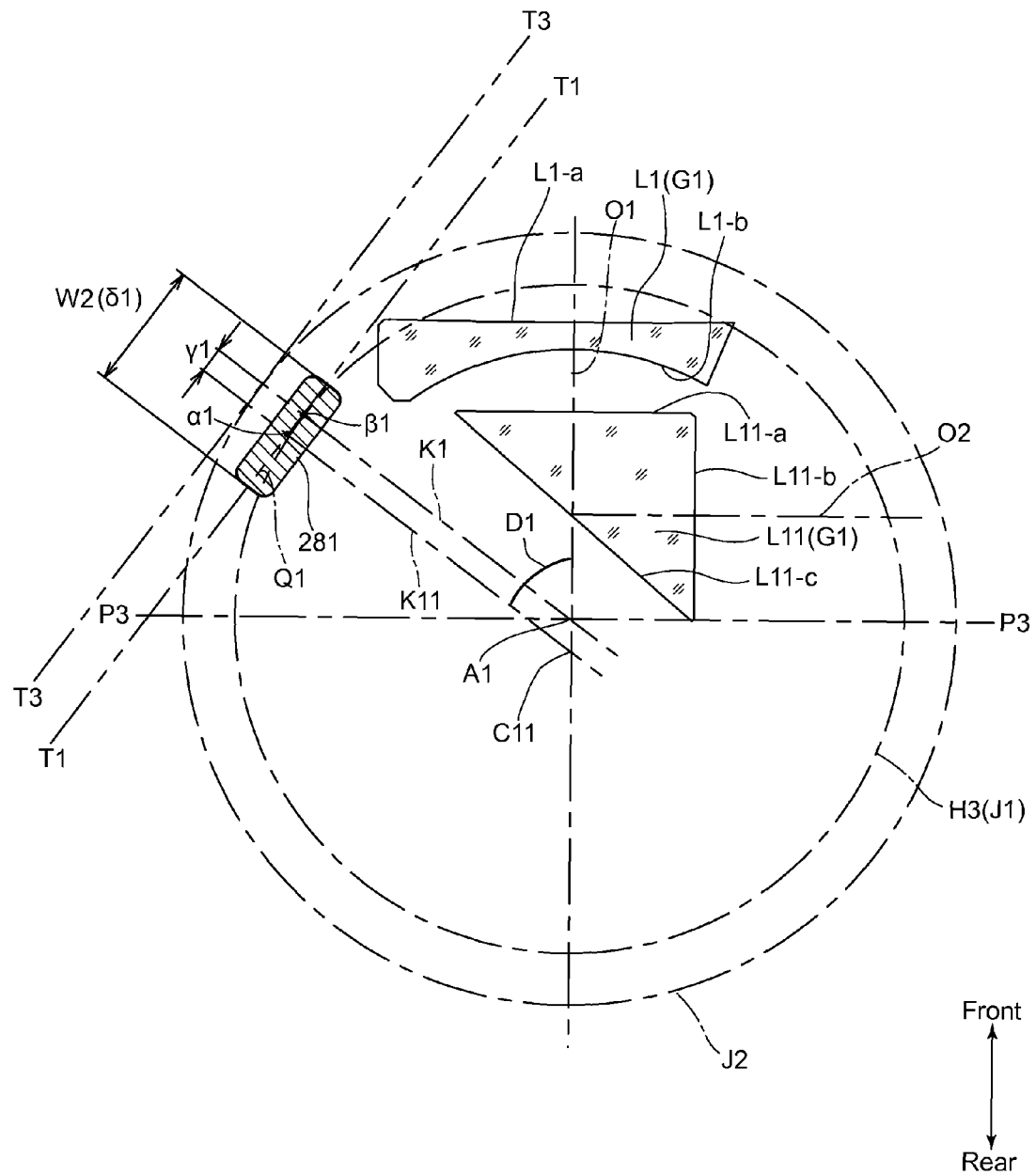
FIG. 25 is a sectional view of the first lens element, the first prism and a permanent magnet in a third embodiment of the imaging unit, taken along the line XIII-XIII shown in FIG. 12, showing the positional relationship therebetween, wherein the permanent magnet is offset from a reference position.
Figure 26:
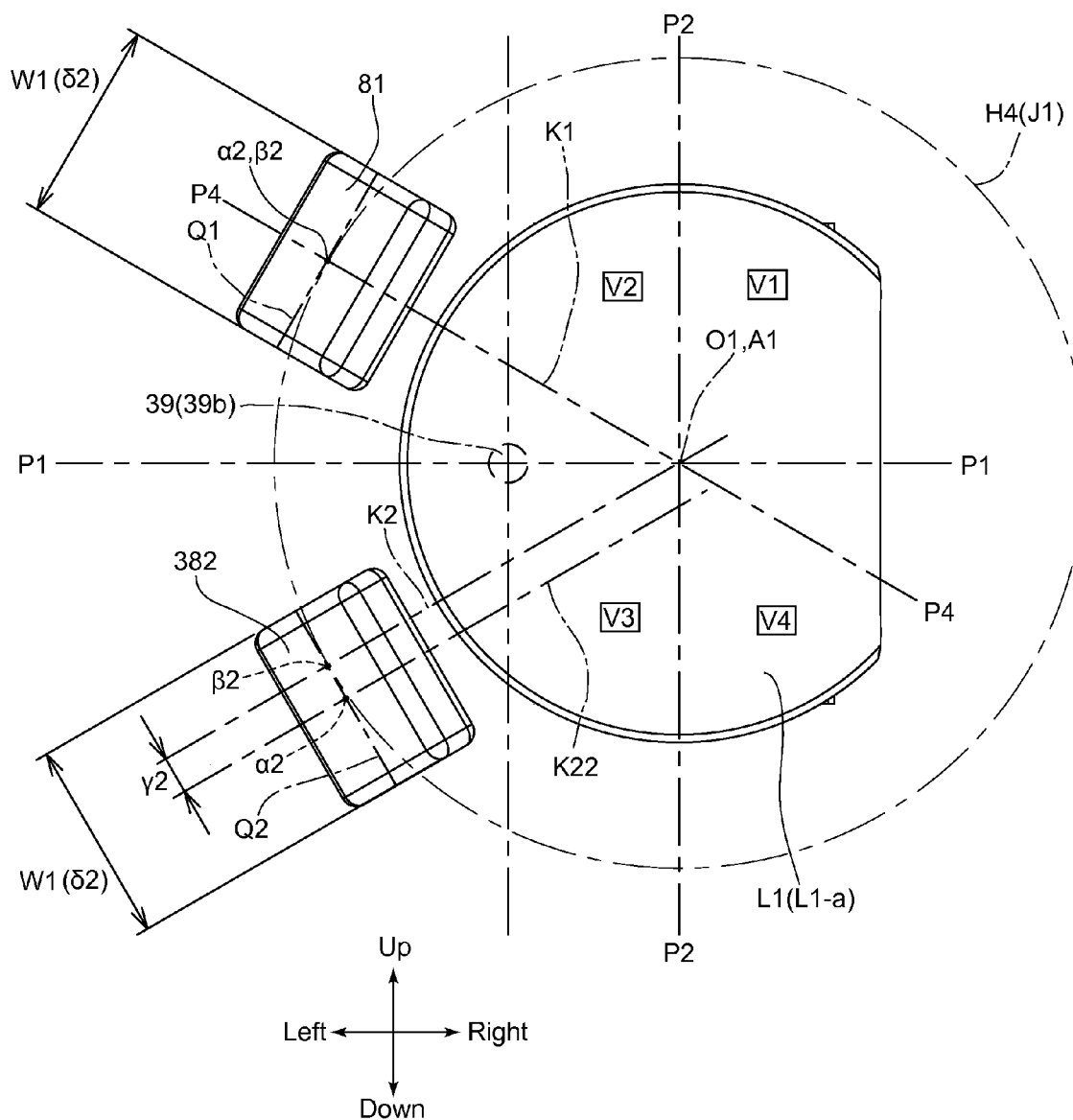
FIG. 26 is a front elevational view of the first lens element and the two permanent magnets in a fourth embodiment of the imaging unit, showing the positional relationship therebetween, wherein one of the two permanent magnets is offset from a reference position.

In the first embodiment of the imaging unit 10, each of the straight lines K1 and K2, which pass through the centers of the outer profiles of the permanent magnets 81 and 82 and are parallel to any normal to the tangent planes T1 and T2, respectively, intersects an extension line of the first optical axis O1 (O1') at the spherical-swinging center A1 (each of the point of intersection C1 and the point of intersection C2 coincides with the spherical-swinging center A1). The arrangement of the permanent magnets 181 and 182 in the second embodiment of the imaging unit is identical to this arrangement of the permanent magnets 81 and 82 in the first embodiment of the imaging unit. This arrangement makes it easy to control the difference in thrust force between the two actuators (81(181) and 83(183), and 82(182) and 84(184)) that is caused due to the difference in driving direction therebetween and variations in the gap between each permanent magnet 81(181) and 82(182) and the associated Hall sensor 85 or 86, thus being effective in achieving a stable spherical swinging operation. However, even if the positions of the permanent magnets are shifted to some extent with respect to the positions of the first and second embodiments of the imaging unit, the spherical swinging operation of the first lens frame 30 can still be performed without hindrance. FIGS. 25 and 26 each show such a modified embodiment of the imaging unit; specifically, FIG. 25 shows a third embodiment of the imaging unit and FIG. 26 shows a fourth embodiment of the imaging unit.

In the third embodiment of the imaging unit shown in FIG. 25, the arrangement of the permanent magnet 281 is different from that of the permanent magnet 81 as viewed in a direction orthogonal to the first optical axis O1 and parallel to the tangent plane T1 under the condition that the tangent plane T1 (the inclination angle D1 of normals to the tangent plane T1) is identical to that in the first embodiment of the imaging unit. More specifically, when it is assumed that the imaginary spherical surface J1 (which is shown as an imaginary circle H3, discussed later, in FIG. 25) is a sphere with the points of intersection of the imaginary spherical surface J1 with the first optical axis O1 (O1') and an extension line thereof as the poles of the sphere, the position of the permanent magnet 281 along the tangent plane T1, on a plane extending through a meridian line of the sphere, is different from that of the permanent magnet 81. Similar to the permanent magnet 81, the permanent magnet 281 is in the shape of a flat rectangular prism which extends in a plane parallel to the tangent plane T1, and the width W2 of the permanent magnet 281 at the position in the cross section shown in FIG. 25 is identical to the width W2 of the permanent magnet 81 at the position in the cross section shown in FIG. 23. A straight line K11 which passes through the center of the outer profile of the flat permanent magnet 281 and is parallel to the normals to the tangent plane T1 is offset in the direction opposite to the direction toward the object side (toward the rear of the imaging unit 10) from the straight line K1, shown in the first embodiment of the imaging unit. Namely, compared with the permanent magnet 81 in the first embodiment of the imaging unit, the permanent magnet 281 is located at a position that is shifted in a direction away from the first lens element L1 along the tangent plane T1. In accordance with this arrangement of the permanent magnet 281, a point of intersection C11 of the straight line K11 and a line extended from the first optical axis O1 (O1') is not coincident with the spherical-swinging center A1. α1 shown in FIG. 25 designates the point of intersection between the straight line K11 and the tangent plane T1 (in this embodiment shown in FIG. 25, the point of intersection α1 is coincident with the center of the outside shape of the permanent magnet 281). FIG. 25 shows the arrangement of the first lens element L1, the first prism L11 and the permanent magnet 281 in the third embodiment of the imaging unit in a plane (cross section) which passes through the point of intersection α1 and extends through a meridian line of the imaginary spherical surface J1, and the meridian line of the imaginary spherical surface J1 which is in contact with the tangent plane T1 is shown as the imaginary circle H3. As can be seen from FIG. 25, the point of intersection α1 is in noncontact with the imaginary circle H3. Although the permanent magnet 81 at a reference position shown in FIGS. 13 and 23 is close to the first lens element L1, it is also possible for the straight line K11 (the point of intersection C11) to be offset toward the object side (toward the front of the imaging unit 10) from the swing center A1 (and parallel to the straight line K1), in a direction opposite to the case in FIG. 25, under the condition that the permanent magnets and the peripheral elements thereof do not interfere with one another.

In the case where the straight line K11 (on which the point of intersection C11 lies), which is parallel to any normal to the tangent plane T1 and passes through the center of the outer profile of the flat permanent magnet 281, is offset from the straight line K1 (the spherical-swinging center A1), of the first embodiment of the imaging unit, along the tangent plane T1 within a plane extending through a meridian line of the imaginary spherical surface J1 (in other words, along a tangent to the imaginary circle H3), if the offset amount is excessively great compared with the size of the permanent magnet 281 (the width W2) in a direction along the tangent plane T1 on a plane extending through a meridian line of the imaginary spherical surface J1, there is a possibility of a non-negligible effect being exerted on the stability and accuracy of the spherical swinging operation of the first lens frame 30 and the variations in the gap between the permanent magnet 281 and the associated coil and Hall sensor. To prevent this problem from occurring, in all cases that include the third embodiment of the imaging unit, it is desirable that the following condition (3) be satisfied:

$$0 \leq \gamma 1 < \delta 1 \times 0.2 \qquad (3)$$

wherein γ1 designates the distance between the point of intersection α1 and the point of contact β1 on a plane extending through a meridian line of the imaginary spherical surface J1 (the imaginary circle H3) like that shown in FIGS. 23 and 25. As described above in regard to the permanent magnet 281, in the above-mentioned plane extending through a meridian line, the point of intersection α1 is the point where the tangent plane (T1 or T2), along which the associated permanent magnet is arranged, and the straight line (K1, K2 or K11), which is parallel to any normal to the tangent plane (T1 or T2) and passes through the center of the outer profile of the associated permanent magnet, intersect each other. The point of contact β1 is the point where the imaginary spherical surface J1 (the imaginary circle H3) and the tangent plane (T1 or T2) is in contact with each other in the aforementioned plane extending through a meridian line. δ1 designates the size of each permanent magnet along the associated tangent plane (T1 or T2) and on a plane extending through a meridian line (the imaginary circle H3) of the imaginary spherical surface J1, similar to the distance γ1, and corresponds to the width W2 of the permanent magnet 81(82) shown in FIG. 23 and the width W2 of the permanent magnet 281 shown in FIG. 25. In the first and second embodiments of the imaging units, in which the straight line K1, which passes through the center of the outer profile of the permanent magnet (81 or 181) and is parallel to any normal to the tangent plane T1, passes through the spherical-swinging center A1 (the point of intersection C1 is coincident with the spherical-swinging center A1) and in which the straight line K2, which passes through the center of the outer profile of the permanent magnet (82 or 182) and is parallel to any normal to the tangent plane T2, passes through the spherical-swinging center A1 (the point of intersection C2 is coincident with the spherical-swinging center A1), α1 and β1 are coincident with each other as shown in FIG. 23, so that the distance γ1 is equal to zero (γ1=0).

Although only one of the two permanent magnets, i.e., the permanent magnet 281, is shown in FIG. 25, the other permanent magnet (which corresponds to the permanent magnet 82 in the first embodiment of the imaging unit) can be offset similar to the permanent magnet 281 or can be aligned in the same manner as the permanent magnet 82.

Figure 27:
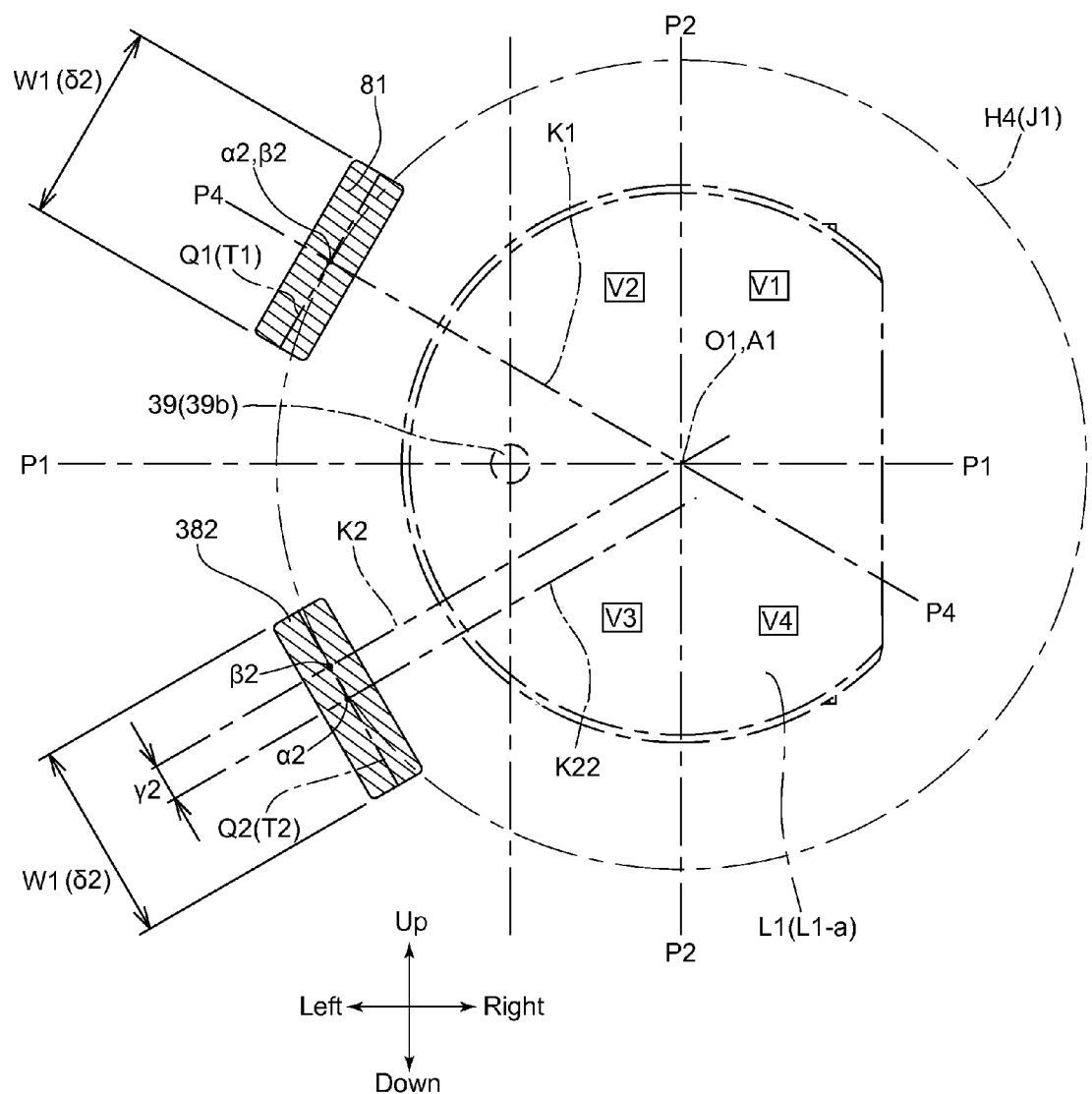
FIG. 27 is a diagram conceptually showing the two permanent magnets in the fourth embodiment of the imaging unit as cross sections taken along a plane, which passes through the centers of the outer profiles of the two permanent magnets, and is orthogonal to the first optical axis.

In the fourth embodiment of the imaging unit shown in FIGS. 26 and 27, the permanent magnet 382 is arranged differently from that of the permanent magnet 82, as viewed in a direction parallel to the first optical axis O1 (O1') under the condition that the tangent plane T2 (see FIG. 23) (the inclination angle D2 of any normal to the tangent plane T2) is identical to that in the first embodiment of the imaging unit. More specifically, when it is assumed that the imaginary spherical surface J1 (which is shown as an imaginary circle H4 (which will be discussed later) in FIGS. 26 and 27) is a sphere with the points of intersection of the imaginary spherical surface J1 with the first optical axis O1 (O1') and an extension line thereof as the poles of the sphere, the position of a permanent magnet 382 in a direction along the tangent plane T2 on a plane extending through a latitude line of the sphere is different from that of the permanent magnet 82. Although the tangent planes T1 and T2 that respectively show the planar expansions of the permanent magnets 81 and 382 are not shown as planes (imaginary planes) in either of FIGS. 26 and 27, the boundary line Q1 of the permanent magnet 81 between the magnetic poles thereof at the position in the cross section shown in FIG. 27 is in a position included in the tangent plane T1, while the boundary line Q2 of the permanent magnet 382 between the magnetic poles thereof at the position in the same cross section is in a position included in the tangent plane T2; accordingly, the parenthesized reference characters T1 and T2 are added to the reference characters Q1 and Q2 in FIG. 27 that show the magnetic pole boundary lines of the permanent magnets 81 and 382, respectively. Similar to the permanent magnet 82, the permanent magnet 382 is in the shape of a flat rectangular cuboid which expands in a plane parallel to the tangent plane T2, and the width W1 of the permanent magnet 382 at the position in the cross section shown in FIG. 27 is identical to the width W1 of the permanent magnet 82 at the position in the cross section shown in FIG. 27. A straight line K22 (see FIGS. 26 and 27) which passes through the center of the outer profile of the flat permanent magnet 382 and is parallel to any normal to the tangent plane T2 is offset from the straight line K2 in a direction away from the first optical axis O1 (O1') and the spherical-swinging center A1. Namely, compared with the permanent magnet 82 in the first embodiment of the imaging unit, the permanent magnet 382 is located at a position that is shifted in a direction away from the first reference plane P1 in the tangent plane T2. According to this arrangement of the permanent magnet 382, the straight line K22 does not intersect either the first optical axis O1 (O1') or an extension line thereof. In FIGS. 26 and 27, the latitude line of the imaginary spherical surface J1 that is in contact with both the magnetic-pole boundary line Q1 of the permanent magnet 81 and the magnetic-pole boundary line Q2 of the permanent magnet 382 is shown as the imaginary circle H4. As a result of the permanent magnet 382 being offset, the point of intersection α2 between the straight line K22 (which passes through the center of the outer profile of the permanent magnet 382 and is parallel to any normal to the tangent plane T2) and the tangent plane T2 (in this embodiment, the point of intersection α2 is coincident with the center of the outer profile of the permanent magnet 382) is noncontact with the imaginary circle H4. It is possible for the straight line K22 to be offset from the first optical axis O1 (O1') and the spherical-swinging center A1 in the opposite direction from the direction shown in FIGS. 26 and 27 under the condition that the permanent magnets and the peripheral elements thereof do not interfere with one another.

In the case where the straight line K22, which is parallel to any normal to the tangent plane T1 and passes through the center of the outer profile of the permanent magnet 382, is offset along the tangent plane T2 (in other words, along a tangent to the imaginary circle H4) on a plane extending through a latitude line of the imaginary spherical surface J1 from the straight line K2 (shown in the first embodiment of the imaging unit shown in FIGS. 26 and 27), if the offset amount is excessively great compared with the size of the permanent magnet 382 (the width W1) in a direction along the tangent plane T2 on the aforementioned plane extending through a latitude line of the imaginary spherical surface J1, there is a possibility of a non-negligible effect being exerted on the stability and accuracy of the spherical swinging operation of the first lens frame 30 and on the variations in the gap between the permanent magnet 382 and the associated coil and Hall sensor. To prevent this problem from occurring, in all cases that include the fourth embodiment of the imaging unit, it is desirable that the following condition (4) be satisfied:

$$0 \leq \gamma2 < \delta2 \times 0.2 \tag{4}$$

wherein γ2 designates the distance between the point of intersection α2 and the point of contact α2 on a plane extending through a latitude line of the imaginary spherical surface J1 (the imaginary circle H4) as shown in FIGS. 22, 26 and 27. As described above in regard to the permanent magnet 382, in the above-mentioned plane extending through a latitude line, the point of intersection α2 is the point where the tangent plane (T1 or T2), along which the associated permanent magnet is arranged, and the straight line (K1, K2, K11 or K22), which is parallel to any normal to the tangent plane (T1 or T2) and passes through the center of the outer profile of the associated permanent magnet, intersect each other. The point of contact β2 is the point where the imaginary spherical surface J1 (the imaginary circle H4) and the tangent plane (T1 or T2) is in contact with each other in the aforementioned plane extending through a latitude line. 52 designates the size of each permanent magnet along the associated tangent plane (T1 or T2) on a plane extending through a latitude line (the imaginary circle H4) of the imaginary spherical surface J1, similar to the distance γ2, and corresponds to the width W1 of the permanent magnet 81(82) shown in FIGS. 22, 26 and 27 and the width W1 of the permanent magnet 382 shown in FIG. 26. In the first, second and third embodiments of the imaging units, in which the straight line (K1 or K11), which passes through the center of the outer profile of the permanent magnet (81, 181 or 281) and is parallel to any normal to the tangent plane T1, intersects an extension of the first optical axis O1 (O1') and in which the straight line K2, which passes through the center of the outer profile of the permanent magnet (82 or 182) and is parallel to any normal to the tangent plane T2, intersects an extension of the first optical axis O1 (O1'), the distance γ2 is equal to zero (γ2=0).

Although the position of one of the two permanent magnets, i.e., the permanent magnet 382, is offset in the fourth embodiment of the imaging unit shown in FIGS. 26 and 27, the other permanent magnet 81 can also be offset in a similar manner to the permanent magnet 382.

Although one permanent magnet is offset in one direction in the third and fourth embodiments of the imaging units, it is also possible to apply both the offset arrangement shown in the third embodiment of the imaging unit and the offset arrangement shown in the fourth embodiment of the imaging unit to a single permanent magnet.

Although the offset of the permanent magnet(s) of the actuator has been illustrated in each of the third and fourth embodiments of the imaging units, the presence or absence of an offset arrangement for each of the coil (s) and Hall sensor (s) is optional according to the presence or absence of an offset arrangement of the permanent magnet (s).

As a first combination, it is possible for straight lines which extend from both the center of the outer profile of a permanent magnet and the center of the outer profile of a coil in a direction parallel to any normal to a tangent plane to be offset so that the straight lines do not intersect with the spherical-swinging center A1 (such an offset arrangement of the straight line(s) associated with the position(s) of a magnet, a coil or a Hall sensor will be hereinafter referred simply to the offset arrangement of the magnet, the coil or the Hall sensor) and for the Hall sensors not to be offset. For the accuracy of position control of the spherical swinging operation, this configuration can be practiced at substantially the same level as the basic configuration, in which none of the elements are offset. On the other hand, in order to suppress fluctuations in the gap between permanent magnet and the associated coil and suppress fluctuations in the gap between permanent magnet and the associated Hall sensor, the basic configuration is more advantageous than the configuration of the first combination.

As a second combination, neither the permanent magnet nor the coil is offset, and only the Hall sensor is offset. With this configuration, variations in the gap between the permanent magnet and the coil can be suppressed by the same amount as that in the basic configuration. On the other hand, for accuracy of position control of the spherical swinging operation and the suppression of fluctuations in the gap between the permanent magnet and the Hall sensor, the basic configuration is more advantageous than the configuration of the second combination.

As a third combination, it is possible for the permanent magnet, the coil and the Hall sensor to be all equally offset. The basic configuration is more advantageous than the configuration of the third combination with regard to the following factors: the accuracy of position control of the spherical swinging operation, the suppression of fluctuations in the gap between permanent magnet and the coil, and the suppression of fluctuations in the gap between permanent magnet and the Hall sensor.

Although the present invention has been described based on the above illustrated embodiments, the present invention is not limited solely thereto; various modifications to the above illustrated embodiment are possible without departing from the scope of the invention. For instance, although the imaging optical system of the above described imaging apparatus uses a prism as a reflector element which bends an optical path, the prism can be replaced by a mirror, or the like, as a reflector element. Additionally, the present invention can also be applied to a type of imaging apparatus which has an L-shaped optical path without including a reflector element corresponding to the second prism L12 in the imaging optical system. Alternatively, the present invention can be applied to an imaging apparatus which contains a bending optical system including one or more additional reflector elements in addition to the first prism L11 and the second prism L12. In any case, the bending angle (reflecting angle) of an optical axis by a reflector element of the bending optical system can be any angle other than 90 degrees.

As described above, various modification can be made to the front lens element (the first lens element L1) that is positioned on the object side of the reflector element (which corresponds to the first prism L11 in the above illustrated embodiments) to perform an image-stabilizing operation. For instance, a plurality of front lens elements can be provided instead of a single lens element.

The first lens element L1 in the above illustrated embodiments has a D-cut shape that is formed with a portion of the outer edge of the first lens element L1 cut out, which contributes to miniaturization of the first lens-group unit 12 in a direction along the second optical axis O2. However, the front elevational shape of the front lens element in the present invention is not limited to that of a D-cut lens element; the present invention is also applicable to an imaging apparatus which includes a front lens element having a shape (e.g., circular shape) different in front elevational view from a D-cut lens.

In the above illustrated embodiments, a combination of the base member 31, the cover member 32 and the sensor holder 34 is used as a support member which supports the first lens frame 30 in a manner to allow the first lens frame 30 to perform the spherical swinging operation. This structure makes it possible to achieve an excellent effect in assembling workability; however, a support member with which the base member 31, the sensor holder 34 or the like is integrally formed can also be used. Unlike the above illustrated embodiment of the imaging unit 10, it is possible for the housing 13 (which holds the imaging sensor 14, the second prism L12 and other members) and the base member 31 (which holds the first prism L11) to be integrally formed to serve as an integrated support member and for the first lens frame 30 to be supported by this integrated support member.

In each of the above illustrated embodiments, the tangent plane T1 and the tangent plane T3, which respectively show the planar expansions of the permanent magnet (81, 181 or 281) and the coil (83 or 183) that face each other, are set parallel to each other, while the tangent plane T2 and the tangent plane T4, which respectively show the planar expansions of the permanent magnet (82 or 382) and the coil (84 or 184) that face each other, are set parallel to each other. This arrangement is effective at suppressing fluctuations in the gap between each permanent magnet and the associated coil when the first lens frame 30 performs the spherical swinging operation; however, the present invention is also applicable to a configuration in which the tangent planes T1 and T3 are nonparallel to each other and/or the tangent planes T2 and T4 are nonparallel to each other. Even if the planar direction of one permanent magnet and the planar direction of the associated coil tilt relative to each other, the spherical swinging operation can be effectively performed as long as the angle of the tilt is within a predetermined range.

In each of the above illustrated embodiments, moving-magnet type voice coil motors, in which the permanent magnets (81, 181 or 281, and 82, 182 or 382) are held by the movable first lens frame 30 and in which the coils (83 and 84, or 183 and 184) are held by the stationary cover member 32, are used as actuators which make the first lens frame 30 perform the spherical swinging operation. Unlike this structure, moving-coil type voice coil motors in which the coils are held on the movable first lens frame 30 and in which the permanent magnets are held on a support member (the base member 31, the cover member 32, the sensor holder 34, etc.) which supports the first lens frame 30 in a manner to allow the first lens frame 30 to perform the spherical swinging operation can also be adopted. In this case, it is advisable that Hall sensors for detecting the position of the first lens frame 30 be held on the movable first lens frame 30.

In the first embodiment of the imaging unit, the two actuators (i.e., a combination of the permanent magnet 81 and the coil 83 and a combination of the permanent magnet 82 and the coil 84) for driving the first lens frame 30 to reduce image shake are arranged so that the intersecting angle D3 between the thrust acting plane P4 and the thrust acting plane P5 is approximately 60 degrees (see FIGS. 12 and 22). The closer the thrust acting planes P4 and P5 of the two actuators are positioned to the first reference plane P1 (i.e., as the intersecting angle between the thrust acting planed P4 and P5 becomes smaller), the more advantageous the configuration of the two actuators becomes with respect to the miniaturization of the imaging unit 10 in the upward/downward direction. However, making the intersecting angle between the thrust acting planes P4 and P5 excessively small makes it difficult to exercise stable image-stabilizing control of the first lens frame 30 with high precision. The configuration shown in FIGS. 12 and 22 is such that the intersecting angle D3 between the thrust acting plane P4 and the thrust acting plane P5 of the two actuators is set at approximately 60 degrees to reduce the size of the imaging unit 10 in the upward/downward direction within a range so as not to impair the stability and accuracy of image-stabilizing control. However, the arrangement of the two actuators in the circumferential direction about the first optical axis O1 (in a direction along the latitude lines of the imaginary spherical surfaces J1 and J2) is not limited to this particular arrangement; any other arrangement so long as the spherical swinging operation of the first lens frame 30 can be performed reliably. For instance, as viewed in a direction parallel to the first optical axis O1, as shown in FIGS. 12 and 22, if the intersecting angle between the thrust acting planes of the two actuators is set at approximately 90 degrees, this configuration is advantageous for ensuring stability and accuracy of image-stabilizing control even though the miniaturization of the first lens-group unit 12 in the upward/downward direction would be somewhat limited.

The arrangement shown in FIGS. 22, 26 and 27 in which the boundary line Q1 of the permanent magnet 81 between the magnetic poles thereof and the boundary line Q2 of the permanent magnet 82 or 382 between the magnetic poles thereof are in contact with the common imaginary circle H1 or H4 (a latitude line of the imaginary spherical surface J1) about the first optical axis O1 is desirable in terms of weight balance. However, even in the case where the magnetic-pole boundary lines of the two permanent magnets are in noncontact with a common imaginary circle about the optical axis of the first lens element L1, the first lens frame 30 can be driven and the position thereof can be detected, and the present invention does not exclude such a structure.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
   a front lens group which constitutes part of an imaging optical system of said imaging apparatus and includes at least one front lens element and a reflector, in that order from an object side, wherein said reflector includes a reflection surface which reflects light rays, exiting from said front lens element, toward a different direction, and wherein said imaging apparatus performs an image-stabilizing operation by driving said front lens element in response to vibrations applied to said imaging optical system in order to reduce image shake on said image plane;
   at least one rear lens group which constitutes another part of said imaging optical system and is positioned closer to an image plane than said front lens group;
   a movable frame which holds said front lens element;
   a support member which supports at least said reflector and is immovable relative to an optical axis of said front lens element in a reference state in which said imaging apparatus does not drive said front lens element when said image-stabilizing operation is not performed;
   a support mechanism which supports said movable frame in a manner to allow said movable frame to spherically swing along an imaginary spherical surface about a spherical-swinging center which is positioned on an extension of said optical axis, of said front lens element, extending behind an underside of said reflection surface of said reflector; and
   an actuator which applies a driving force to said movable frame in response to the vibrations applied to said imaging optical system to make said movable frame spherically swing about said spherical-swinging center,
   wherein said actuator comprises a voice coil motor including a permanent magnet and a coil, one of said permanent magnet and said coil being fixedly held by said movable frame and the other of said permanent magnet and said coil being fixedly held by said support member,
   wherein said permanent magnet planarly extends in a direction parallel to a first tangent plane that is tangent to a first imaginary sphere, centered about said spherical-swinging center,
   wherein said coil is formed by winding wire to lie in a second tangent plane that is tangent to a second imaginary sphere about said spherical-swinging center, said coil extending planarly in a direction parallel to said second tangent plane,
   wherein any normal to said first tangent plane is nonparallel to said optical axis of said front lens element and intersects said optical axis of said front lens element or an extension line thereof, and
   wherein any half line, which extends toward said first tangent plane in a direction parallel to said any normal from an intersecting point between said normal and said optical axis or said extension line thereof, has an inclination with respect to said optical axis of said front lens element such that a distance between said half line and said optical axis of said front lens element increases in a direction toward said object side.

2. The imaging apparatus according to claim 1, wherein an angle of inclination of said half line relative to a half line that extends toward said object side in a direction parallel to said optical axis of said front lens element from said intersecting point falls within a range from 40 degrees to 80 degrees.

3. The imaging apparatus according to claim 1, wherein said first tangent plane and said second tangent plane are substantially parallel to each other.

4. The imaging apparatus according to claim 1, wherein, when two intersecting points at which an imaginary spherical surface of said first imaginary sphere intersects with said optical axis of said front lens element and said extension line thereof are defined as poles of said first imaginary sphere, any circular arc on said imaginary spherical surface of said first imaginary sphere which connects said poles of said first imaginary sphere is defined as a meridian line, any circular arc on said imaginary spherical surface of said first imaginary sphere which is orthogonal to said meridian line is defined as a latitude line, $\alpha 1$ designates an intersecting point between said first tangent plane and a straight line which passes through a center of an outer profile of said permanent magnet and is parallel to said any normal to said first tangent plane, and $\beta 1$ designates a contacting point between said first imaginary sphere and said first tangent plane in a plane which passes through said intersecting point $\alpha 1$ and extends through said meridian line, said imaging apparatus satisfies the following condition:

$$0 \leq \gamma1 < \delta1 \times 0.2$$

wherein γ1 designates a distance between said intersecting point α1 and said contacting point β1 along said first tangent plane and on a plane extending through said meridian line, and δ1 designates a size of said permanent magnet along said first tangent plane and on a plane extending through said meridian line.

5. The imaging apparatus according to claim 4, wherein said distance γ1 is equal to zero.

6. The imaging apparatus according to claim 1, wherein, when two intersecting points at which an imaginary spherical surface of said first imaginary sphere intersects with said optical axis of said front lens element and said extension line thereof are defined as poles of said first imaginary sphere, any circular arc on said imaginary spherical surface of said first imaginary sphere which connects said poles of said first imaginary sphere is defined as a meridian line, any circular arc on said imaginary spherical surface of said first imaginary sphere which is orthogonal to said meridian line is defined as a latitude line, α2 designates an intersecting point between said first tangent plane and a straight line which passes through a center of an outer profile of said permanent magnet and is parallel to said any normal to said first tangent plane, and β2 designates a contacting point between said first imaginary sphere and said first tangent plane in a plane which passes through said intersecting point α2 and extends through said latitude line, said imaging apparatus satisfies the following condition:

$$0 \gamma2 < \delta2 \times 0.2$$

wherein γ2 designates a distance between said intersecting point α2 and said contacting point β2 along said first tangent plane and on a plane extending through said latitude line, and δ2 designates a size of said permanent magnet along said first tangent plane and on a plane extending through said latitude line.

7. The imaging apparatus according to claim 6, wherein said distance γ2 is equal to zero.

8. The imaging apparatus according to claim 1, wherein said permanent magnet is fixedly held by said movable frame, wherein said coil is fixedly held by said support member, and wherein said permanent magnet is positioned closer to said spherical-swinging center than said coil in a radial direction of said first imaginary sphere and said second imaginary sphere.

9. The imaging apparatus according to claim 8, further comprising a sensor which senses variations in magnetic field to detect a position of said movable frame, wherein said sensor, said permanent magnet and said coil are aligned in said radial direction in that order from said spherical-swinging center side.

10. The imaging apparatus according to claim 1, wherein said permanent magnet comprises two permanent magnets which are arranged at different positions in a direction along an imaginary circle about said optical axis of said front lens element.

11. The imaging apparatus according to claim 1, wherein a magnetic-pole boundary line of said permanent magnet is in contact with an imaginary circle about said optical axis of said front lens element as viewed in a direction parallel to said optical axis of said front lens element.

* * * * *